(12) United States Patent
Edler et al.

(10) Patent No.: US 10,351,414 B1
(45) Date of Patent: Jul. 16, 2019

(54) FLUID HANDLING DEVICE HAVING VALVE

(71) Applicant: Lincoln Industrial Corporation, St. Louis, MO (US)

(72) Inventors: Brad Allen Edler, Fults, IL (US); Steve Gaynes, McHenry, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 15/853,161

(22) Filed: Dec. 22, 2017

(51) Int. Cl.
*B67D 7/02* (2010.01)
*B67D 7/36* (2010.01)
*B67D 7/78* (2010.01)
*B67D 7/38* (2010.01)

(52) U.S. Cl.
CPC ......... *B67D 7/0277* (2013.01); *B67D 7/0266* (2013.01); *B67D 7/36* (2013.01); *B67D 7/38* (2013.01); *B67D 7/78* (2013.01)

(58) Field of Classification Search
CPC ...... B67D 7/9277; B67D 7/0266; B67D 7/38; B67D 7/78; B67D 7/36
USPC ........ 222/399, 401, 394–398, 402.17; 141/7, 141/8, 65, 66
See application file for complete search history.

(56) References Cited

U.S. PATENT DOCUMENTS

| | | | |
|---|---|---|---|
| 2,998,021 A | 8/1961 | Becker | |
| 3,395,833 A * | 8/1968 | Rice, Jr. | B22D 39/06 222/399 |
| 3,638,831 A * | 2/1972 | Pauwels | B05B 9/04 222/1 |
| 3,940,069 A | 2/1976 | Gunzel, Jr. et al. | |
| RE29,405 E | 9/1977 | Gunzel, Jr. et al. | |
| 4,993,447 A | 2/1991 | Camire | |
| 5,042,697 A | 8/1991 | Warren | |
| 5,185,007 A | 2/1993 | Middaugh et al. | |
| 5,265,653 A | 11/1993 | Herlth | |
| 5,320,288 A | 6/1994 | Ketcham, Jr. | |
| 5,372,310 A | 12/1994 | Ketcham | |
| 5,437,202 A | 8/1995 | Clark, II | |
| 5,477,907 A * | 12/1995 | Meyer | B22D 39/06 164/133 |
| 5,699,940 A | 12/1997 | Clark, II | |

(Continued)

OTHER PUBLICATIONS

"Fluid Evacuation & Dispensing Accessories," Mityvac, pp. 11-17, at least as early as Dec. 1, 2016.
"Brake & Clutch Bleeding Equipment," Mityvac, pp. 18-24, at least as early as Dec. 1, 2016.
Spill-Free Transmission Fluid Fills, 6792, 6792-EDB, 6792-TFA, 2 pages, at least as early as Dec. 1, 2017.

(Continued)

*Primary Examiner* — Lien M Ngo
(74) *Attorney, Agent, or Firm* — Stinson LLP

(57) ABSTRACT

A liquid dispenser includes a container and a lid. When the lid is mounted on the container, the container supports passaging including a gas supply inlet and a venturi. A control valve in fluid communication with the passaging is adjustable to a dispensing configuration and an evacuation configuration and a separate mode selector valve is adjustable to a dispensing configuration and an evacuation configuration. The dispenser dispenses liquid when both valves are in the dispensing configuration and evacuates liquid when both valves are in the evacuation configuration. The mode selector valve can block flow through a pressurization passage of the passaging in the evacuation configuration and through the venturi or other evacuation passage in the dispensing configuration.

20 Claims, 42 Drawing Sheets

(56) References Cited

U.S. PATENT DOCUMENTS

| | | | |
|---|---|---|---|
| 5,738,499 A | | 4/1998 | Evans |
| 5,964,254 A | * | 10/1999 | Jackson .................... B01J 4/00 137/209 |
| 6,257,000 B1 | | 7/2001 | Wang |
| 6,321,874 B1 | | 11/2001 | Miyamoto |
| 6,755,207 B1 | | 6/2004 | Curtis et al. |
| 6,772,803 B2 | | 8/2004 | Awad |
| 7,093,624 B2 | | 8/2006 | Chen |
| 7,334,708 B2 | * | 2/2008 | Xu .......................... B08B 9/032 222/135 |
| 7,566,013 B2 | | 7/2009 | MacLean-Blevins |
| 2005/0045536 A1 | | 3/2005 | Hamada et al. |
| 2006/0157515 A1 | * | 7/2006 | Oswald .................... B67D 1/07 222/399 |
| 2009/0250527 A1 | | 10/2009 | Maclean-Blevins |
| 2009/0261122 A1 | | 10/2009 | Maclean-Blevins |
| 2010/0319804 A1 | | 12/2010 | Moretti et al. |
| 2012/0181345 A1 | | 7/2012 | Mueller |
| 2013/0214061 A1 | | 8/2013 | Maclean-Blevins |
| 2014/0374443 A1 | | 12/2014 | Young et al. |
| 2016/0059275 A1 | | 3/2016 | Smedley et al. |
| 2017/0097018 A1 | | 4/2017 | Wang |

OTHER PUBLICATIONS

Non-Final Office Action relating to U.S. Appl. No. 15/853,142 dated Aug. 31, 2018, 12 pages.
Non-Final Office Action relating to U.S. Appl. No. 15/853,154 dated Aug. 30, 2018, 11 pages.

* cited by examiner

FIG. 2
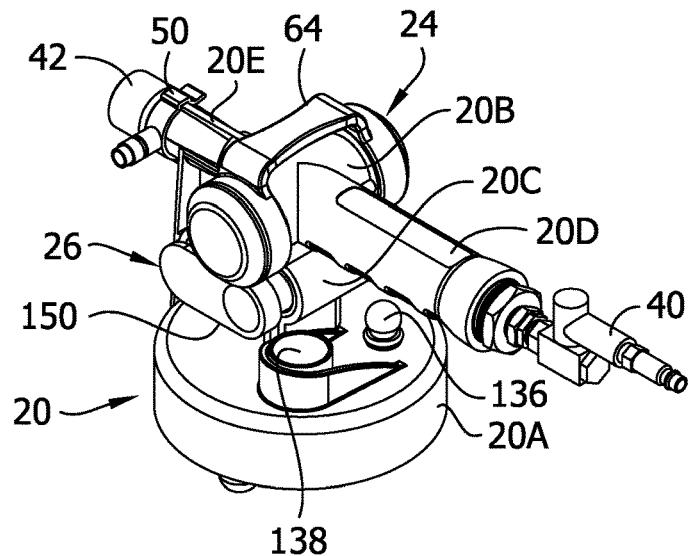
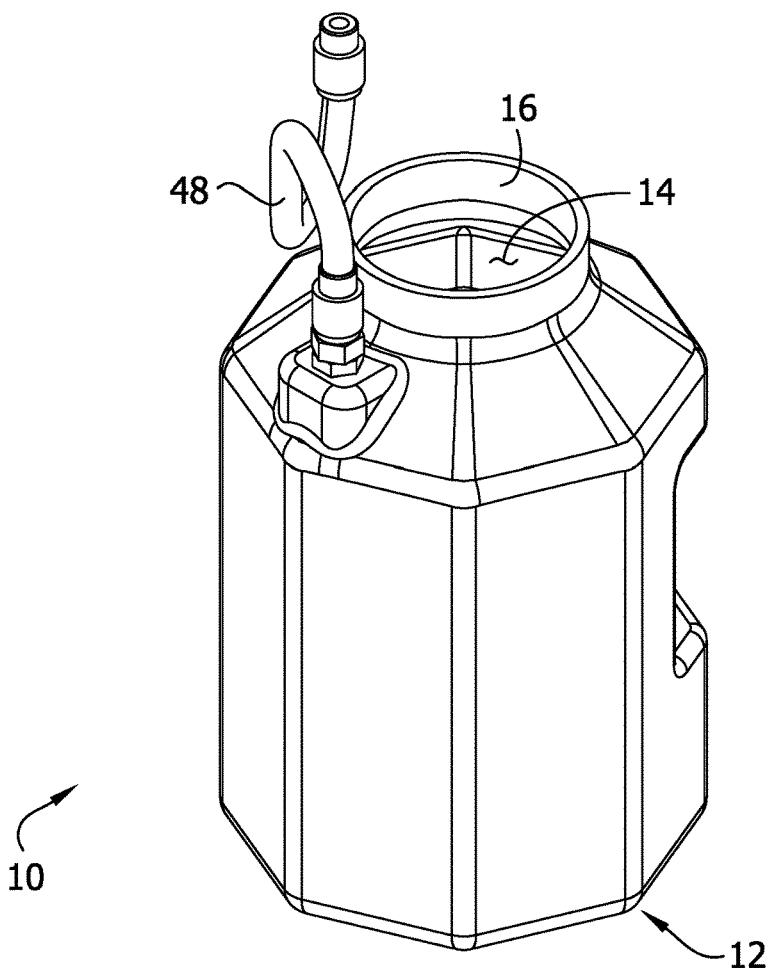

FLUID HANDLING DEVICE HAVING VALVE

FIELD

This disclosure generally relates to a liquid flow device for dispensing and/or evacuating liquid and more specifically to such a device having one or more valves.

BACKGROUND

Devices such as dispensers and evacuators that control the flow of liquid to and from a container are used in various ways. For example, in automotive shops evacuators are used to drain liquid from brake lines, transmissions, etc., while dispensers are used to dispense liquid into tanks, hoses, and other components. Other liquid flow devices are also used in other applications.

SUMMARY

In one aspect, a liquid flow device for selectively dispensing liquid or evacuating liquid from a source of liquid comprises a container defining an interior and an opening in fluid communication with the interior. A lid is configured to be mounted on the container over the opening. Passaging is supported by the container when the lid is mounted on the container. The passaging includes a gas supply passage configured to be fluidly connected to a source of pressurized gas. A pressurization passage is configured to be fluidly connected to the gas supply passage. The pressurization passage is positioned to deliver pressurized gas from the gas supply passage to the interior of the container when the lid is mounted on the container. An evacuation passage includes a venturi and is configured to be fluidly connected to the interior of the container when the lid is mounted on the container. The evacuation passage is configured to be fluidly connected to the gas supply passage to convey pressurized gas from the source of pressurized gas through the venturi to create a vacuum pressure in the interior of the container. A liquid passage is configured to be fluidly connected to the interior of the container and fluidly connected by the interior of the container to the pressurization passage and the evacuation passage when the lid is mounted on the container. A control valve is in fluid communication with and downstream from the gas supply passage and is in fluid communication with and upstream from the pressurization passage and the evacuation passage. The control valve is selectively adjustable between at least a dispensing configuration in which the control valve is configured to permit fluid communication between the gas supply passage and the pressurization passage and an evacuation configuration in which the control valve is configured to permit fluid communication between the gas supply passage and the evacuation passage.

In another aspect, a pneumatic liquid dispenser for dispensing liquid comprises a container having an interior for receiving the liquid therein and defining an opening in fluid communication with the interior of the container. A lid is configured to be mounted on the container over the opening. Passaging is supported by the container when the lid is mounted on the container. The passaging includes a gas supply connector. The gas supply connector defines a gas supply inlet of the pneumatic liquid dispenser. The passaging includes a gas outlet and defines a gas flow path from the gas supply inlet to the gas outlet. The gas outlet is positioned to deliver pressurized gas from the passaging to the interior of the container when the lid is mounted on the container. A pressure valve is fluidly connected with the passaging. The pressure valve includes a valve member in the gas flow path between said gas supply inlet of the pneumatic liquid dispenser and said gas outlet of the passaging. The pressure valve is configured to automatically adjust the valve member to permit gas flow along the gas flow path when pressure in the interior of the container is less than a threshold pressure and to block gas flow along the gas flow path when pressure in the interior of the container is greater than the threshold pressure. A liquid passage is configured to be fluidly connected to the interior of the container, and fluidly connected by the interior of the container to the passaging when the lid is mounted on the container.

In still another aspect, a liquid dispenser and evacuation device comprises a container having an interior for receiving liquid therein and defining an opening in fluid communication with the interior of the container. A lid is configured to be mounted on the container over the opening. Passaging is supported by the container when the lid is mounted on the container. The passaging includes a gas supply inlet and a venturi configured to generate vacuum pressure. The passaging is configured to be in fluid communication with the interior of the container when the lid is mounted on the container. A control valve is in fluid communication with the passaging when the lid is mounted on the container. The control valve is adjustable to a dispensing configuration in which the control valve permits gas flow through the passaging from the gas supply inlet to the interior of the container when the lid is mounted on the container, and the control valve is adjustable to an evacuation configuration in which the control valve permits gas flow through the passaging from the gas supply inlet to the venturi to create vacuum pressure in the interior of the container when the lid is mounted on the container. A mode selector valve is in fluid communication with the passaging when the lid is mounted on the container. The mode selector valve is adjustable to a dispensing configuration in which the mode selector valve blocks gas flow through the passaging to prevent the venturi from creating vacuum pressure in the interior of the container, and the mode selector valve is adjustable to an evacuation configuration in which the mode selector valve blocks gas flow through the passaging from the gas supply inlet to the interior of the container.

In yet another aspect, a liquid flow device for selectively dispensing liquid or evacuating liquid comprises a container defining an interior and an opening in fluid communication with the interior. A lid is configured to be mounted on the container over the opening. Passaging is supported by the container when the lid is mounted on the container. The passaging includes a gas supply passage configured to be fluidly connected to a source of pressurized gas. A pressurization passage is configured to be fluidly connected to the gas supply passage. The pressurization passage is positioned to deliver pressurized gas from the gas supply passage to the interior of the container when the lid is mounted on the container. An evacuation passage includes a venturi and is configured to be fluidly connected to the interior of the container when the lid is mounted on the container. The evacuation passage is configured to be fluidly connected to the gas supply passage to convey pressurized gas from the source of pressurized gas through the venturi to create vacuum pressure in the interior of the container. A liquid passage is configured to be fluidly connected to the interior of the container and fluidly connected by the interior of the container to the pressurization passage and the evacuation passage when the lid is mounted on the container. A mode selector valve is fluidly connected to the pressurization passage and the evacuation passage. The mode selector valve is adjustable between a dispensing mode configuration and an evacuation mode configuration. The mode selector valve in the dispensing mode configuration blocks gas flow in the evacuation passage, and the mode selector valve in the evacuation mode configuration blocks gas flow in the pressurization passage.

Other aspects will be in part apparent and in part pointed out hereinafter.

BRIEF DESCRIPTION OF THE DRAWINGS

FIG. 2 is a perspective of the liquid flow device with a lid thereof exploded away from a container thereof;

Corresponding reference characters indicate corresponding parts throughout the drawings.

DETAILED DESCRIPTION

Figure 1:
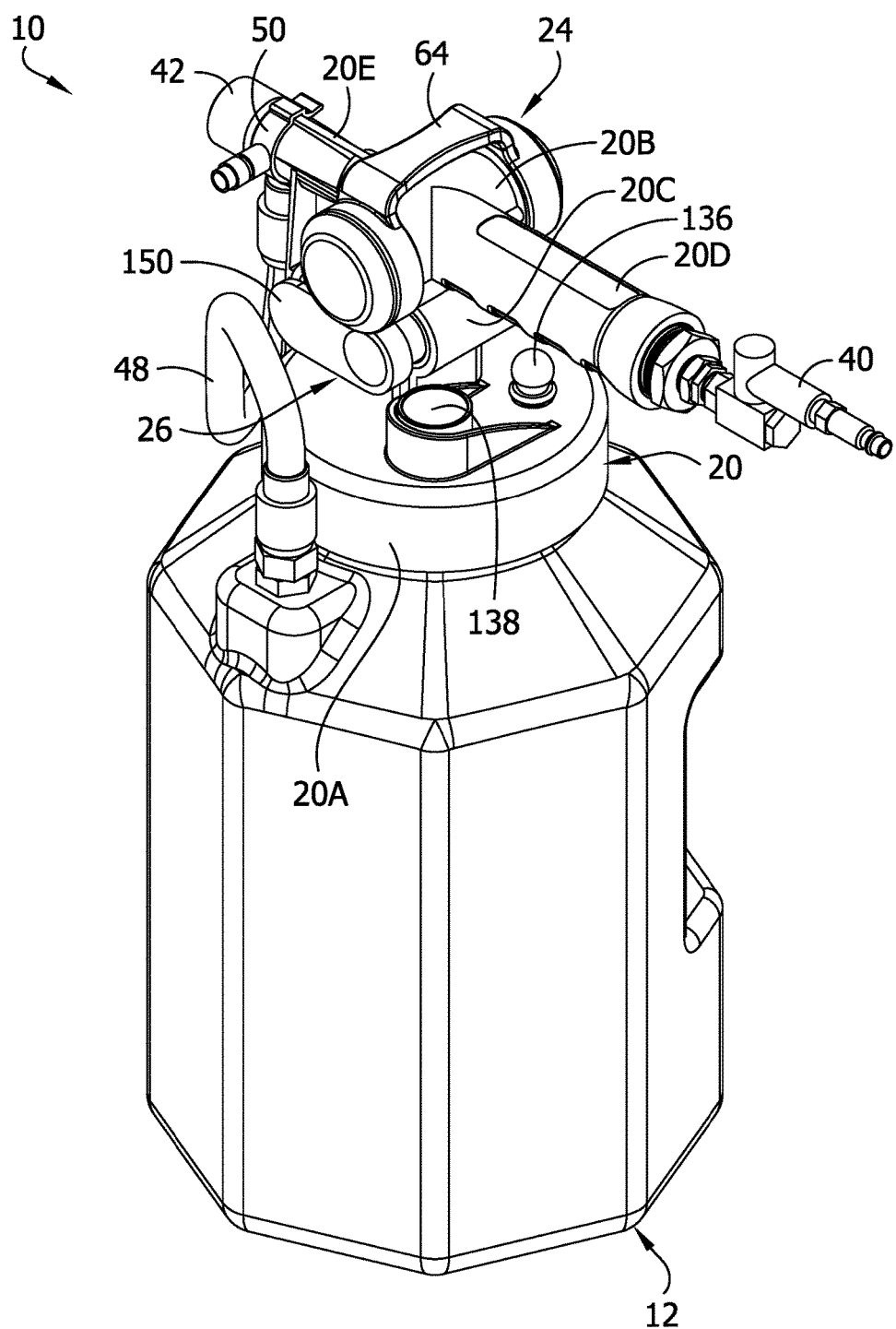
FIG. 1 is a perspective of a liquid flow device.
Figure 3:
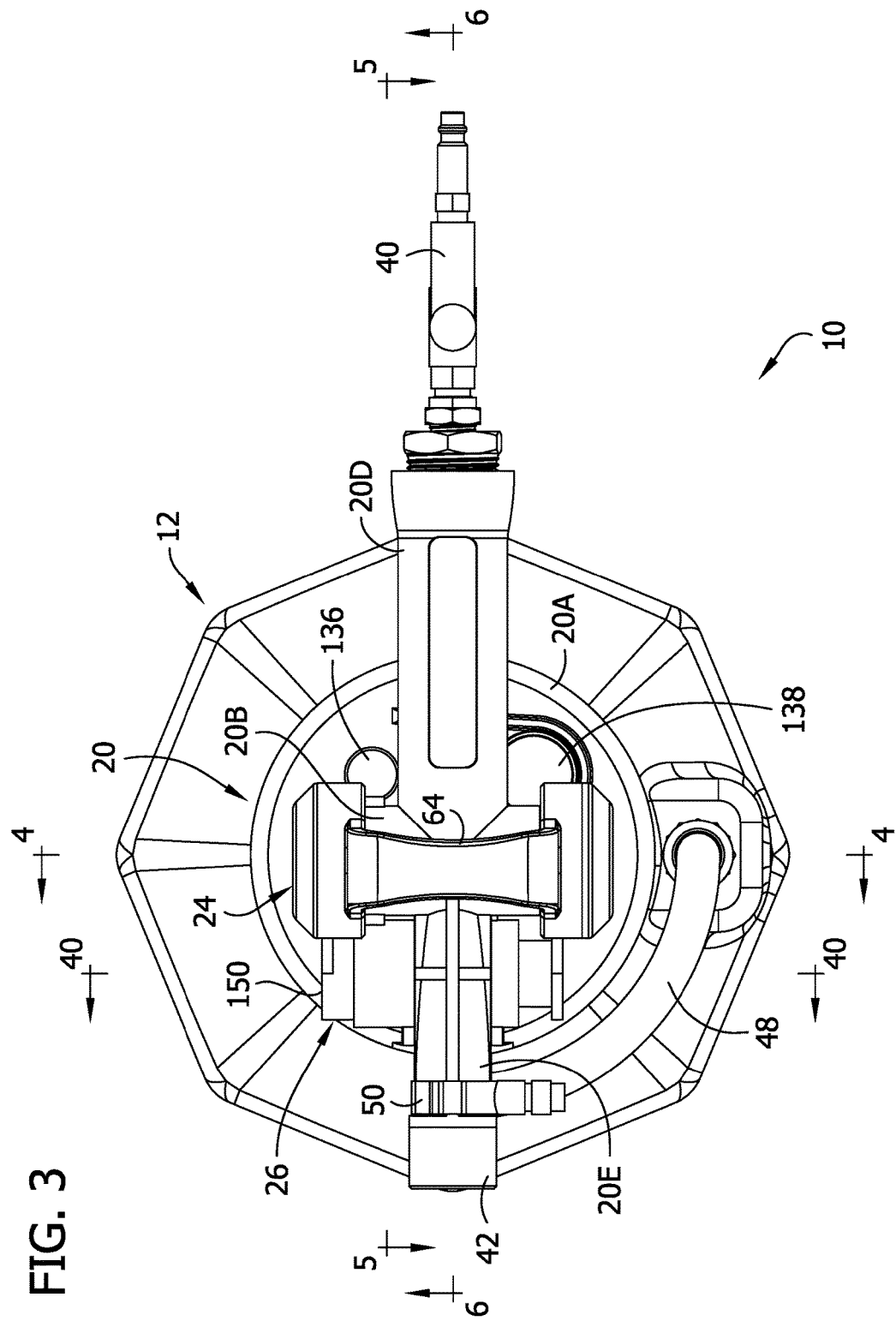
FIG. 3 is top plan view of the liquid flow device.

Referring to FIGS. 1-6, one embodiment of a liquid flow device is generally indicated at reference number 10. As will be appreciated, the illustrated device 10 is a multimodal flow device that is switchable between a dispensing mode in which the device dispenses liquid from a container, generally indicated at 12, and an evacuation mode in which the device evacuates liquid from an outside source of liquid into the container 12. Thus, the illustrated liquid flow device can be referred to as a dispenser-evacuator or dispenser and evacuator. It will be understood, however, that aspects of the invention can also be used with other kinds of liquid flow devices, such as other types of multimodal flow devices, dispensers, evacuators, etc.

In the illustrated embodiment, the container 12 has a bottle configuration, but the liquid flow device can include containers having other configurations in other embodiments. The container 12 defines an interior 14 and an opening 16 at a top of the container in fluid communication with the interior. The top of the container 12 includes a threaded collar around the opening 16 that is configured to mount a lid of the liquid flow device 10, which is generally indicated at reference number 20.

The liquid flow device 10 comprises passaging, which is indicated generally at 22 in the schematic flow diagrams shown in FIGS. 7-12 and includes a plurality of passages 22A-22D indicated throughout the drawings. In general, the passaging 22 is configured to be connected to a source of pressurized gas (e.g., compressed air from an air compressor) that drives liquid flow into the container 12 when the device 10 is operating in the evacuation mode, or out of the container when the device is operating in the dispensing mode. As will be explained below, a gas flow path GP and a liquid flow path LP (FIGS. 7-12) through the passaging 22 is selectively adjustable using an adjustable control valve, generally indicated at 24, and an adjustable mode selector valve, generally indicated at 26. In addition, an automatic pressure valve, generally indicated at 27 (FIG. 4), is configured to limit pressure in the container 12 and thereby affects fluid flow through the device 10. Before describing the details of construction of the passaging 22, control valve 24, mode selector valve 26, and pressure valve 27 in the illustrated flow control device 10, the basic function and capabilities of these elements will be generally described in reference to the schematic flow diagrams of FIGS. 7-12. It will thus be understood that the details of construction of the passaging 22, control valve 24, and/or mode selector valve 26 can vary from those shown in FIGS. 1-6 and 8-42 without departing from the scope of the invention. Furthermore, it will be understood that one or more of the control valve, mode selector valve, and pressure valve can be can be omitted or used with a liquid flow device of a different purpose without departing from the scope of the invention.

Figure 7:
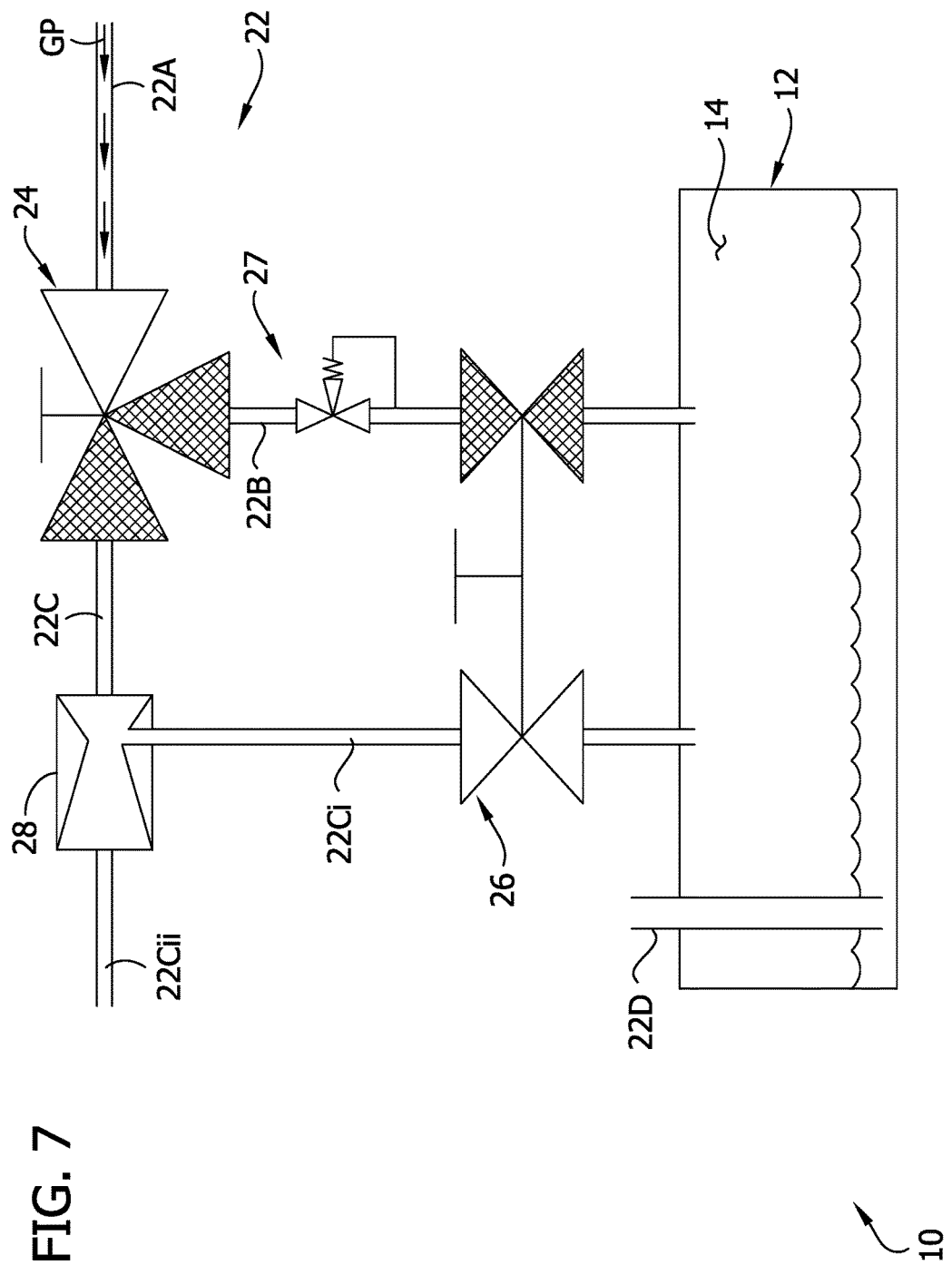
FIG. 7 is a schematic flow diagram of the liquid flow device when a control valve thereof is in a closed configuration.
Figure 11:
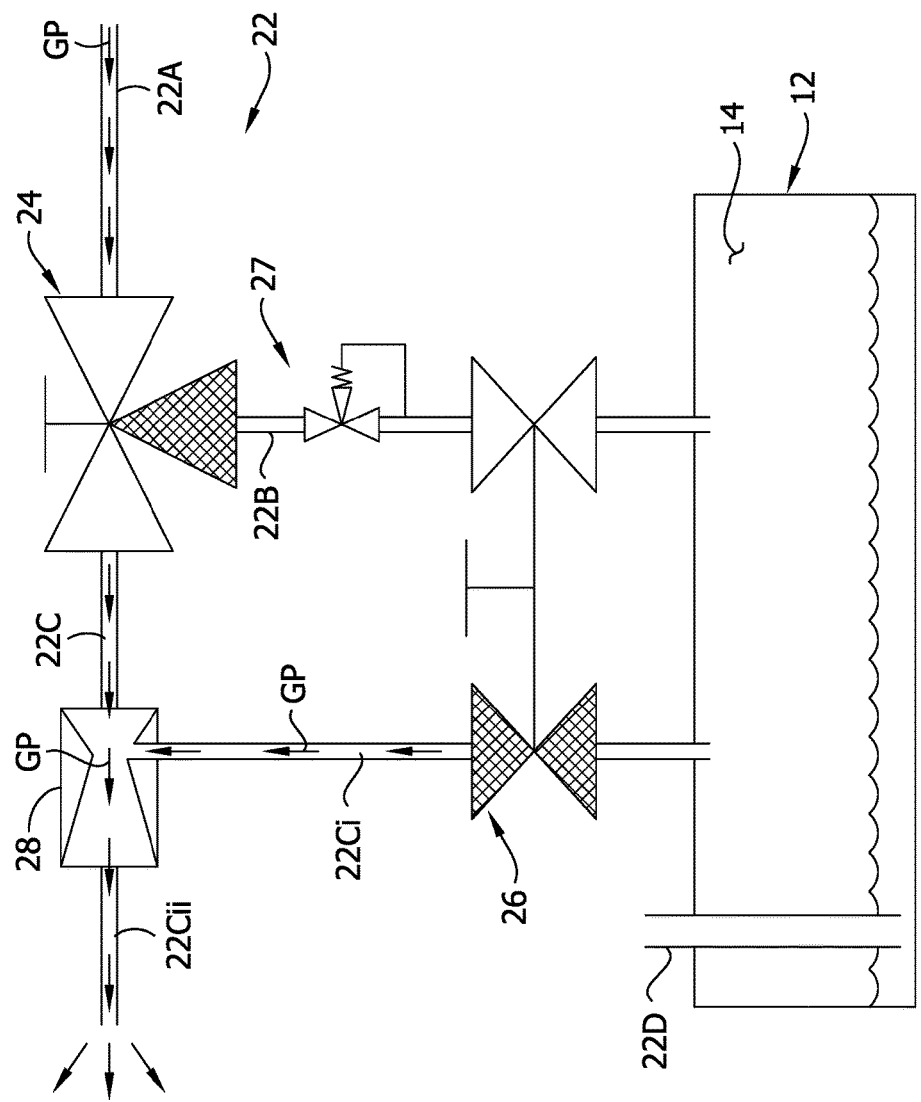
FIG. 11 is a schematic flow diagram of the liquid flow device when the control valve is in an evacuation configuration and the mode selector valve is in the dispensing mode position.
Figure 12:
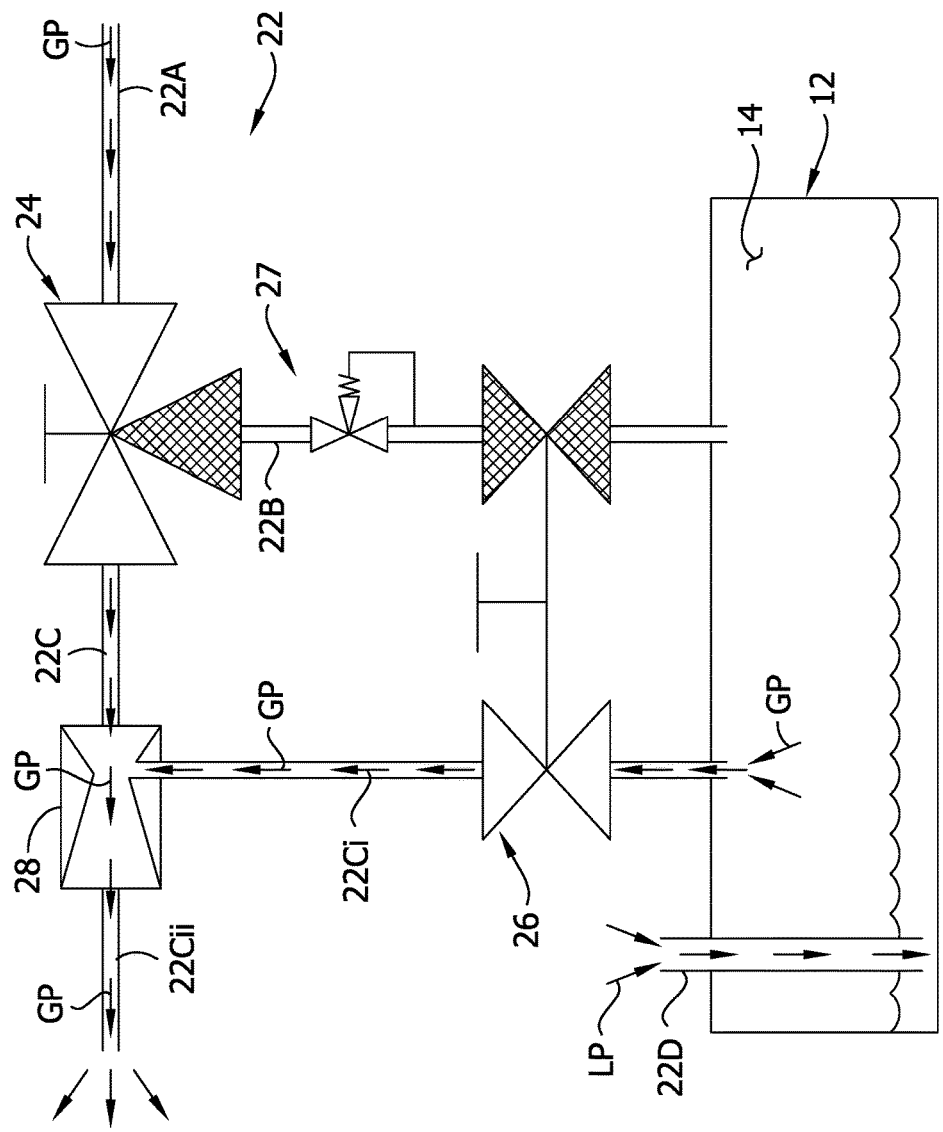
FIG. 12 is a schematic flow diagram of the liquid flow device when the control valve is in an evacuation configuration and the mode selector valve is in the evacuation mode position.

Referring to FIG. 7, the passaging 22 includes a gas supply passage 22A including a gas supply connector (broadly, gas supply inlet) that is configured to be fluidly connected to a source of pressurized gas (e.g., a compressed air hose). A pressurization passage 22B and an evacuation passage 22C are each fluidly connected to the interior 14 of the container 12 and configured to be fluidly connected to the gas supply passage 22A as described in further detail below. The evacuation passage 22C includes a flow restriction 28 (e.g., a venturi fitting) and is bifurcated at the flow restriction between an evacuation leg 22Ci and an exhaust leg 22Cii. The flow restriction 28 is configured so that gas flowing across the flow restriction creates a vacuum pressure in the evacuation leg 22Ci (FIGS. 11-12). Gas flowing through the evacuation passage 22C is exhausted through the exhaust leg 22Cii. Although the evacuation leg 22Ci is illustrated as communicating with the interior of the container separately from the pressurization passage 22B (i.e., the outlet of the pressurization passage 22B to the container interior is different than the inlet of the evacuation leg 22Ci from the container interior), it will be appreciated that in other embodiments the evacuation leg 22Ci could join with or be the same as the pressurization passage 22B such that the passages communicate with the interior of the container via a shared inlet/outlet opening. The passaging 22 further includes a liquid passage 22D that is fluidly connected to the interior 14 of the container 12. The interior 14 of the container 12 fluidly connects the pressurization passage 22B and the evacuation passage 22C to the liquid passage 22D. In the dispensing mode, liquid exits the interior 14 through the liquid passage 22D, and in the evacuation mode, liquid enters the interior through the liquid passage. It will be understood that in certain embodiments the liquid flow device could include more than one liquid passage, e.g., separate liquid passages for dispensing and evacuation.

The control valve 24 is configured to selectively connect the gas supply passage 22A to the pressurization passage 22B and the evacuation passage 22C. In FIGS. 7-12, the control valve 24 is shown schematically as a manual three-way valve. Various types of control valves can be used without departing from the scope of the invention. The control valve 24 is fluidly connected to the passaging and is selectively adjustable to a closed configuration, to a dispensing configuration, and to an evacuation configuration. In the closed configuration (FIG. 7), the control valve 24 blocks fluid communication between the gas flow passage 22A to both the pressurization passage 22B and the evacuation passage 22C. In the dispensing configuration (FIGS. 8-10), the control valve 24 permits fluid communication between the gas supply passage 22A and the pressurization passage 22B and blocks fluid communication between the gas supply passage and the evacuation passage 22C. In the evacuation configuration (FIGS. 11-12), the control valve 24 permits fluid communication between the gas supply passage 22A and the evacuation passage 22C and blocks fluid communication between the gas supply passage and the pressurization passage 22B. In certain embodiments, the control valve 24 can be adjustable in the dispensing configuration and/or evacuation configuration to throttle the flow rate of gas from the gas supply passage 22A into the pressurization passage 22B or the evacuation passage 22C, respectively.

The pressure valve 27 is provided along the pressurization passage 22B and is configured to block fluid communication through the pressurization passage in response to a pressure in the pressurization passage or the container 12. In FIGS. 7-12, the pressure valve 27 is schematically represented to be a normally-open, spring-biased needle valve responsive to pressure in a segment of the pressurization passage 22B located between the pressure valve and the mode selector valve 26. It will be understood that other types of pressure valves could be used without departing from the scope of the invention.

The mode selector valve 26 is fluidly connected to the pressurization passage 22B downstream of the control valve 24 and the pressure valve 27, and fluidly connected to the evacuation leg 22Ci of the evacuation passage 22C upstream from the interior 14. The mode selector valve 26 is adjustable to a dispensing mode configuration and an evacuation mode configuration. In FIGS. 7-12, the mode selector valve 26 is schematically illustrated as two valves, one for the pressurization passage 22B and another for the evacuation passage 22C, which are linked for conjoint inverse manual actuation. In other words, actuation of the two valves 26 is linked so that, when one valve is opened, the other valve is closed, and vice versa. When the mode selector valve 26 is manually adjusted to be in the dispensing mode configuration (FIGS. 9-11), the mode selector valve blocks fluid flow through the evacuation leg 22Ci of the evacuation passage 22C and permits fluid flow through the pressurization passage 22B (e.g., the valve along the evacuation passage is closed and the valve along the pressurization passage is open). When the mode selector valve 26 is manually adjusted to be in the evacuation mode position (FIGS. 7-8 and 12), the mode selector valve blocks fluid flow through the pressurization passage 22B and permits fluid flow through the evacuation leg 22Ci of the evacuation passage 22C (e.g., the valve along the evacuation passage is open and the valve along the pressurization passage is closed). As explained below, in certain embodiments, the mode selector valve 26 comprises two sliding-spool valves having spools joined by a bridge structure to be actuated in a conjoint manner such that when one sliding-spool valve is open the other is closed for inverse operation. It will be understood that mode selector valves having other configurations (e.g., other types of valves) can be used without departing from the scope of the present invention.

Various use cases of the liquid flow device 10 based on the configurations of the valves 24, 26, 27 as shown in FIGS. 7-12 will now be briefly described. In FIGS. 7-12 fluid communication blockage is represented by a diagonal grid pattern in the schematic symbol for the valve.

FIG. 7 depicts a configuration of the liquid flow device 10 in which the control valve 24 is in the closed configuration. Pressurized gas flows into gas supply passage 22A along the gas flow path GP and is blocked by the control valve 24 from flowing into either of the pressurization passage 22B and the evacuation passage 22C. In the illustrated embodiment, the liquid flow device 10 is configured so that the pressurized gas dead-ends at the closed control valve, but the pressurized gas could be suitably exhausted without departing from the scope of the invention.

Figure 8:
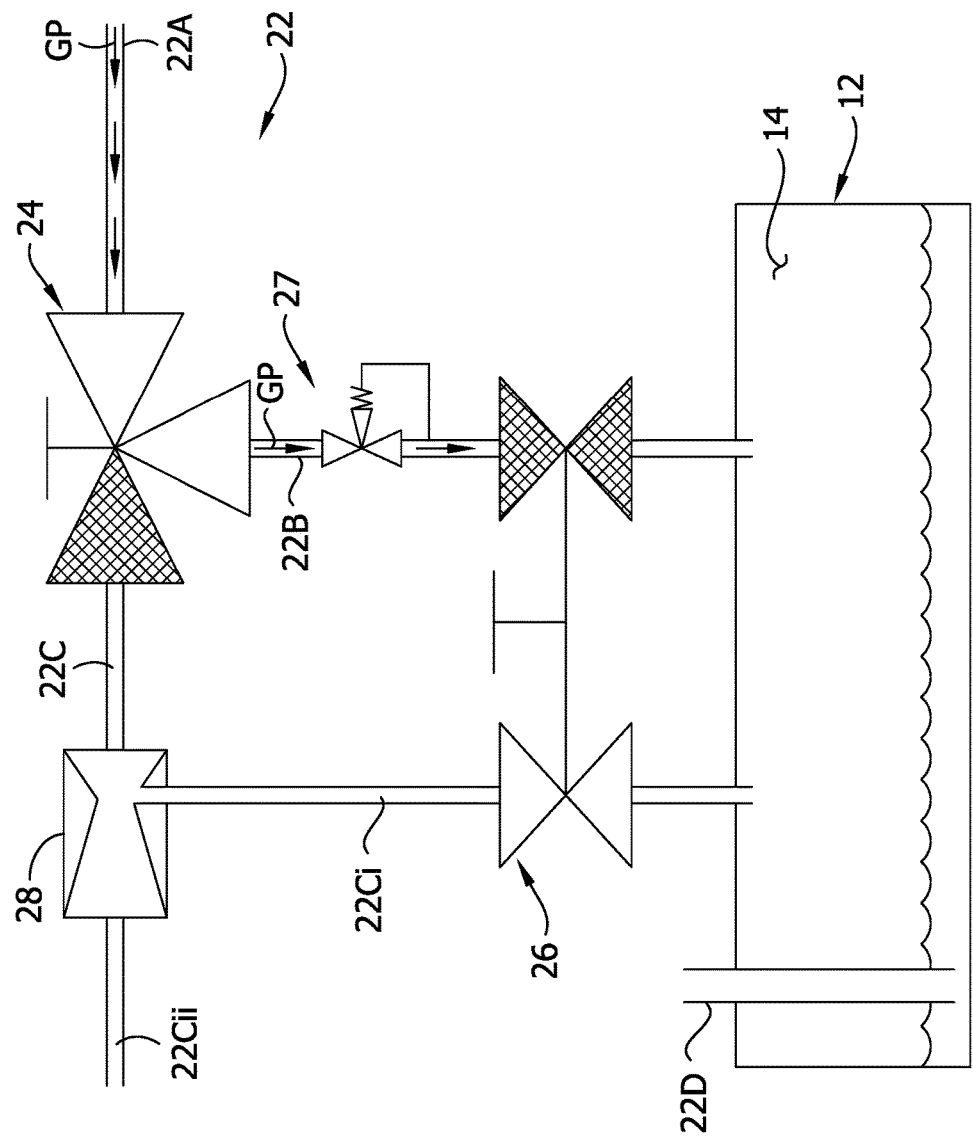
FIG. 8 is a schematic flow diagram of the liquid flow device when the control valve is in a dispensing configuration and a mode selector valve thereof is in an evacuation mode position.

FIG. 8 depicts a configuration of the liquid flow device 10 in which the control valve 24 is in the dispensing configuration but the mode selector valve 26 is in the evacuation mode configuration. Pressurized gas flows along the gas flow path GP into the gas supply passage 22A, through the control valve 24, and into a segment of the pressurization passage 22B upstream of the mode selector valve 26, but the mode selector valve 26 blocks the gas from flowing through the pressurization passage into the container 12. The control valve 24 also blocks the pressurized gas from flowing into the evacuation passage 22C. In the illustrated embodiment, the liquid flow device 10 is configured so that the pressurized gas dead-ends at the mode selector valve 26, but the pressurized gas could be exhausted without departing from the scope of the invention. Providing the mode selector valve 26 in addition to the control valve 24 prevents a sudden switch from the evacuation mode to the dispensing mode by an inadvertent adjustment to the control valve 24 without a corresponding adjustment being made to the mode selector valve 26. The mode selector valve 26 can thus prevent the liquid flow device from being used in a dispensing mode even when the control valve 24 is in the dispensing configuration. If the device 10 were operated in the configuration of FIG. 8 for long enough, pressure in the upstream segment of the pressurization passage 22B might build and automatically close the pressure valve 27.

Figure 9:
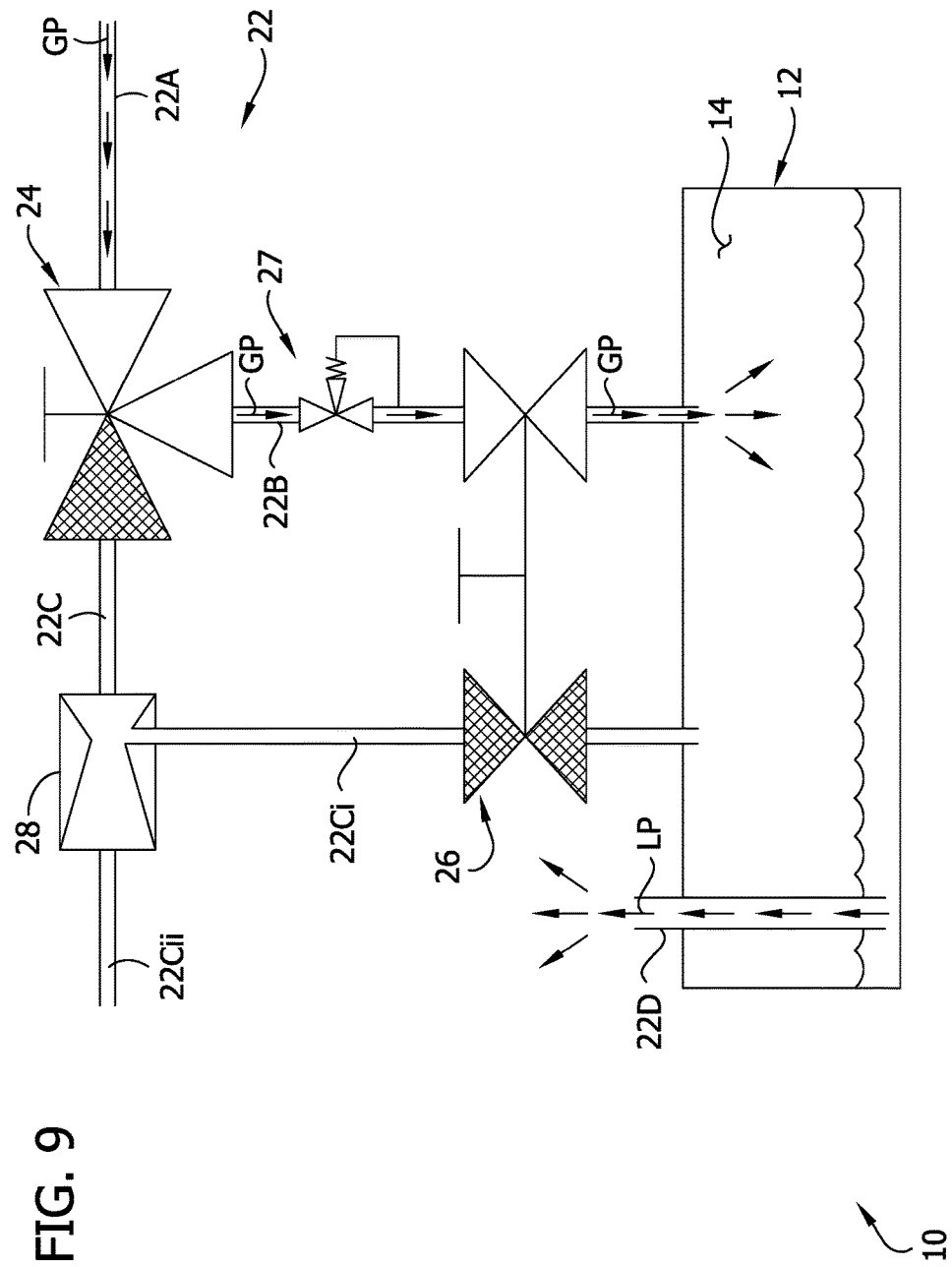
FIG. 9 is a schematic flow diagram of the liquid flow device when the control valve is in the dispensing configuration and the mode selector valve is in a dispensing mode position.

Referring to FIG. 9, when the mode selector valve 26 is switched from the evacuation mode configuration to the dispensing mode configuration and the control valve 24 is in the dispensing configuration, the liquid flow device 10 transitions to the dispensing mode. In the dispensing mode, pressurized gas flows along the flow path GP through the gas supply passage 22, control valve 24 (which blocks flow into the evacuation passage 22C), and pressurization passage 22B into the interior 14 of the container 12. The pressurized gas flowing along the flow path GP builds positive pressure in the interior 14 of the container 12, which forces liquid in the container to flow along a liquid flow path LP through the liquid channel 22D, thus dispensing the liquid from the device 10.

Figure 10:
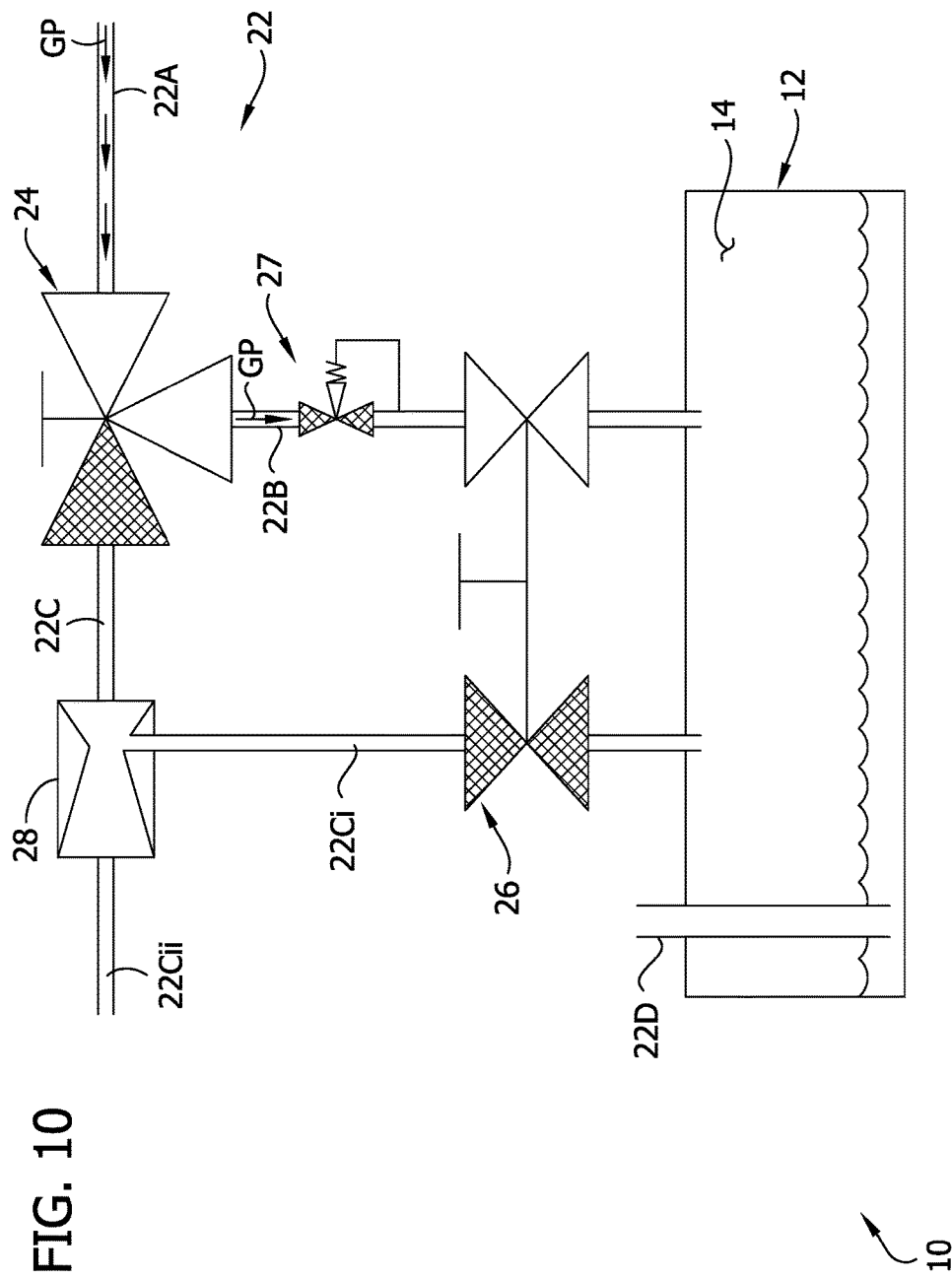
FIG. 10 is a schematic flow diagram of the liquid flow device in a configuration similar to FIG. 9 but when a pressure valve of the liquid flow device is in a closed configuration.

Referring to FIG. 10, if pressure in the container 12 rises and causes pressure in the pressurization passage 22B to exceed a threshold, the pressure valve 27 automatically closes. With the pressure valve 27 closed, the pressure valve blocks gas from flowing into the container 12 through the pressurization passage 22B. In the illustrated embodiment, the liquid flow device 10 is configured so that the pressurized gas dead-ends at the pressure valve 27, but the pressurized gas could be exhausted without departing from the scope of the invention. Residual pressure in the container 12 may cause liquid to be dispensed through the liquid passage 22D, even while the pressure valve 27 is closed. If the pressure drops below the threshold, the pressure valve 27 will open, causing the liquid flow device 10 to return to the dispensing mode configuration shown in FIG. 9. Based on the gas pressure in the pressurization passage 22B, the pressure valve 27 may be partially open such that gas flow is permitted through the pressurization passage but restricted by the pressure valve. Accordingly, the pressure valve 27 automatically limits gas pressure in the interior 14 of the container 12. For example, the pressure valve 27 may be configured to close in the inclusive range of about 16 psi to about 20 psi.

Referring to FIG. 11, when the control valve 24 is adjusted to the evacuation configuration without adjusting the mode selector valve 26 to the evacuation mode configuration, there is no fluid communication between the gas supply passage 22A and the container 12. The control valve 24 blocks gas flow into the pressurization passage 22B and directs gas flow along the path GP into the evacuation passage 22C. The gas flows along the flow path GP through the flow restriction 28 and out the exhaust leg 22Cii, creating a vacuum pressure in the evacuation leg 22Ci. However, the mode selector valve 26 blocks communication of the vacuum pressure to the interior 14 of the container 12. Thus, the liquid flow device 10 is configured to prevent a sudden switch from the dispensing mode to the evacuation mode by an inadvertent adjustment to the control valve 24 without a corresponding adjustment also being made to the mode selector valve 26.

Referring to FIG. 12, when the mode selector valve 26 is switched from the dispensing mode configuration to the evacuation mode configuration while the control valve 26 is in the evacuation configuration, the liquid flow device transitions to the evacuation mode. In the evacuation mode, pressurized gas flows along the flow path GP through the gas supply passage 22A, control valve 24 (which blocks flow into the pressurization passage 22B), and evacuation passage 22C. The gas flows further along the flow path GP through the flow restriction 28 and out the exhaust leg 22Cii. The gas flow through the restriction 28 creates a vacuum pressure in the evacuation leg 22Ci that is communicated through the mode selector valve 26 and into the interior 14 of the container 12. The vacuum pressure in the container 12 creates vacuum pressure in the liquid passage 22D, which causes liquid to be drawn into the container along the flow path LP through the liquid passage.

Having described certain general configurations and uses of the liquid flow device 10, the components of the illustrated device will now be described in greater detail. Referring to FIGS. 4-6 and 13-15, the lid 20 of the illustrated device 10 comprises a one-piece lid body that is shaped and arranged to include a closure 20A, a control valve housing 20B, a mode selector valve housing 20C, a gas inlet conduit 20D, a gas outlet conduit 20E, a pressurization conduit 20F, and an evacuation conduit 20G. Desirably, the lid 20 is formed as one piece in an injection molding process. Components of the lid can be referred to as being defined by a unitary piece of material, or being formed to be one piece of material, such as a plastic material. Moreover, components of the lid can be referred to as non-removably fixed to each other. The shape and arrangement of the lid 20 is amenable to injection molding and is configured for connection of additional components that enable the liquid flow device 10 to function as described above. Although the illustrated lid 20 includes various features formed as one piece of material, it will be understood that components of the lid could also be formed as separate parts without departing from the scope of the present invention. Moreover, components illustrated as being mounted on the lid could instead be mounted on the container.

The closure 20A of the lid 20 includes an internally threaded collar that is configured to be threaded onto a threaded neck of the container 12 and a wall that extends over the opening 26 when the collar is threaded onto the container. The closure 20A supports an O-ring 30 that is configured to provide a fluid seal between the lid 20 and the container 12 when the lid is mounted on the container. The fluid seal provided by the O-ring 30 is desirably maintains operating pressures in the container interior 14 during use.

Figure 15:
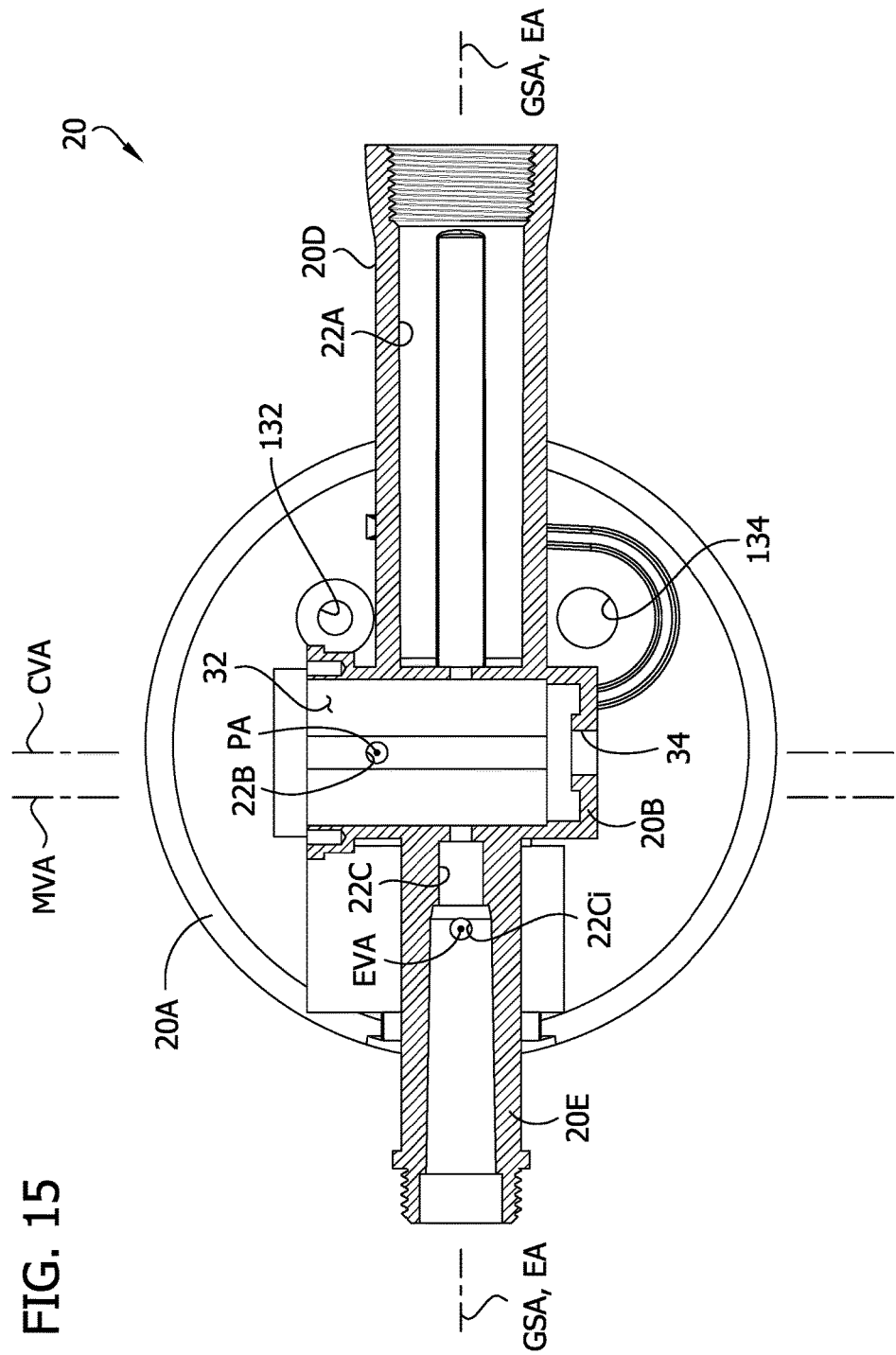
FIG. 15 is a cross section taken in a plane including line 15-15 of FIG. 14.

The closure 20A defines a safety valve orifice 132 and a pressure gauge orifice 134 (FIG. 15). As shown in FIGS. 1 and 2, a safety valve 136 is mounted on the closure 20A in communication with the interior 14 of the container 12 through the safety valve orifice 132 to automatically relieve pressure in the interior of the container when the pressure exceeds a threshold. Any suitable normally-closed valve that opens in response to a pressure in the interior 14 of the container 12 can be used for the safety valve 136. Desirably, the safety valve 136 has a higher threshold pressure (e.g., the pressure at which the valve automatically opens) than the pressure valve 27 and thus serves as a backup to relieve pressure if the pressure valve fails. A pressure gauge 138 is mounted on the lid 20 at the pressure gauge orifice 134. The pressure gauge 138 is fluidly connected to the interior 14 through the orifice 134 and is configured to display an indication of the pressure inside the container 12 to a user.

Figure 13:
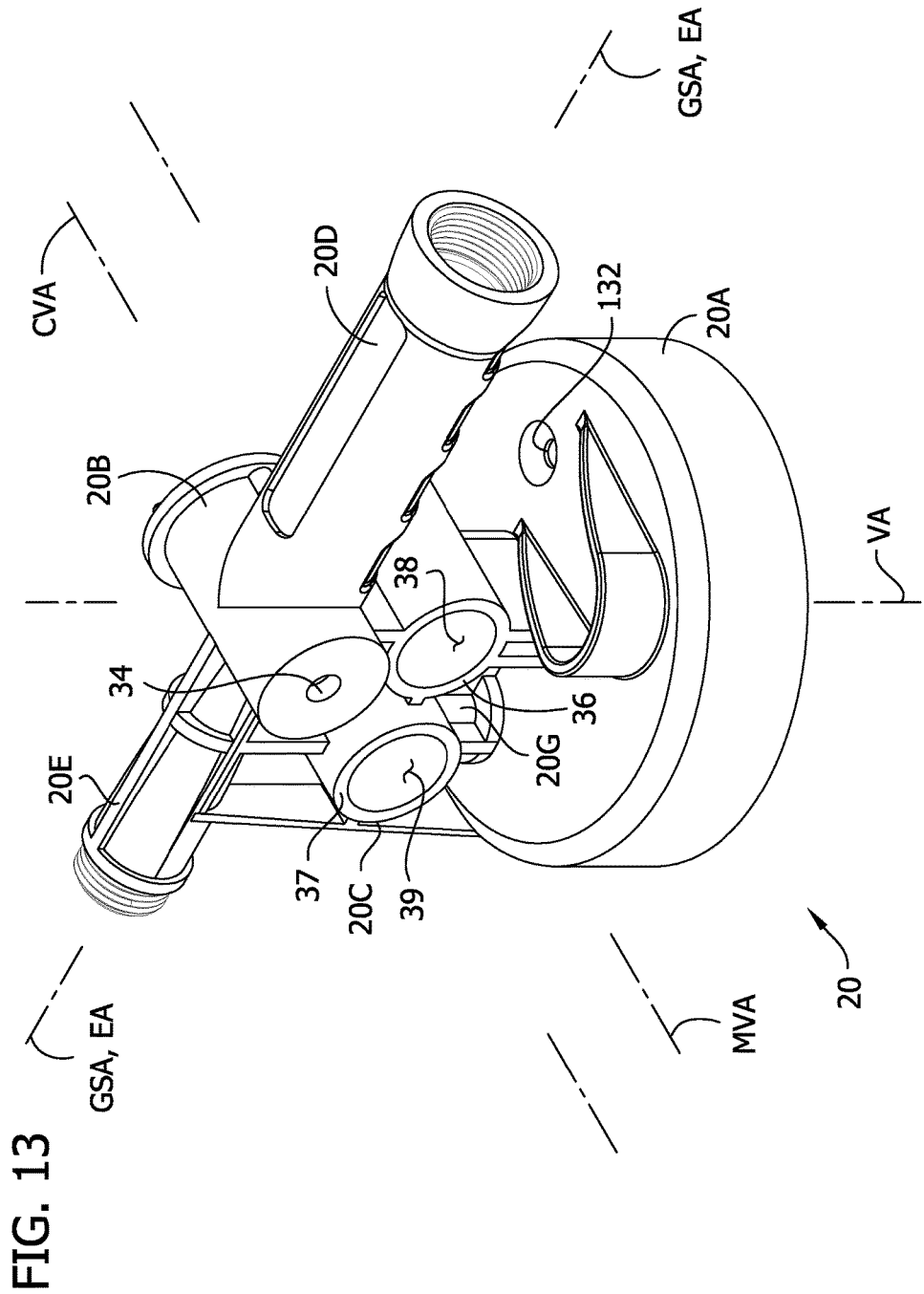
FIG. 13 is a perspective of the lid.
Figure 14:
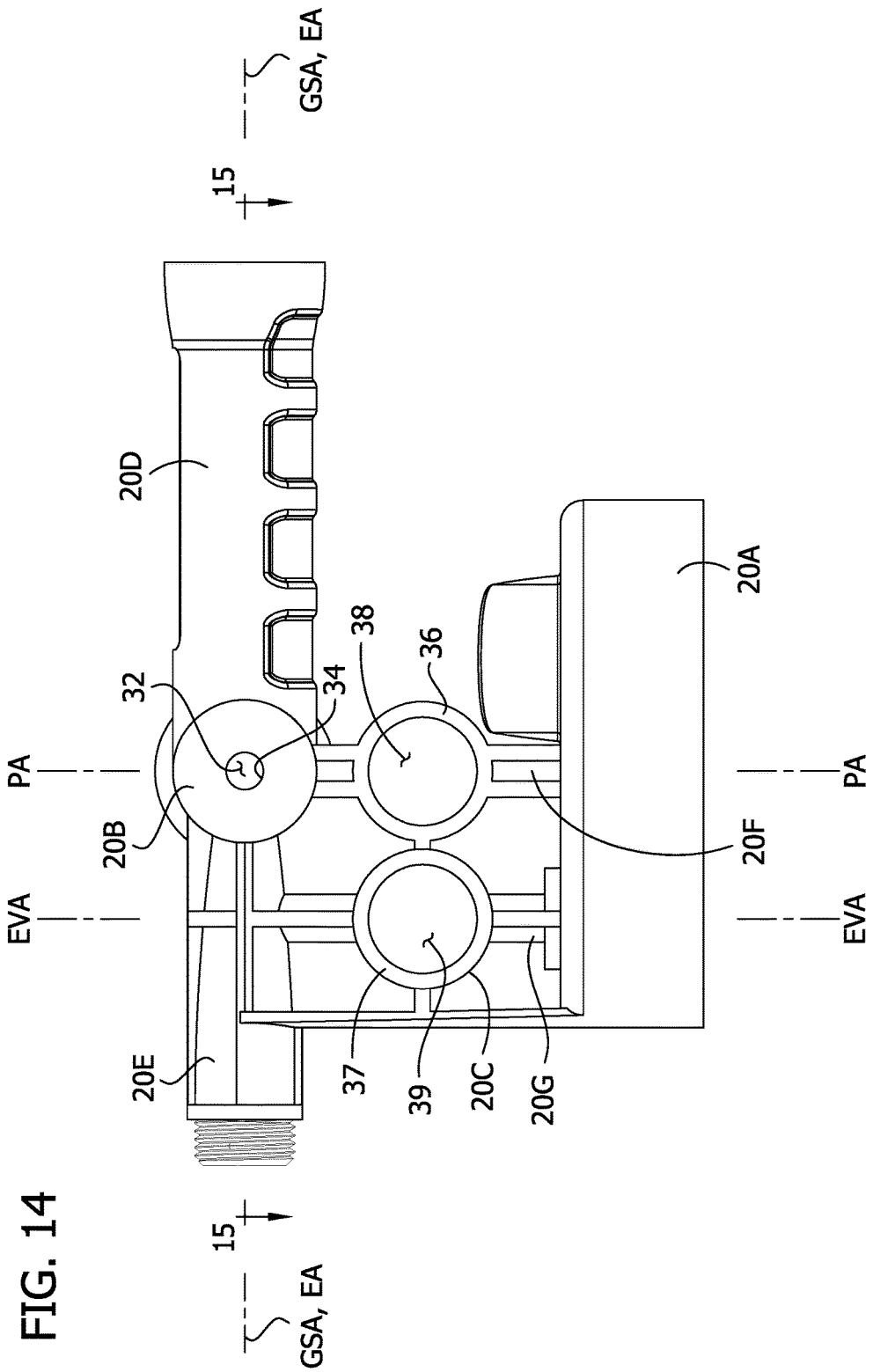
FIG. 14 is a side elevation of the lid.

Referring to FIGS. 13-15, the control valve housing 20B is spaced apart from the closure 20A along a vertical axis VA such that when the lid 20 is mounted on the container 12 the closure is located between the control valve housing and the container. The control valve housing 20B has a generally cylindrical shape that extends along a control valve axis CVA generally perpendicular (e.g., transverse) to the vertical axis VA and defines a generally cylindrical control valve receptacle 32 that has one open end and another substantially closed end spaced apart along the control valve axis. The substantially closed end of the control valve housing 20B defines a hole 34. As explained in further detail below, the control valve housing 20B is shaped and arranged to receive the control valve 24 in the receptacle 32 such that the control valve can be actuated through the hole 34. As will become apparent, the control valve housing 20B also functions as a valve housing of the pressure valve 27.

The mode selector valve housing 20C is located between the closure 20A and the control valve housing 20B along the vertical axis VA. The mode selector valve housing 20C includes a pair of tubes 36, 37 defining open-ended receptacles 38, 39 extending generally parallel to a mode selector valve axis MVA. The mode selector valve axis MVA is oriented generally parallel to the control valve axis CVA and generally perpendicular (e.g., transverse) to the vertical axis VA. The receptacles 38, 39 are spaced apart from one another in a direction generally perpendicular (e.g., transverse) to the vertical axis VA and the mode selector valve axis MVA. As explained in further detail below, the mode selector valve housing 20C is shaped and arranged to operatively receive respective portions of the mode selector valve 26 in each of the receptacles 38, 39.

The gas supply conduit 20D extends generally along a gas supply axis GSA from a first (upstream) end portion including a gas supply connector 20D' that is configured to be connected to a gas supply fitting 40 (e.g., a compressed air fitting; FIGS. 1-6) to a second (downstream) end portion adjoined to the control valve housing 20B. In the illustrated embodiment, the gas supply connector 20D' is an internally threaded connector configured to receive a male threaded connector of the gas supply fitting 40. The gas supply connector 20D' defines a gas supply inlet of the device 10. Other gas supply connectors (e.g., threaded male, non-threaded male, non-threaded female, etc.) can be used instead of the connector 20D' without departing from the scope of the present invention. The gas supply axis GSA extends generally perpendicular (e.g., transverse) to the vertical axis VA, the control valve axis CVA, and the mode selector valve axis MVA. The gas supply conduit 20D defines at least a portion of the gas supply passage 22A and is shaped and arranged so that the gas supply passage is in fluid communication with the control valve receptacle 32 (FIG. 15). Pressurized gas, such as compressed air, is supplied to the gas supply conduit 20D through the fitting 40, and the gas supply conduit directs the pressurized gas into the control valve receptacle 32 where flow is controlled by the control valve 24 as described below.

The exhaust conduit 20E extends generally along an exhaust axis EA from a first (upstream) end portion that is adjoined to the control valve housing 20B to a second (downstream) end portion that is configured to be connected to a muffler 42 (broadly, an exhaust outlet; FIGS. 1-6). In the illustrated embodiment, the exhaust axis EA is substantially coaxial with the gas supply axis GSA, but other embodiments can have other orientations without departing from the scope of the invention. The exhaust conduit 20E defines the exhaust leg 22Ci of the evacuation passage 22C and is shaped and arranged so that the evacuation passage is in fluid communication with the control valve receptacle 32 (FIG. 15). When the liquid flow device 10 is used in the evacuation mode, gas is exhausted through the exhaust conduit 20E at a high flow rate. The muffler 42 muffles the sound of the exhaust gas as it is discharged from the device 10.

Figure 16:
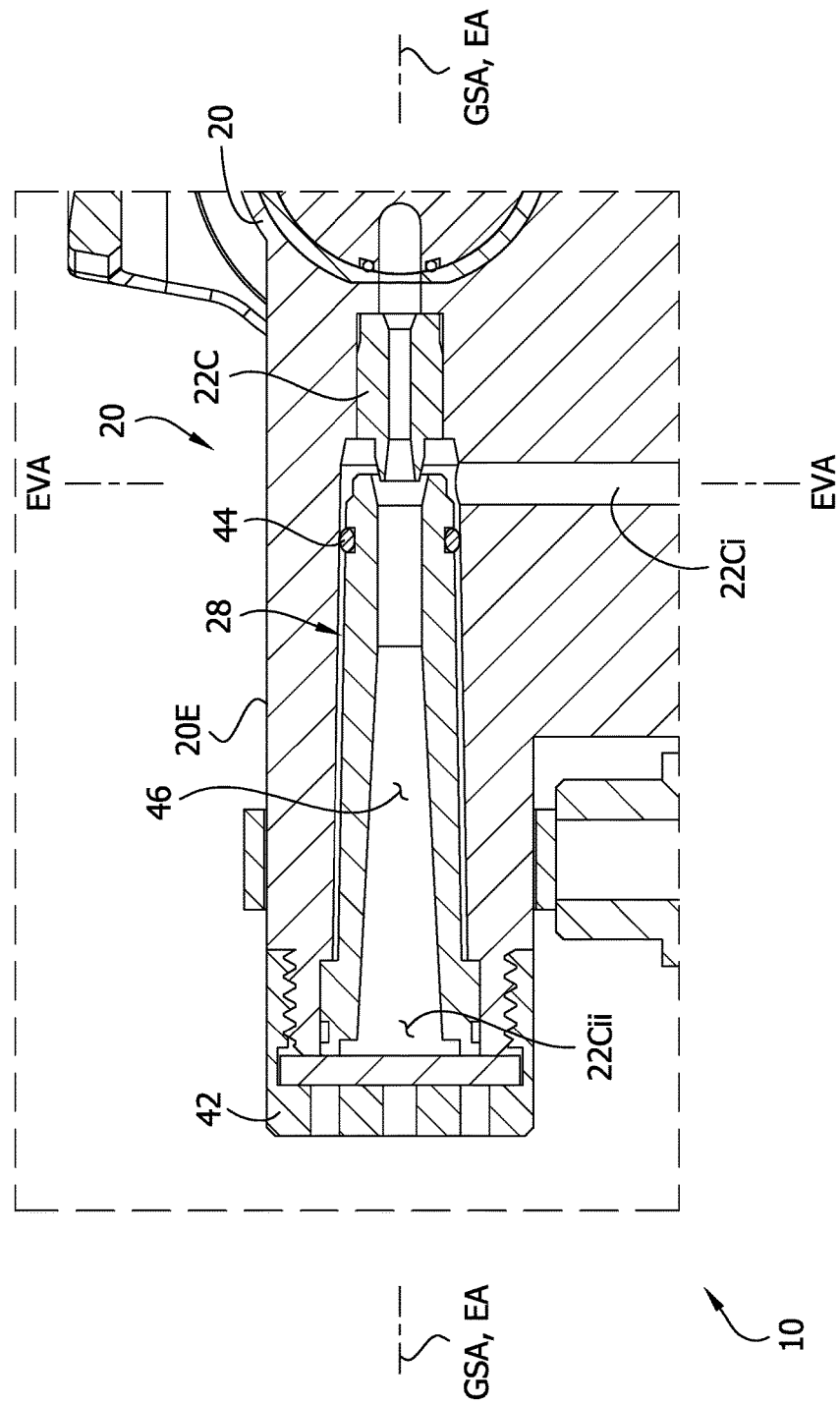
FIG. 16 is an enlarged view of a portion of FIG. 6.
Figure 17:
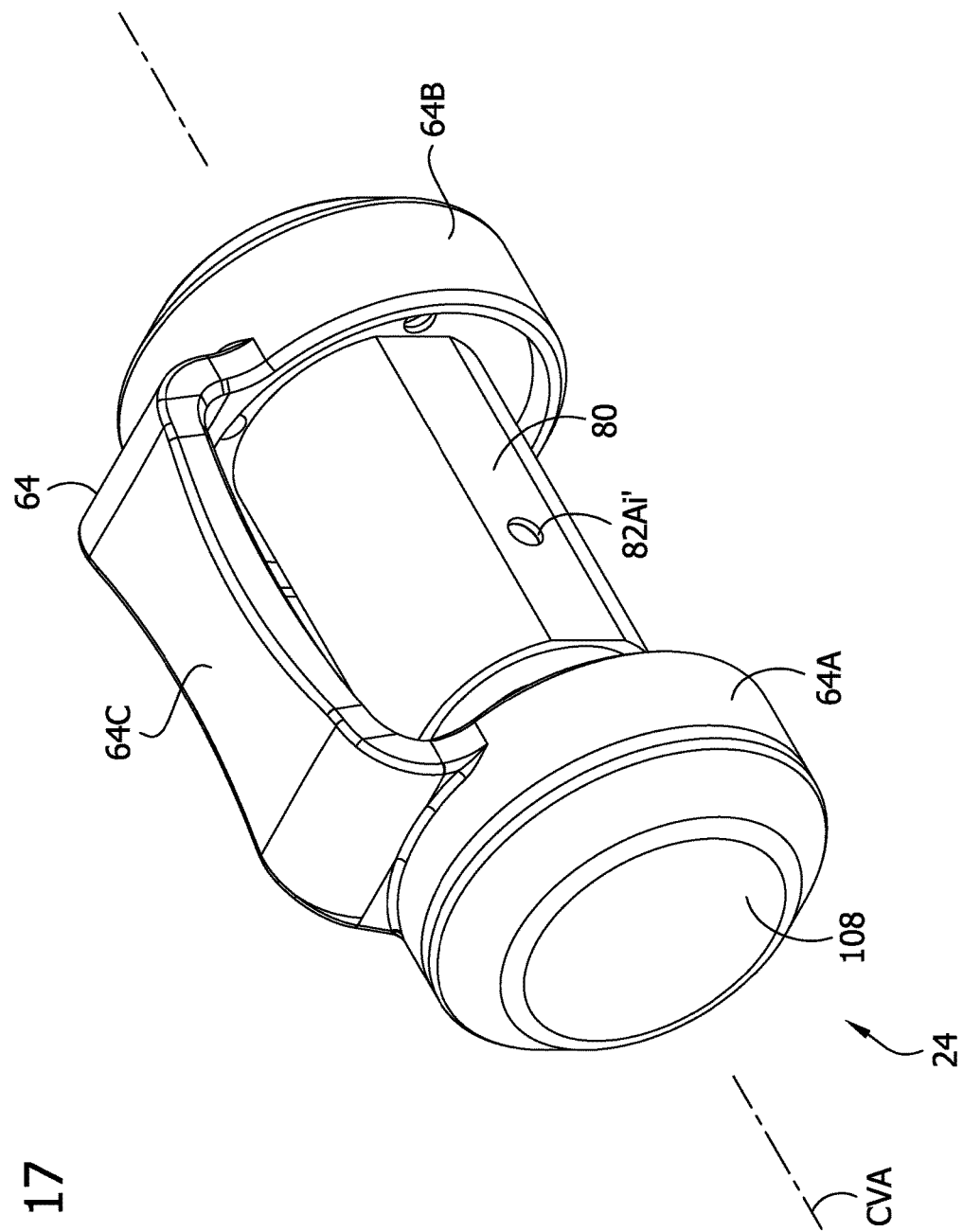
FIG. 17 is a perspective of the control valve.

Referring to FIG. 16, the exhaust conduit 20E is shaped and arranged to receive the flow restrictor 28 therein. In the illustrated embodiment, the flow restrictor 28 comprises a venturi nozzle extending along the exhaust axis EA. An O-ring 44 extends around the perimeter of the venturi nozzle 28 and sealingly engages the exhaust conduit 20E about the axis EA such that substantially all of the gas flowing through the exhaust leg 22Cii is directed through a restricted passage 46 of the venturi nozzle. The passage 46 comprises an upstream end portion having a relatively small cross-sectional size (e.g., a relatively small diameter) and a downstream end portion adjacent the muffler 42 having a larger cross-sectional size (e.g., a larger diameter). The small upstream end portion of the venturi passage 46 has a smaller cross-sectional size than an upstream segment of the evacuation passage 22C located between the control valve housing 20B and the nozzle 28. Thus the venturi nozzle 28 presents a restriction to gas flowing through the exhaust conduit 20E. As gas flows through the restriction, it creates a vacuum pressure at the upstream end of the venturi nozzle 28. As explained below, an upper end of the evacuation leg 22Ci branches from the exhaust conduit 20E and is aligned with the upstream end of the venturi nozzle 28 to communicate the vacuum pressure through the evacuation leg.

Figure 4:
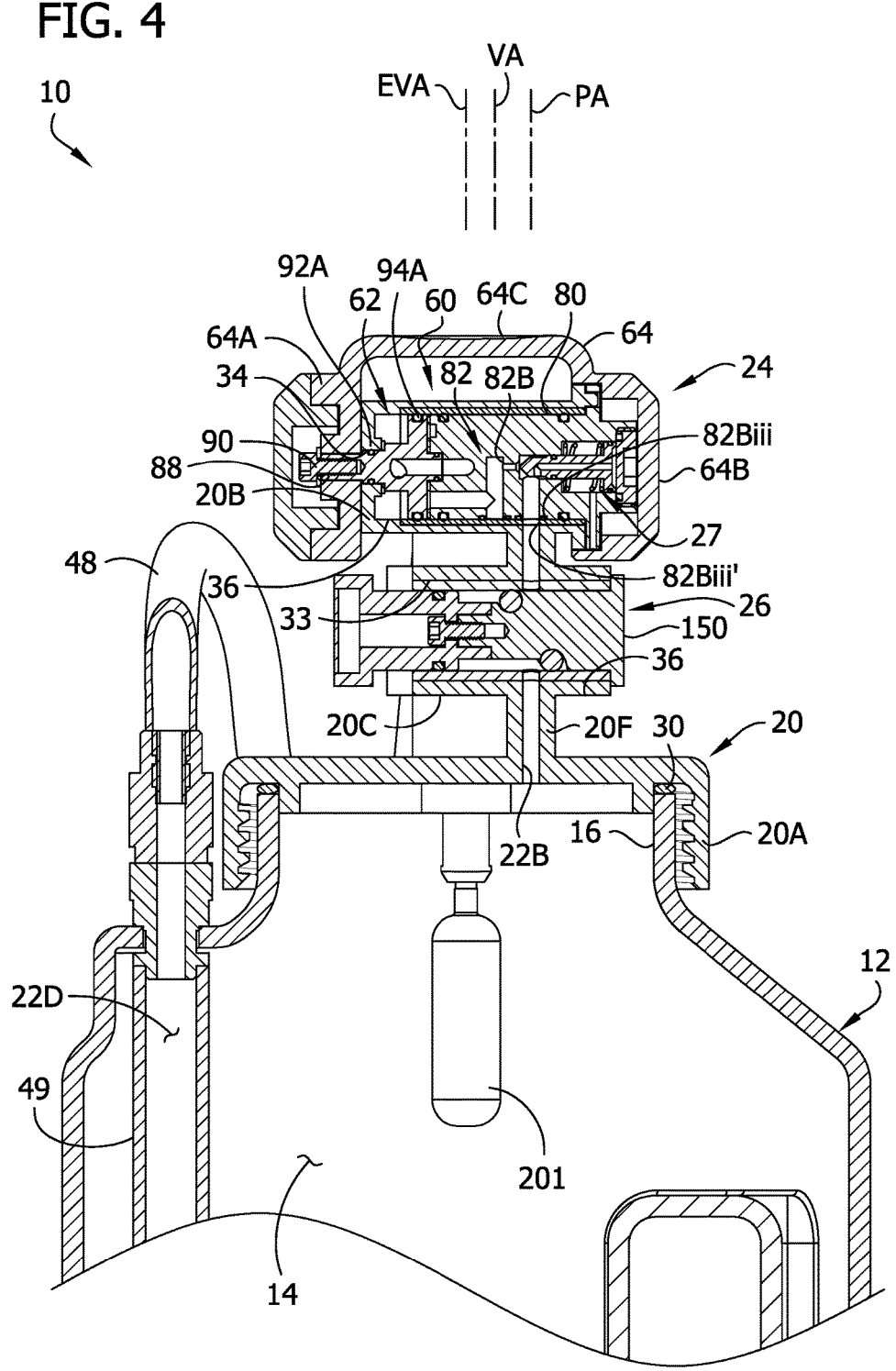
FIG. 4 is an enlarged view of a cross section taken in the plane of line 4-4 of FIG. 3.
Figure 5:
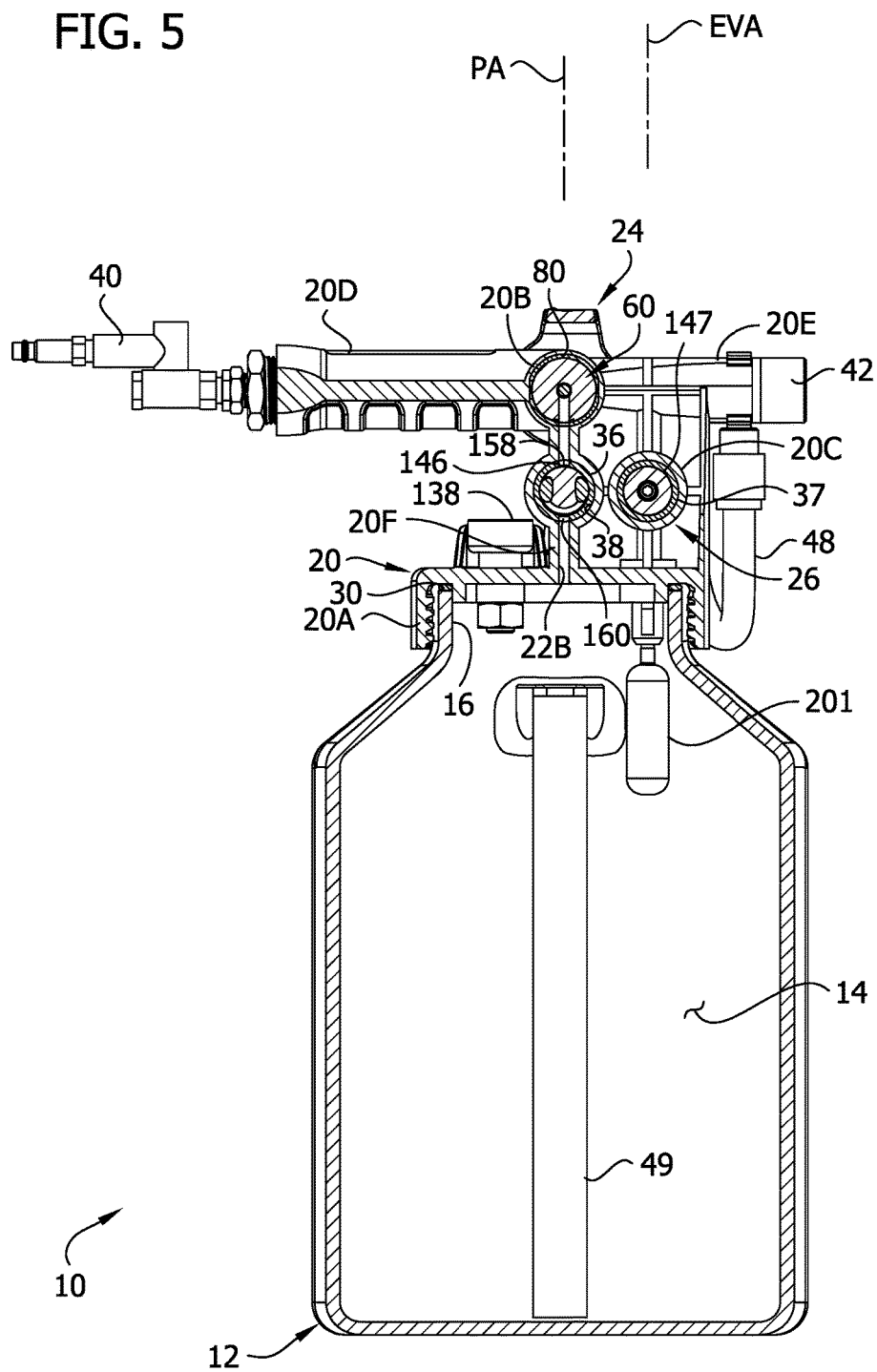
FIG. 5 is a cross section taken in a plane including line 5-5 of FIG. 3.

Referring to FIGS. 4-5 and 14, the pressurization conduit 20F extends generally along a pressurization axis PA, which is oriented generally parallel to the vertical axis VA in the illustrated embodiment. The pressurization conduit 20F has an upstream end portion that adjoins the control valve housing 20B and a downstream end portion that adjoins the closure 20A. The tube 36 of the mode selector housing 20C crosses the pressure conduit 20F. The pressurization conduit 20F defines the pressurization passage 22B. One end of the pressurization passage 22B defines an opening through the control valve housing 20B and another end of the pressurization passage defines an opening (broadly, gas outlet) through the closure 20A for delivering gas to the interior 14 of the container 12. Accordingly, when the lid 20 is mounted on the container 12, the pressurization passage can provide fluid communication between the control valve receptacle 32 and the interior 14 of the container 12. The pressurization passage 22B also defines upper and lower vertically aligned openings through the tube 36 of the mode selector valve housing 20C to provide fluid communication between upper and lower aligned segments (e.g., having aligned or concentric gas flow axes) of the pressurization passage through the receptacle 38.

Figure 6:
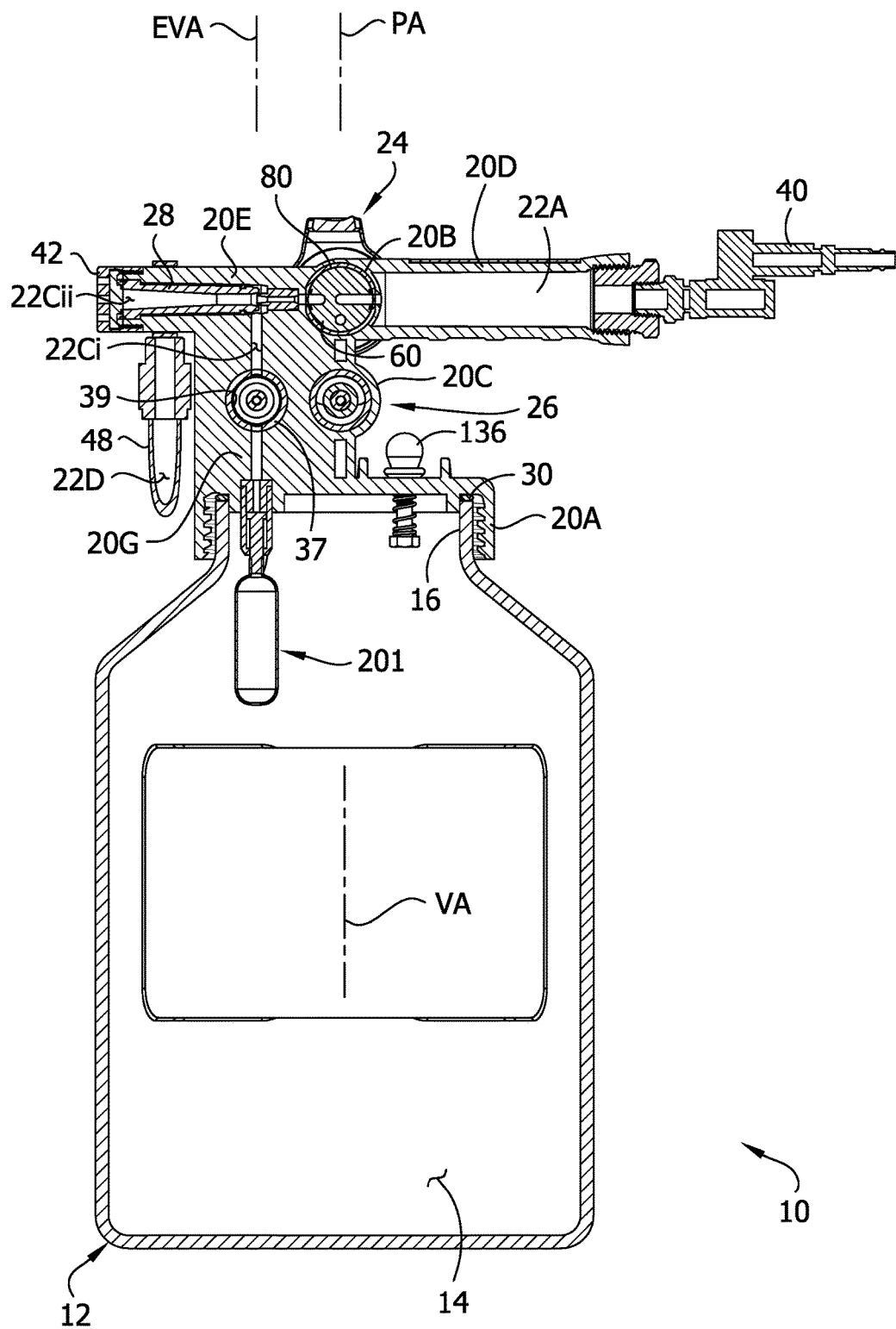
FIG. 6 is a cross section taken in a plane including line 6-6 of FIG. 3.

Referring to FIGS. 6, 14, and 16, the evacuation conduit 20G extends generally along an evacuation axis EVA, which is oriented generally parallel to the vertical axis VA and the pressurization axis PA in the illustrated embodiment. As shown in FIG. 15, the evacuation axis EVA is spaced apart from the pressurization axis PA along the gas supply/exhaust axes GSA, EA in a forward direction. The evacuation axis EVA crosses the gas supply/exhaust axes GSA, EA in the illustrated embodiment, and the pressurization axis PA is spaced apart from the gas supply/exhaust axis along the control valve axis CVA. As shown in FIGS. 6, 14, and 16, the evacuation conduit 20G has an upper end portion that adjoins the exhaust conduit 20E and a lower end portion that adjoins the closure 20A. The tube 37 of the mode selector housing 20C crosses the evacuation conduit 20G. The evacuation conduit 20G defines the evacuation leg 23Ci of the evacuation passage 22C such that the evacuation leg includes one end that defines an opening through the exhaust conduit 20E and another end that defines an opening through the closure 20A. Furthermore, the evacuation leg 22Ci defines upper and lower vertically aligned openings through the tube 37 of the mode selector valve housing 20C to provide fluid communication between upstream and downstream aligned segments (e.g., having aligned or concentric gas flow axes) of the evacuation leg through the receptacle 39. The opening of the evacuation leg 22Ci extending through the exhaust conduit 22E is aligned with the location where the venturi nozzle 28 is configured to generate a vacuum pressure. Accordingly, when the lid 20 is mounted on the container 12, the evacuation leg 22i can communicate the vacuum pressure to the interior 14 of the container 12.

As shown in FIG. 6, the illustrated liquid flow device 10 also includes a float valve 201 that is operatively connected to the bottom end of the evacuation leg 22Ci of the evacuation passage 22C where the evacuation passage opens through the closure 20A. The float valve 201 is configured to float on liquid in the container 12. When the liquid level in the interior 14 exceeds a threshold the valve 201 floats to a position that closes the evacuation leg 22Ci of the evacuation passage 22C. Thus, in the evacuation mode of the liquid flow device 10, the float valve 201 is configured to automatically close the evacuation passage 22C to prevent an excess of liquid from being evacuated into the container 12.

Referring to FIGS. 1-5, the liquid flow device 10 also includes an elongate liquid hose 48 outside the container 12 and a dip tube 49 inside the container that together define the liquid flow passage 22D of the passaging 22. In the illustrated embodiment, the liquid hose 48 comprises a flexible hose having a connector 48A at a free end of the hose. When the device 10 is not in use, the connector 48A can be stored by connecting it to a mount 50 on the exhaust conduit 20E. In use, the connector 48A may be connected to an extension such as a wand and/or an additional tube to provide additional reach. The liquid hose 48 is attached to the container 12 at a liquid orifice formed in the wall of the container. The dip tube 49 is attached to the container at the same liquid orifice. For example, outer and inner threaded or quick connect fittings may be provided at the orifice to which the liquid hose 48 and dip tube and connectable. Although the liquid hose 48 and dip tube 49 are attached to the container 12 in the illustrated embodiment, it will be understood that they also could be attached to the lid 20 or another structure that supports them for fluid communication with the interior of the container. The dip tube 49 extends downward from an end adjacent the hose 49 to a free end located adjacent the bottom of the container 12. When the lid 20 is mounted on the container 12, the interior 14 of the container provides fluid communication between the dip tube 49 and both the pressurization passage 22B and evacuation passage 22C. In use, in the dispensing mode, positive pressure in the interior 14 (e.g., pressure created by pressurized gas flowing through the pressurization passage 22B) drives liquid in the container to flow through the dip tube 49 and hose 48 to dispense the liquid. In the evacuation mode, gas directed through the venturi nozzle 28, the vacuum pressure is communicated through the evacuation passage 22C to the interior 14 of the container 12, and a vacuum is drawn through the dip tube 49 and the hose 48 for evacuating liquid from an outside source into the container.

Referring to FIGS. 17-20, one embodiment of a control valve 24 for being operatively received in the control valve housing 20B of the lid 20 will now be described in greater detail. In the illustrated embodiment, the control valve 24 comprises a rotary valve, but other types of control valves can be used without departing from the scope of the invention. The illustrated control valve 24 comprises a control valve body, generally indicated at reference number 60; a control valve member, generally indicated at reference number 62; and a lever 64 (broadly, an actuator) configured to pivot conjointly with the control valve member with respect to the control valve body and the lid 20 about the control valve axis CVA through a range of motion to selectively actuate the control valve. As explained below, the lever 64 is configured to pivot the control valve member 62 to at least one dispensing position, at least one evacuation position, and at least one closed position to open and close fluid communication paths through the control valve body 60 between the gas supply passage 22A and each of the pressurization passage 22B and the evacuation passage 22C.

Figure 18:
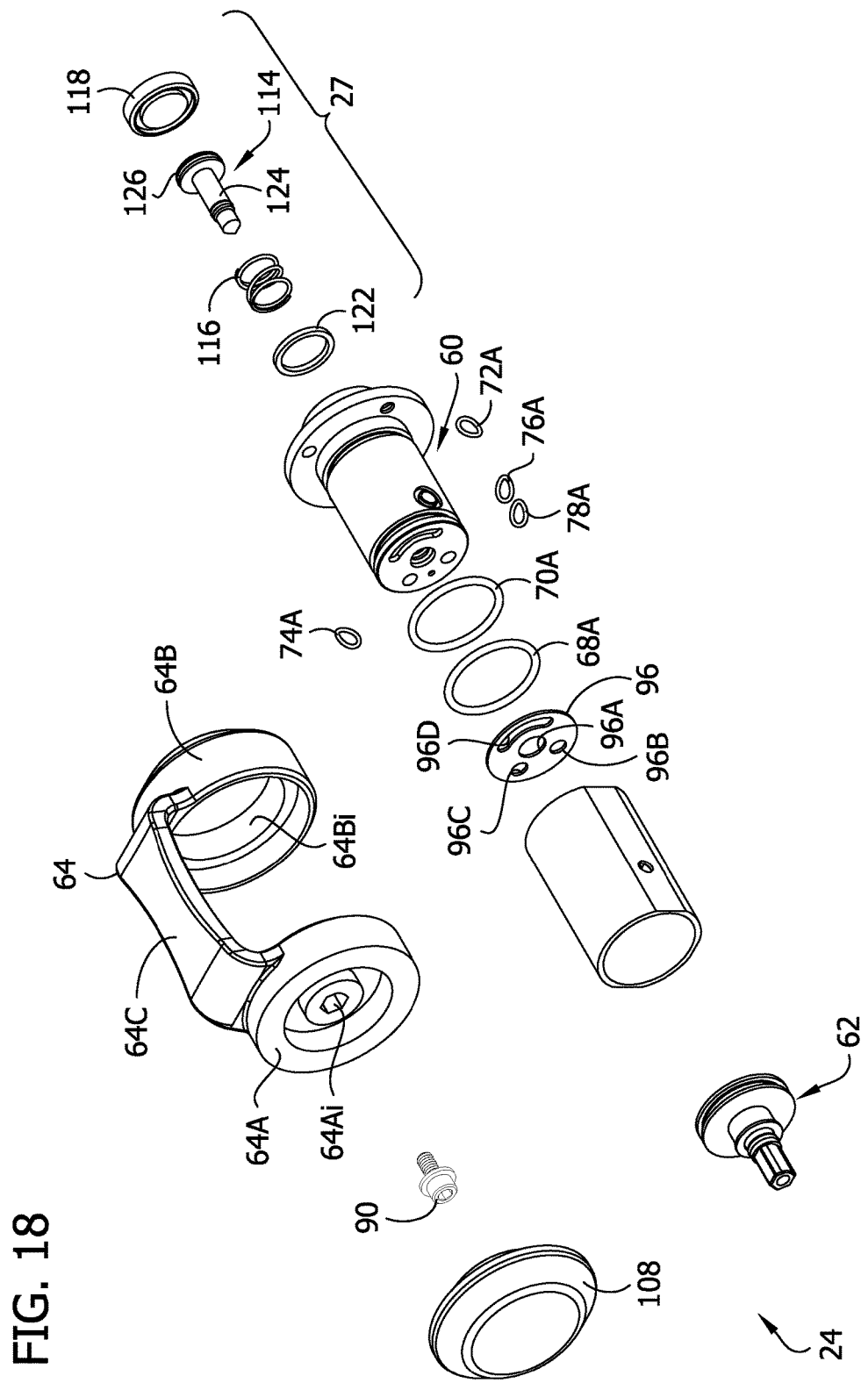
FIG. 18 is an exploded perspective of the control valve.
Figure 19:
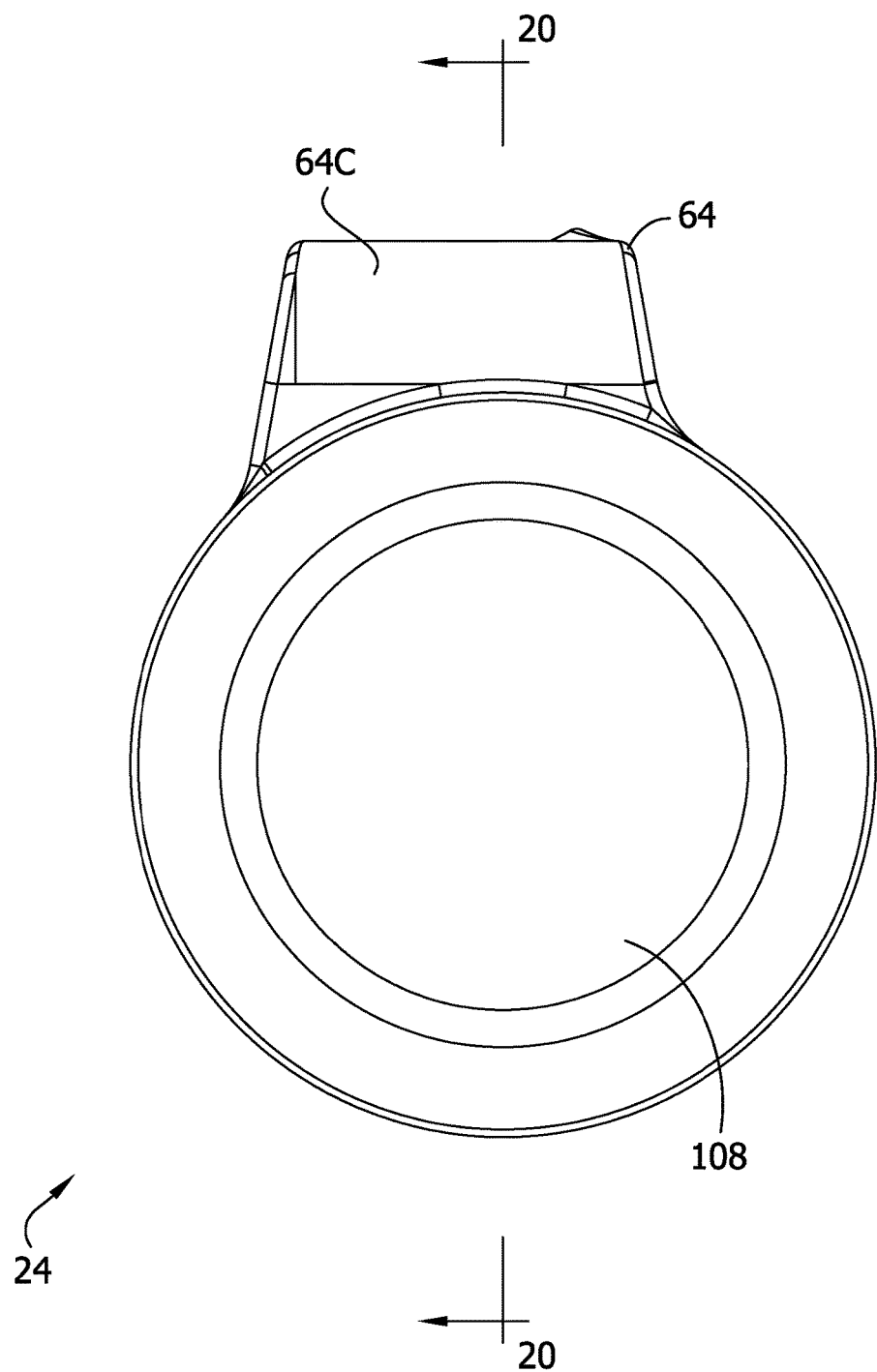
FIG. 19 is a side elevation of the control valve.
Figure 20:
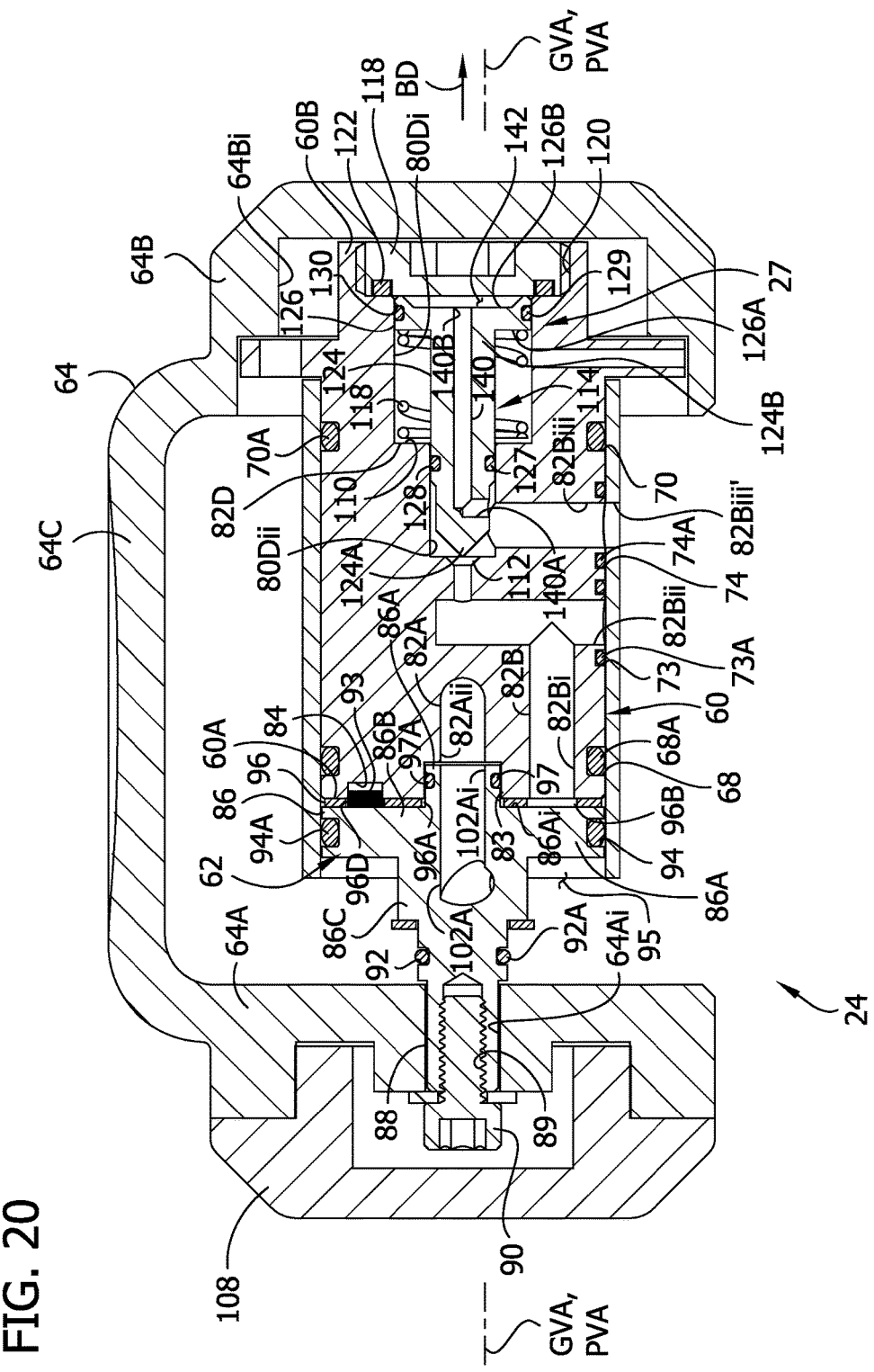
FIG. 20 is a cross section taken in a plane including line 20-20 of FIG. 19.

Referring to FIGS. 21-24, the illustrated control valve body 60 has a generally cylindrical side wall that extends along the control valve axis CVA between a first end portion 60A and an opposite second end portion 60B of the control valve body. A mounting flange 66 extends radially outward from the side wall at a location adjacent the second end portion 60B. As shown in FIGS. 18 and 20, the illustrated control valve body 60 is configured to be operatively received in a mounting sleeve 80, which is sealingly received inside the receptacle 32 of the control valve housing 20B as shown in FIGS. 4-6. Seal grooves 68, 70 extend around the perimeter of the control valve body 60 about the control valve axis CVA at locations adjacent the ends of the sleeve 80 for receiving O-rings 68A, 70A therein. The O-rings 68A, 70A are configured to provide fluid seals between the control valve body 60 and the sleeve 80 that extend in continuous hoops about the control valve axis CVA. In the assembled liquid flow device 10, the control valve body 60 and sleeve 80 are inserted into the control valve housing 20B so that the first end portion 60A of the control valve body is located adjacent the hole 34. The flange 64 is located adjacent the opposite open end of the control valve housing 20B and is fastened to the housing to fix the control valve body 60 in position with respect to the lid 20.

Figure 23:
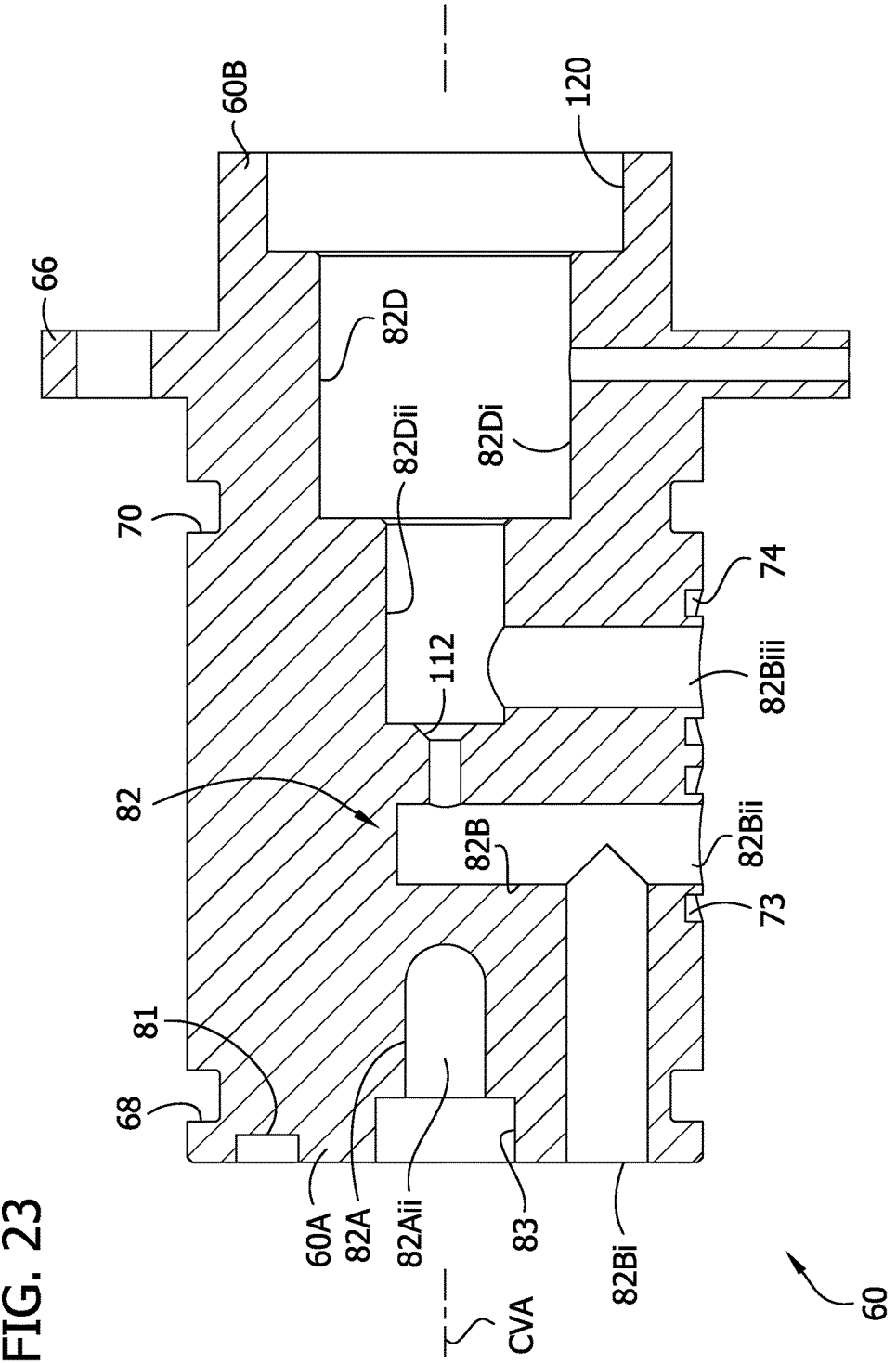
FIG. 23 is a cross section taken in a plane including line 23-23 of FIG. 22.
Figure 24:
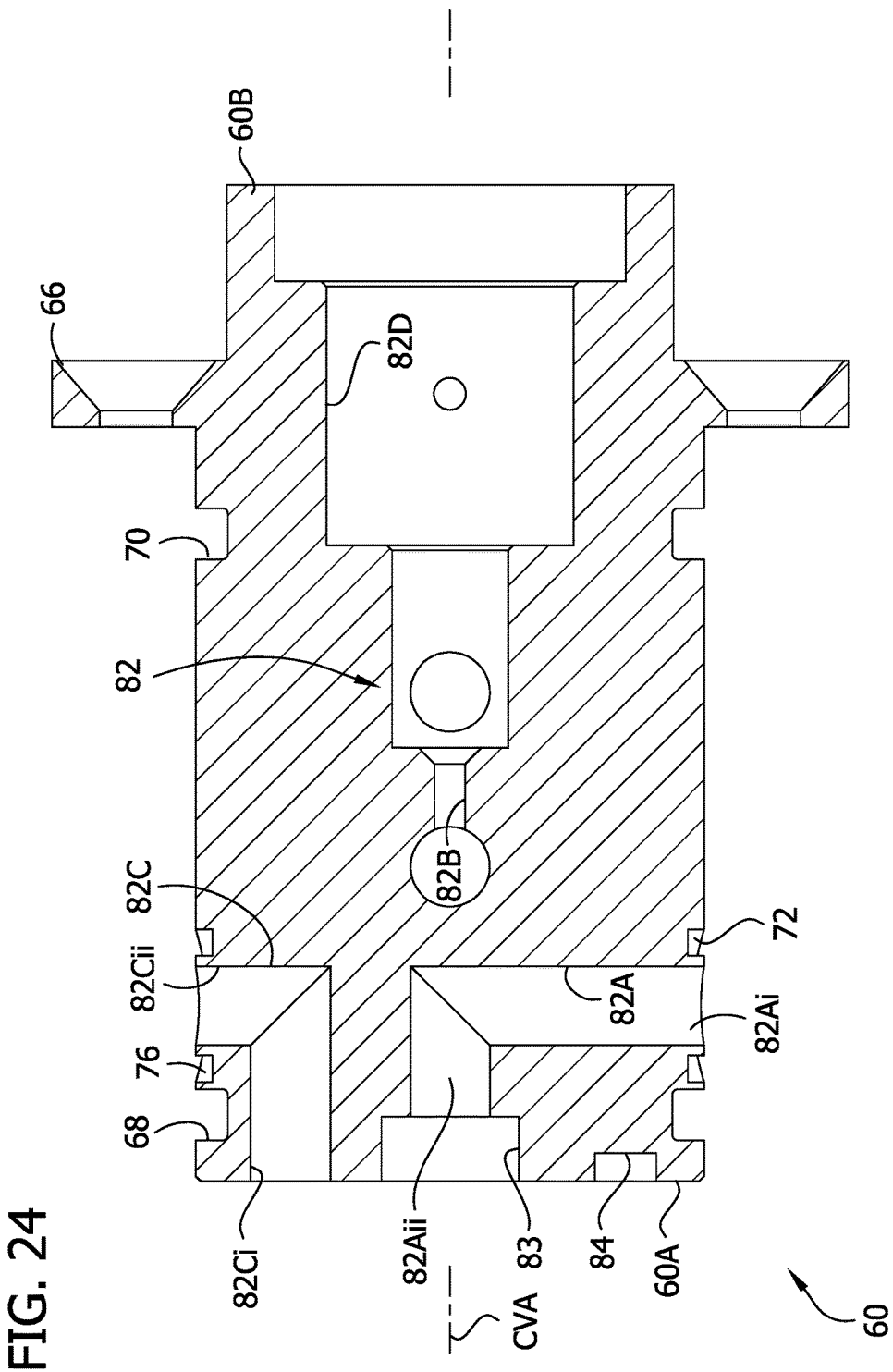
FIG. 24 is a cross section taken in a plane including line 24-24 of FIG. 22.

Referring to FIGS. 23-24, the control valve body defines channeling, generally indicated at 82, for being fluidly connected to the passaging 22. The channeling 82 comprises a gas supply channel 82A shaped and arranged for fluid communication with the gas supply passage 22A, a pressurization channel 82B shaped and arranged for fluid communication with the pressurization passage 22B, and an evacuation channel 82C shaped and arranged for fluid communication with the evacuation passage 22C. In the illustrated embodiment, the pressurization channel 82B extends generally in a plane (e.g., the plane through which the section of FIG. 23 is taken) and the evacuation 82C channel extends generally in a plane (e.g., the plane through which the section of FIG. 24 is taken) generally perpendicular to the plane of the pressurization channel. The channeling 82 further includes a pressure valve channel 82D for use with the pressure valve 27 as described in greater detail below.

The gas supply channel 82A includes an upstream end defining an inlet opening 82Ai through the side wall of the control valve body 60. The inlet opening 82Ai of the gas supply channel 82A is aligned with a hole 82Ai' formed in the sleeve 80 (see FIG. 30). A groove 72 positions an O-ring 72A about the inlet opening 82Ai to provide a sealed connection between the inlet opening and the aligned hole 82Ai'. The opening 82Ai and the hole 82Ai' are aligned with the downstream end of the gas supply conduit 20D, where the gas supply passage 22A opens through the control valve housing 20B. Thus, the inlet opening 82Ai of the gas supply channel is in fluid communication with the gas supply passage 22A. From the inlet opening 82Ai, the channel 82A extends radially inward with respect to the control valve axis CVA along an upstream segment toward a downstream segment that extends generally along the control valve axis toward the first end portion 60A of the control valve body 60. The gas supply channel 82A includes an outlet opening 82Aii through the first end portion 60A of the control valve body 60 that is located on the control valve axis CVA.

Referring to FIG. 23, the pressurization channel 82B includes an end defining an inlet opening 82Bi through the first end portion 60A of the control valve body 60. The inlet opening 82Bi is spaced radially outward of the outlet opening 82Aii of the gas supply channel 82A. As will be explained in further detail below, the control valve member 62 is configured to be moved to a dispensing position in which the control valve member provides fluid communication between the outlet opening 82Aii of the gas supply channel 82A and the inlet opening 82Bi of the pressurization channel 82B. From the inlet opening 82Bi, the pressurization channel 82B extends away from the first end portion 60A of the control valve body 60 along an upstream segment in a direction generally parallel to the control valve axis CVA. From the upstream segment, the pressurization channel 82B extends radially inward along a first intermediate segment.

The first intermediate segment has an outer end that defines a manufacturing opening 82Bii, which is sealed at the interface with the sleeve 80 by an O-ring 73A received in a groove 73. The manufacturing opening 82Bii thus does not provide fluid communication with the passaging 22. A second intermediate segment extends from the inner end of the first intermediate segment along the axis CVA toward the second end portion 60B of the control valve body 60. As will be explained in further detail below, the pressure valve channel 82D extends generally along the control valve axis CVA and intersects the pressurization channel 82B between this second intermediate segment and a downstream segment of the pressurization channel. The downstream segment extends radially outward to an outlet opening 82Biii formed in the side of the control valve body 60. The outlet opening 82Biii of the pressurization channel 82B is aligned with a hole 82Biii' formed in the sleeve 80 (see FIG. 29). A groove 74 positions an O-ring 74A about the outlet opening 82Biii to provide a sealed connection between the outlet opening and the aligned hole 82Biii'. The opening 82Biii and the hole 82Biii' are aligned with the upstream end of the pressurization conduit 20F, where the pressurization passage 22B opens through the control valve housing 20B. Thus, the outlet opening 82Biii of the pressurization channel 82B is in fluid communication with the pressurization passage 22B.

Referring to FIG. 24, the evacuation channel 82C includes an upstream end defining an inlet opening 82Ci through the first end portion 60A of the control valve body 60. The inlet opening 82Ci is spaced radially outward of the outlet opening 82Aii of the gas supply channel 82A and is circumferentially spaced from the inlet opening 82Bi of the pressurization channel 82B about the control valve axis CVA. As will be explained in further detail below, the control valve member 62 is configured to be moved to an evacuation position in which the control valve member provides fluid communication between the outlet opening 82Aii of the gas supply channel 82A and the inlet opening 82Ci of the evacuation channel 82C. From the inlet opening 82Ci, the evacuation channel 82C extends away from the first end portion 60A along an upstream segment in a direction generally parallel to the control valve axis CVA. From the upstream segment, the evacuation channel extends radially outward along a downstream segment to an outlet opening 82Cii formed in the side wall of the control valve body 60. The outlet opening 82Cii of the evacuation channel 82C is aligned with a hole 82Cii' formed in the sleeve 80 (see FIG. 30). A groove 76 positions an O-ring 76A about the outlet opening 82Cii to provide a sealed connection between the outlet opening and the aligned hole 82Cii' in the sleeve 80. The opening 82Cii and the hole 82Cii' are aligned with the upstream end of the exhaust conduit 20E, where the evacuation passage 22C opens through the control valve housing 20B. Thus, the outlet opening 82Cii of the evacuation channel 82C is in fluid communication with the exhaust passage 22C.

Figure 21:
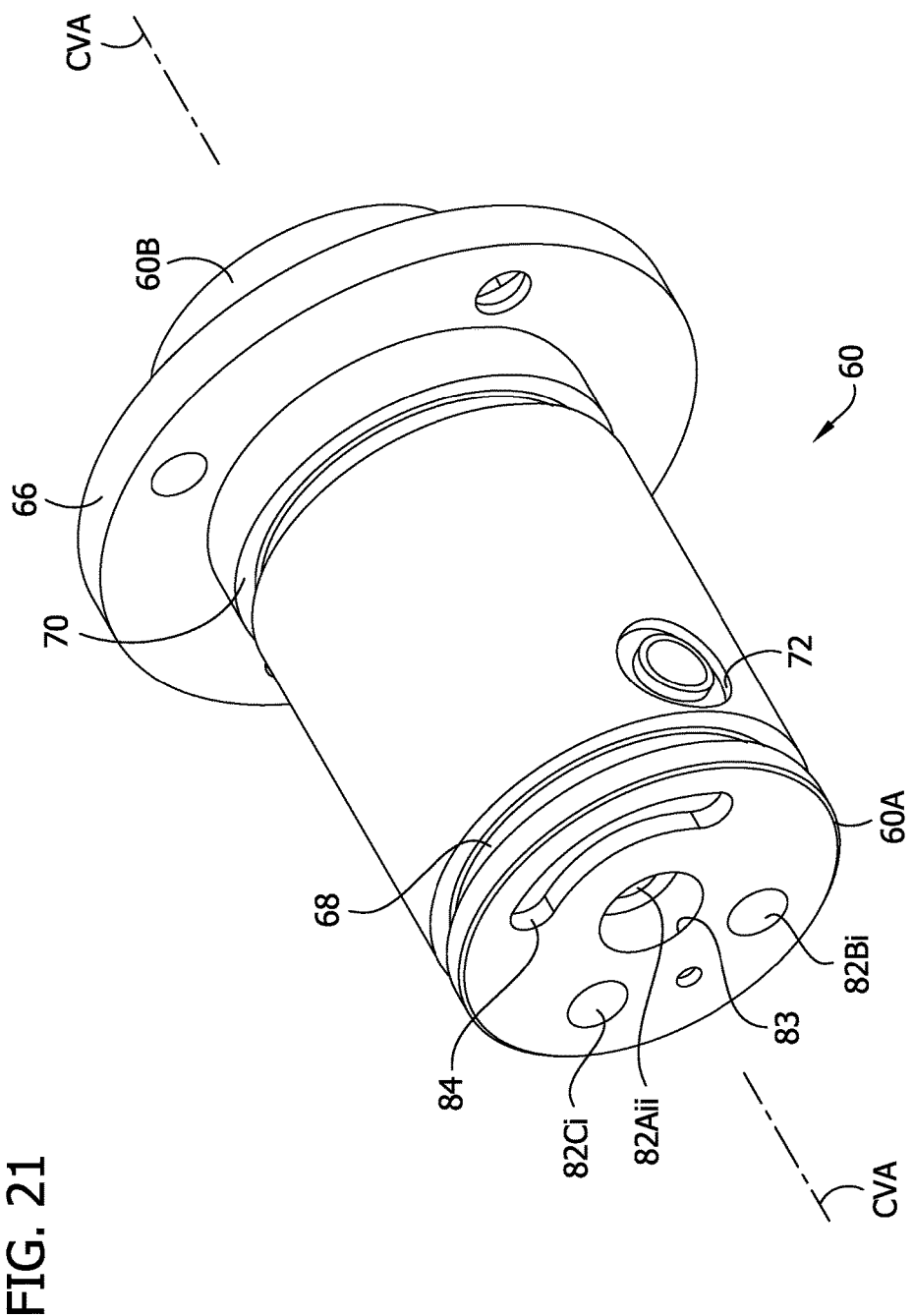
FIG. 21 is a perspective of a control valve body of the control valve.
Figure 22:
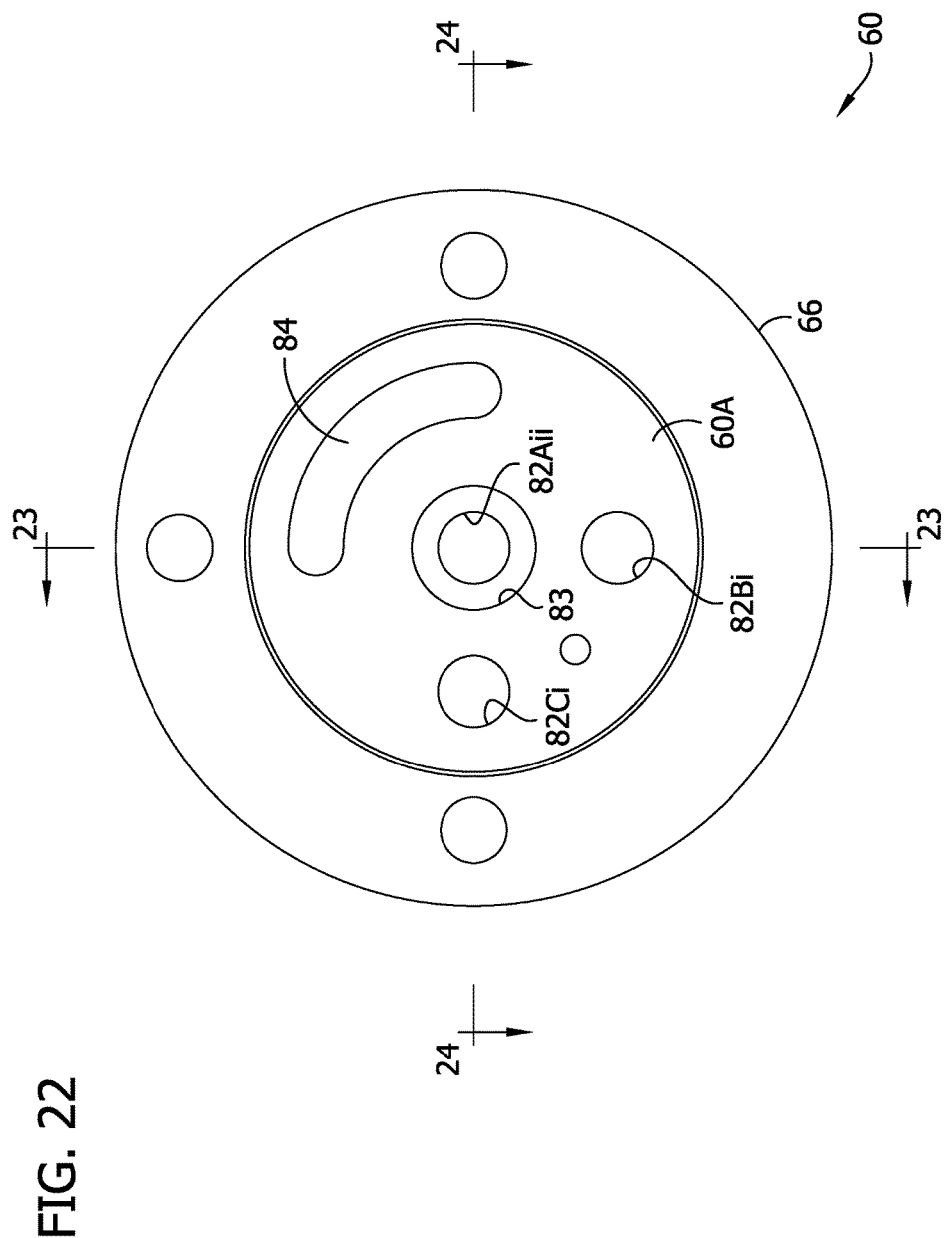
FIG. 22 is an end elevation of the control valve body.

Referring to FIG. 21, the first end portion 60A of the illustrated control valve body 60 is shaped and arranged to define a bearing recess 83 and also an arcuate guide groove 84. As explained below the recess 83 and guide groove 84 are used to constrain the control valve member 62 to pivot about the control valve axis CVA. The recess 83 is generally cylindrical and extends around the outlet opening 82Aii of the gas supply channel 82A. The groove 84 is spaced radially outwardly from the recess 83 and is located circumferentially between the inlet openings 82Bi, 82Ci of the pressurization and evacuation channels 82B, 82C.

Figure 25:
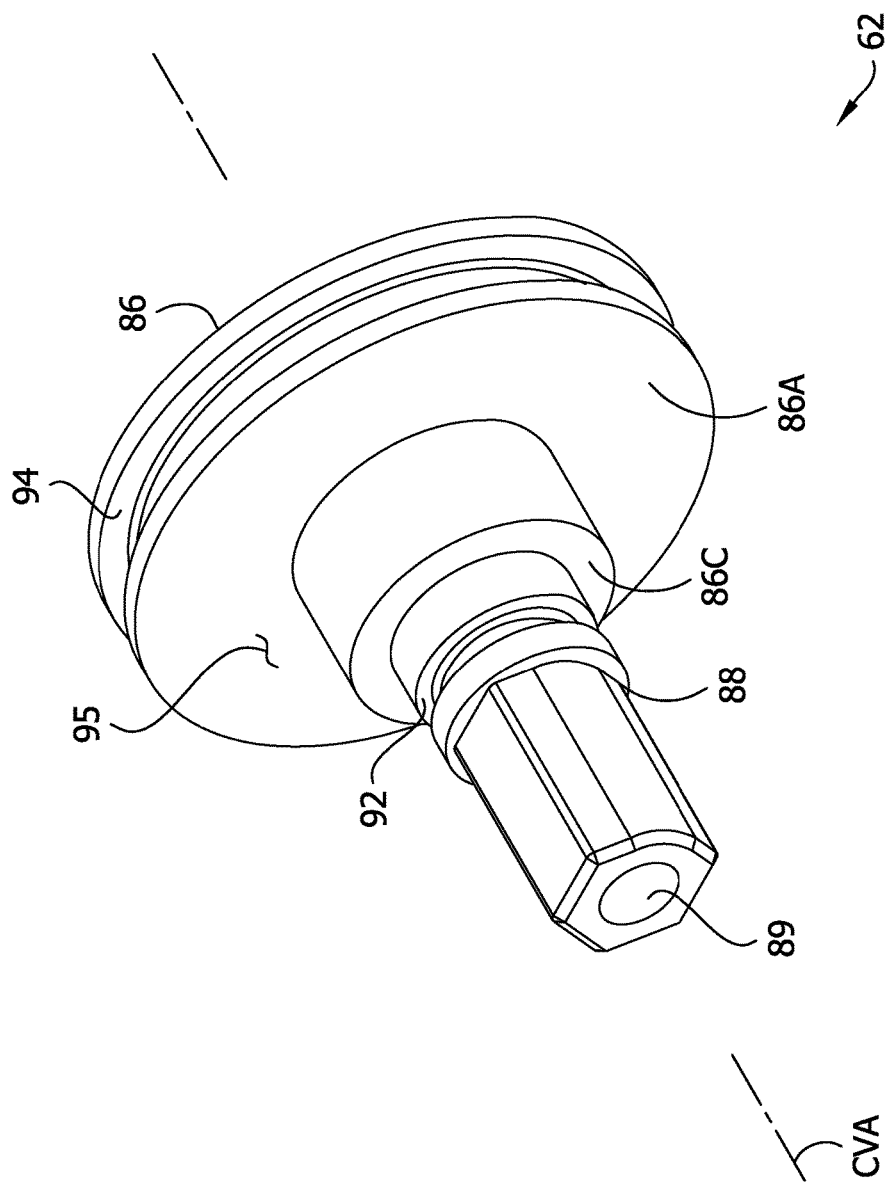
FIG. 25 is a perspective of a control valve member of the control valve.
Figure 26:
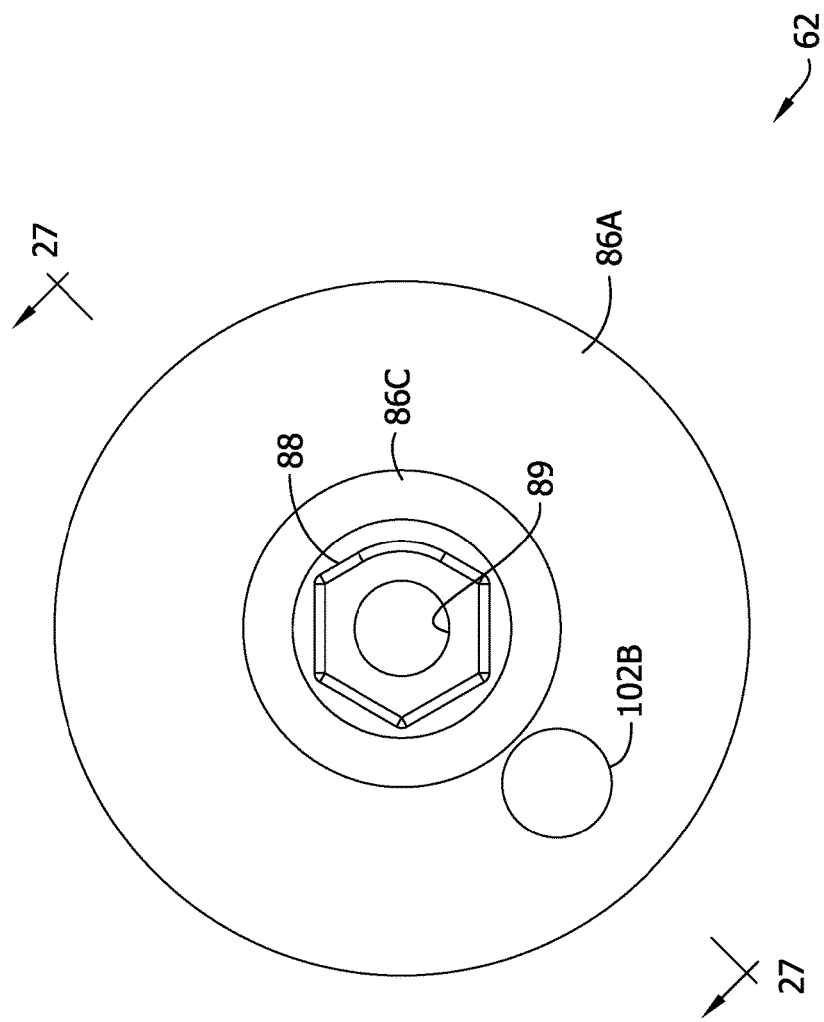
FIG. 26 is an end elevation of the control valve member.
Figure 27:
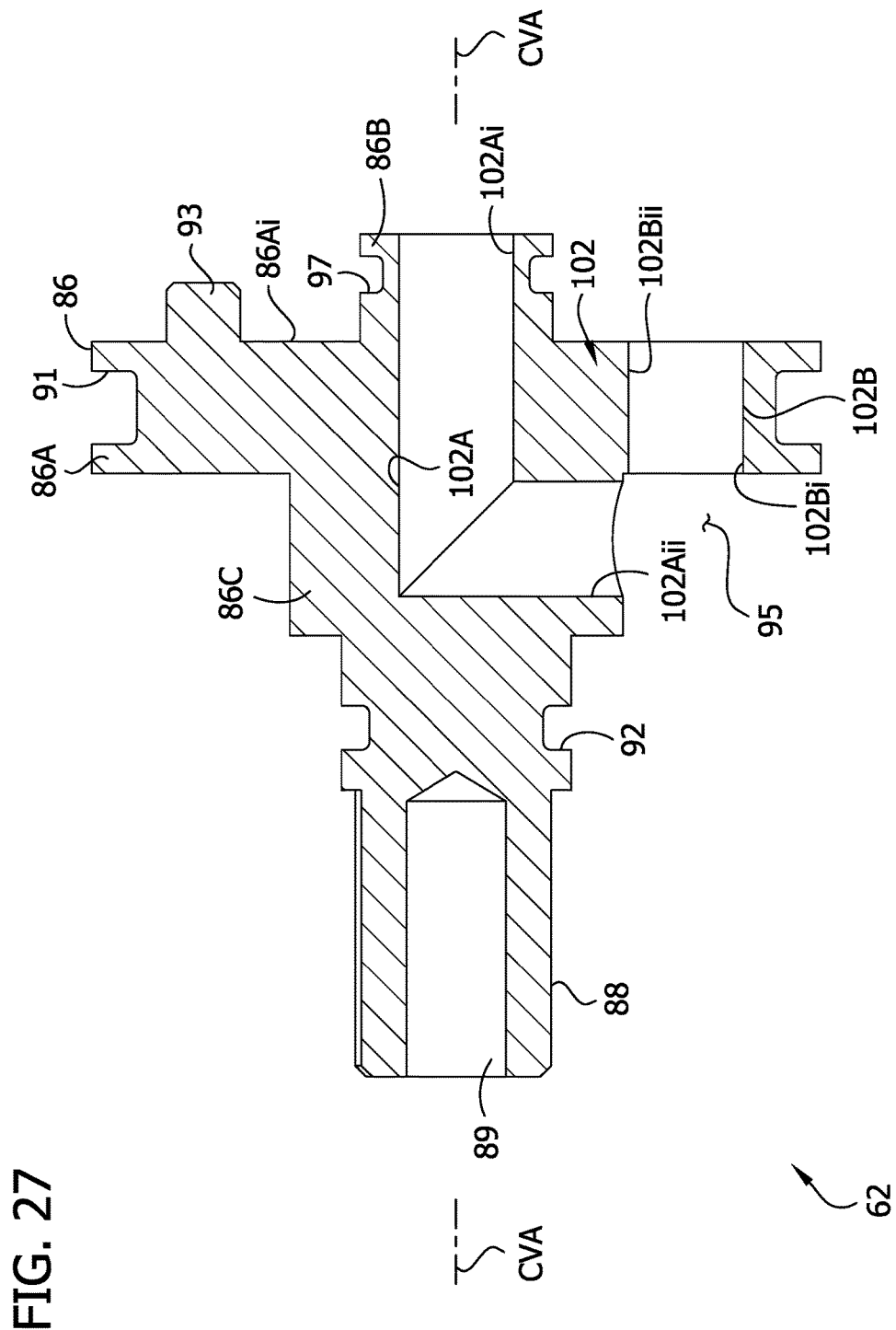
FIG. 27 is a cross section taken in a plane including line 27-27 of FIG. 26.
Figure 29:
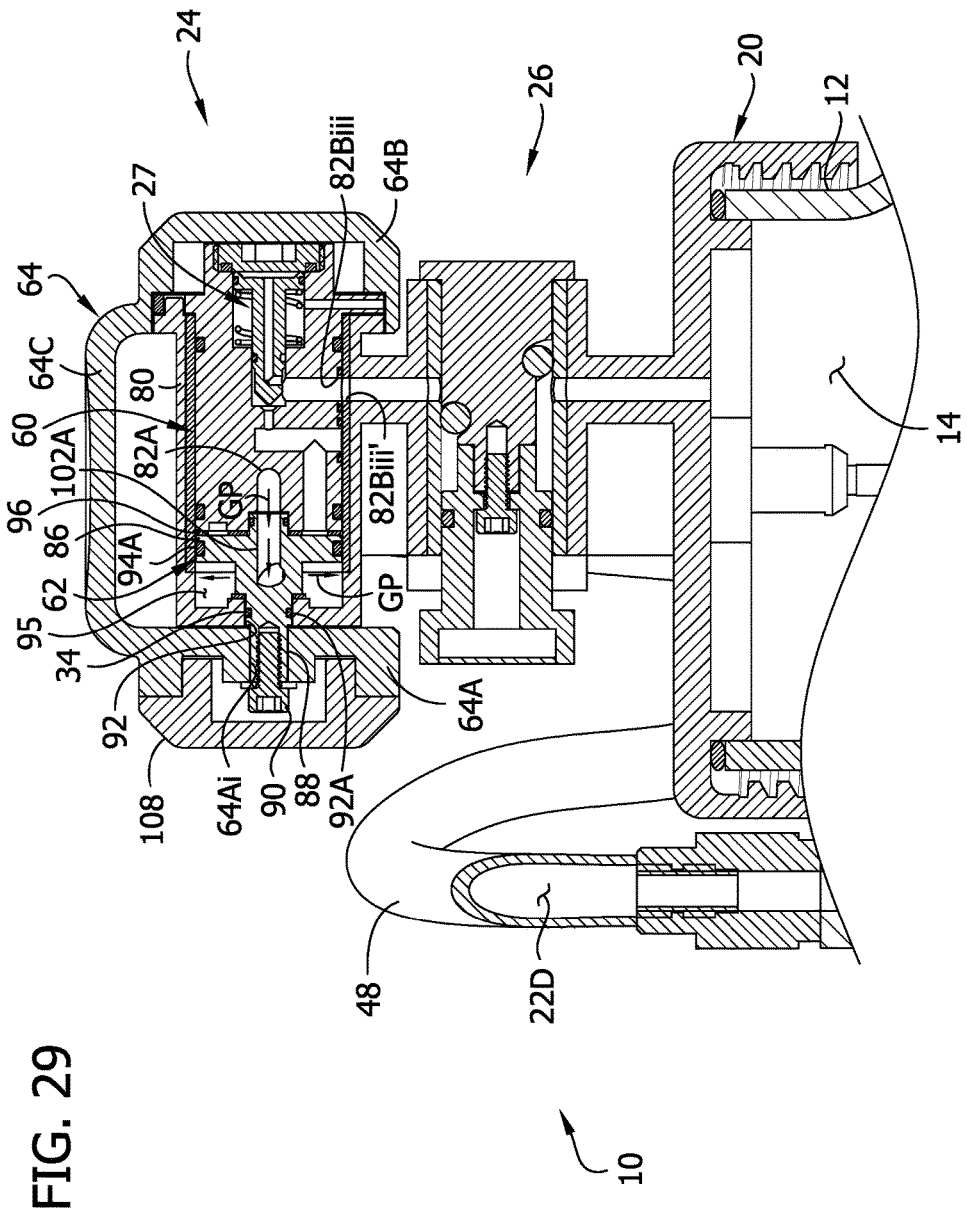
FIG. 29 is a cross section taken in a plane including line 29-29 of FIG. 28.

Referring to FIGS. 25-27, the control valve member includes a head 86 and a stem 88 that extends away from the head along the control valve axis CVA. An end segment of the stem 88 has a cross-sectional shape that defines a locking formation (e.g., one or more flats on a perimeter surface) that is configured for being lockingly engaged with the lever 64 to connect the control valve member to the lever for conjoint rotation about the control valve axis CVA. The end segment of the stem 88 also defines a socket 89 for receiving the shank of a screw 90 (FIG. 20) for fastening the control valve member 62 to the lever 64. An inboard segment of the stem 88 is shaped and arranged for being pivotably received in the hole 34 in the control valve housing 20B of the lid 20, as shown in FIG. 29. When the control valve 24 is installed in the lid 20, the head 86 is received in the receptacle 32, the inboard segment of the stem 88 extends through the hole 34, and the end segment of the stem is connected to the lever 64 outside of the receptacle. As shown in FIG. 25, the inboard segment of the stem 88 defines an annular groove 92 for receiving an O-ring 92A (FIG. 20) configured for sealing the interface between the control valve housing 20B and the stem 88 at the hole 34. The O-ring 92A is configured to provide a fluid seal that withstands the operating pressures of pressurized gas used in the liquid flow device 10.

Referring to FIG. 27, the head 86 of the control valve member 62 has a large flange 86A that defines an end face 86Ai of the control valve member 62. An annular groove 94 is formed about the perimeter of the flange 86A for receiving an O-ring 94A as shown in FIG. 20. The O-ring 94A is shaped and arranged for providing a fluid seal between the control valve member 62 and the sleeve 80 that extends circumferentially about the control valve axis CVA. The O-ring 94A is configured to provide a fluid seal that withstands the operating pressures of pressurized gas used in the liquid flow device 10.

A generally cylindrical bearing stud 86B extends generally along the control valve axis CVA from the end face 86Ai of the flange 86A. The bearing stud 86B is configured for being rotatably received in the bearing recess 83 of the control valve body 60. The bearing stud 86B defines a groove 97 configured for receiving an O-ring 97A (FIG. 20) that provides a fluid seal about the axis CVA between the bearing stud and the control valve body 60 at the bearing recess. The O-ring 97A is configured to provide a fluid seal that withstands the operating pressures of pressurized gas used in the liquid flow device 10. A guide stud 93 also extends from the end face 82Ai in a direction generally parallel to the axis CVA. The guide stud 93 is sized and arranged for being slidably received in the arcuate guide groove 84 formed in the end portion 60A of the control valve body 60. When the bearing stud 86B is rotatably received in the bearing recess 83, the control valve member 62 is generally constrained to move only in rotation about the control valve axis CVA with respect to the control valve body 60. As the control valve member 62 pivots with respect to the control valve body 60 about the axis CVA, the guide stud 93 slides through the arcuate groove 84. The ends of the groove 84 thus define the ends of the range of motion of the control valve member 92 with respect to the control valve body 90.

The head 86 of the control valve member 62 also includes a hub 86C on the opposite side of the flange 86A from the bearing stud 86B. The hub 86C has a smaller cross-sectional shape than the flange 86A. The hub 86C is suitably shaped and arranged for defining an annular cavity 95 that extends circumferentially around the hub and radially between the hub and the sleeve 80 in the assembled control valve (FIG. 20). The cavity 95 has ends spaced apart along the control valve axis CVA that are sealed by the O-rings 92A, 94A (FIG. 29).

Referring to FIG. 27, the control valve member 62 defines channeling, generally indicated at 102, which is configured for selectively providing fluid communication between the gas supply channel 82A and either of the pressurization channel 82B and the evacuation channel 82C of the control valve body 60. The channeling 102 includes a gas supply connection channel 102A in fluid communication with the gas supply channel 82A of the control valve body 60 and a downstream connection channel 102B. The gas supply connection channel 102A includes an upstream segment extending generally along the control valve axis CVA from an inlet opening 102Ai formed in the end of the bearing stud 86B. The inlet opening 102Ai is aligned with the outlet opening 82Aii of the gas supply channel 82 such that the gas supply channel and the gas supply connection channel 102A fluidly communicate through the aligned openings. A downstream segment of the gas supply connection channel 102A extends radially outward from the upstream segment to an outlet opening 102Aii extending radially through the hub 86C. The outlet opening 102Aii provides fluid communication with the annular cavity 95. The gas supply connection channel 102A thus provides fluid communication between the gas supply channel 82A and the annular cavity 95. Moreover, because the inlet opening 102Ai of the gas supply connection channel 102A and the outlet opening 82Aii of the gas supply channel 82A are aligned along the control valve axis CVA, fluid communication between the gas supply connection channel and the gas supply channel is maintained even as the control valve member 82 pivots through its range of motion about the control valve axis.

The downstream connection channel 102B extends generally parallel to the control valve axis CVA through the flange 86A at a location spaced radially outward from the control valve axis. The downstream connection channel 120B defines an inlet opening 102Bi in fluid communication with the cavity 95 and an outlet opening 102Bii through the end face 86Ai of the flange 86A. In certain positions of the control valve member 62 in its range of motion, the outlet opening 102Bii is configured to be in fluid communication with the inlet openings 82Bi and 82Ci of the pressurization channel 82B and the evacuation channel 82C as explained below.

Referring to FIGS. 18 and 20, the control valve 24 includes an end seal 96 fixed to the control valve body 60 between the first end portion 60A of the control valve body and the end face 86Ai of the control valve member 62 to provide a seal therebetween. The end seal 96 is disc-shaped and defines a central opening 96A shaped and arranged for receiving the bearing stud 86B therethrough. The end seal 96 also defines a pressurization opening 96B and an evacuation opening 96C that are shaped and arranged for being operatively aligned with the inlet openings 82Bi, 82Ci of the pressurization channel 82B and the evacuation channel 82C. The end seal 96 further defines an arcuate slot 96D that is shaped and arranged for being aligned with the guide groove 84. The slot 96D is configured so that the guide stud 93 can travel through the slot 96D as it slides through the groove 84 when the control valve member 62 pivots in its range of motion. The seal provided by the O-ring 97 directs all gas passing through the gas supply channel 82A into the gas supply connection channel 102A. The gas supply connection channel 102A directs gas into the cavity 95, which is sealed such that gas in the cavity flows into the downstream connection channel 102B. The end seal 96 seals the downstream connection channel 102B except to the extent that the outlet opening 102Bii is aligned with the inlet opening 82Bi, 82Ci of one of the pressurization channel 82B and the evacuation channel 82C. To the extent the outlet opening 102Bii is aligned with an inlet opening 82Bi, 82Ci, the end seal 96 allows fluid communication between the downstream connection channel 102B and the respective channel 82B, 82C.

Referring to FIGS. 17-20, the lever 64 has an inverted U-shape that includes a first end portion 64A, an opposite second end portion 64B at a location spaced apart from the first end portion along the control valve axis CVA, and a middle connecting portion 64C extending therebetween at a location spaced radially outward from control valve axis. Each of the first and second portions 64A, 64B is configured to be mounted on the lid 20 outside of the control valve housing 20B (FIG. 29). The first end portion 64A defines an opening 64Ai (FIG. 20) for lockingly receiving the end segment of the stem 88 therein. A cap 108 is configured to be mounted on the first end portion to cover the screw 90. The second end portion 64B of the lever 64 defines a cavity 64Bi for receiving the second end portion 60B of the control valve body 60. The second end portion 64B also supports the pressure valve 27 inside the control valve 24 as described in further detail below. A user can push the middle portion 64C of the lever 64 using a finger or hand, and the lever and control valve member 62 will pivot conjointly with respect to the control valve body 60 and lid 20 about the control valve axis CVA.

Figure 28:
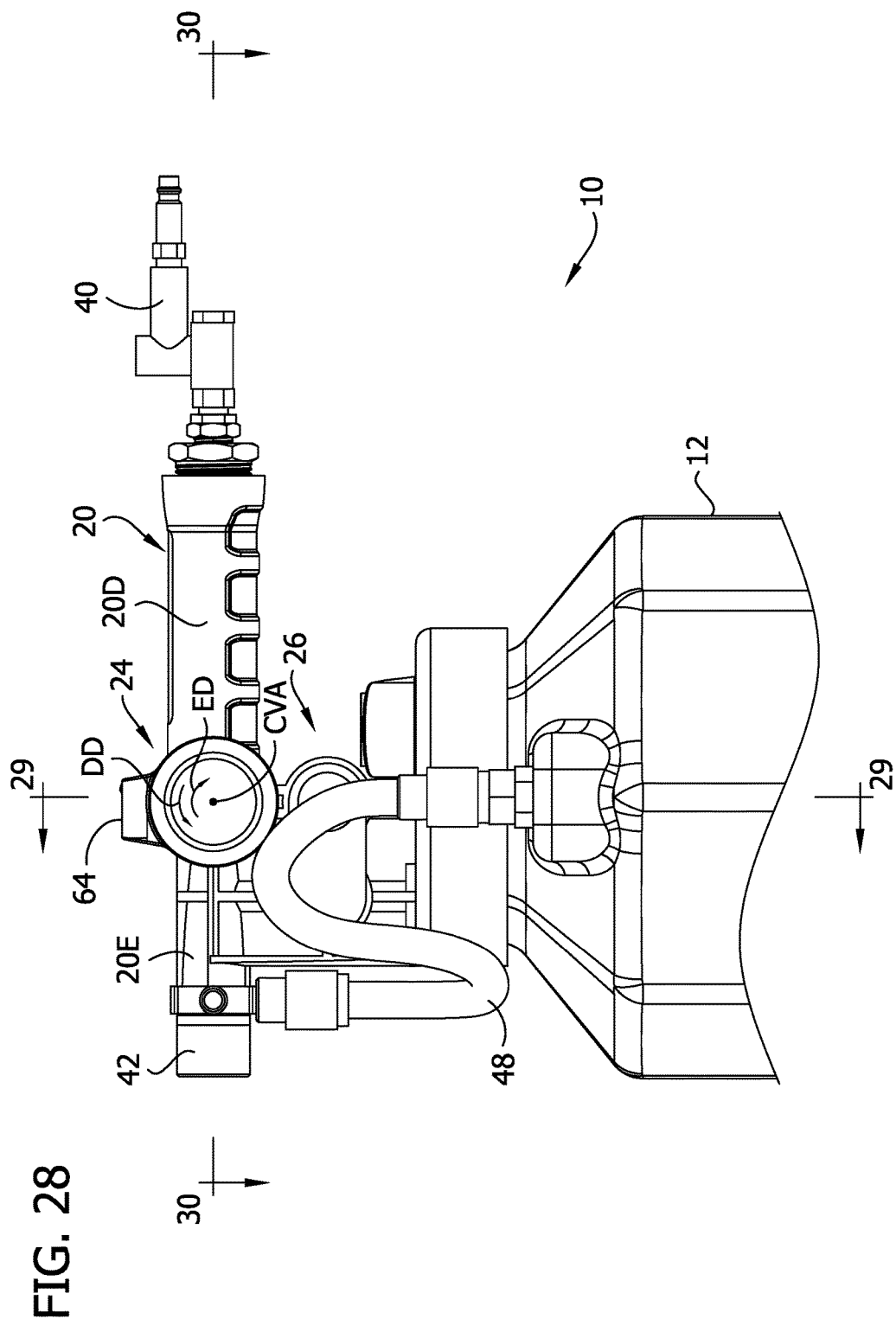
FIG. 28 is a partial side elevation of the liquid flow device illustrating the control valve in the closed configuration.
Figure 30:
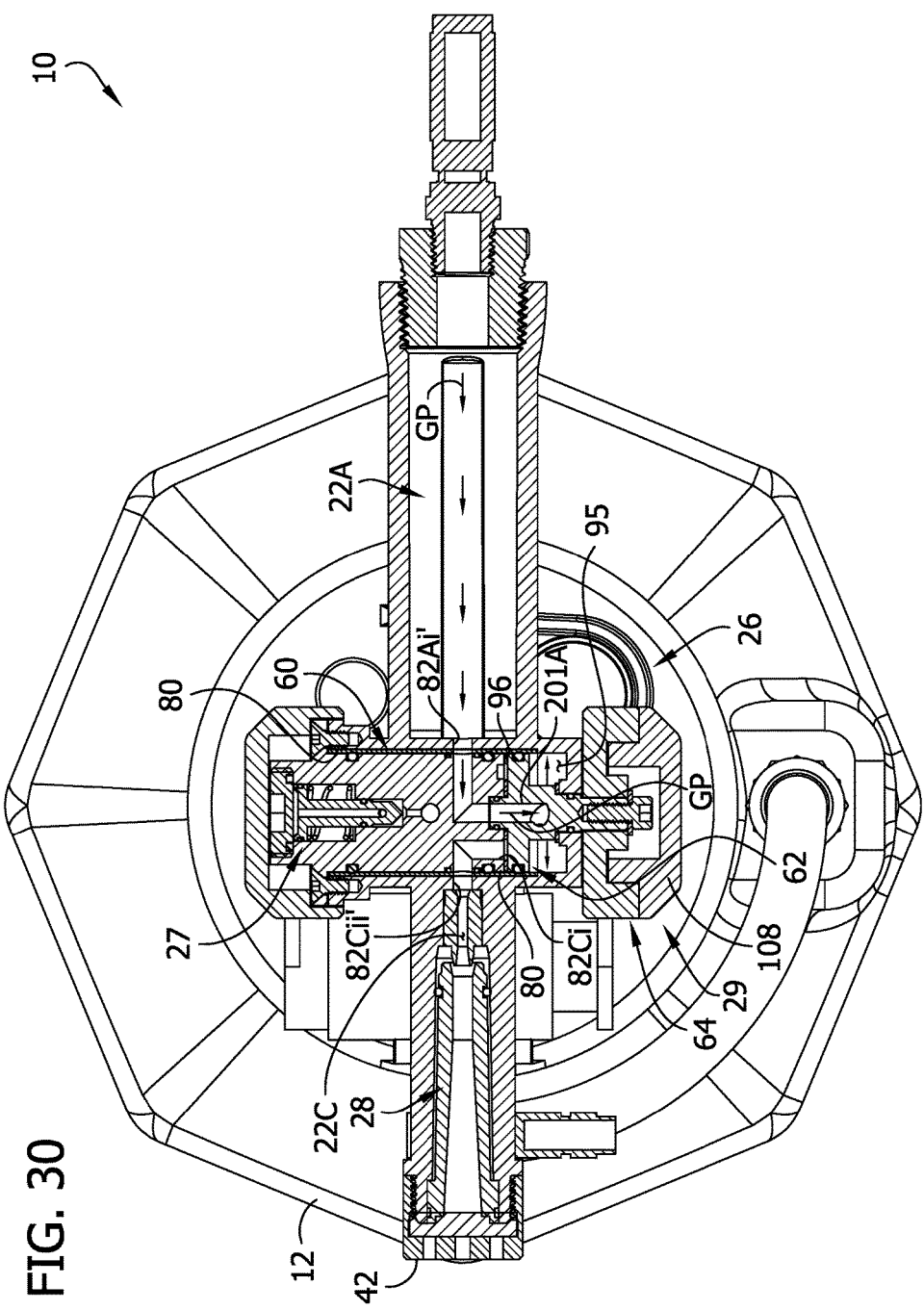
FIG. 30 is a cross section taken in a plane including line 30-30 of FIG. 28.

The range of motion of the control valve 24 and operative configurations of the control valve within the range of motion will now be described in reference to FIGS. 28-36. Referring to FIGS. 28-30, in a closed configuration, the lever 64 is pivoted to the upright orientation shown in FIG. 28. As explained below, the lever 64 can be pivoted from the closed position in a dispensing direction DD toward a dispensing position or an evacuation direction ED toward an evacuation position. Thus, the closed position (FIG. 28) is located along the range of motion of the lever 64 between a dispensing position (FIG. 31) and an evacuation position (FIG. 34). When the lever 64 is in the closed position, the lever positions the control valve member 62 in the closed position, and thus adjusts the control valve 24 to be in the closed configuration. As explained above in reference to FIG. 7, in the closed configuration, the control valve is configured to block fluid communication between the gas supply passage 22A and both the pressurization passage 22B and the evacuation passage 22C. As shown in FIGS. 28 and 29, in the closed position, the control valve member 62 is arranged so that the downstream connection channel 102B is not aligned with either of the inlet openings 82Bi, 82Ci of the pressurization channel 82B and the evacuation channel 82C. Accordingly, in the closed configuration of the control valve 24, pressurized gas can flow along the gas flow path GP from the gas supply passage 22A, through the gas supply channel 82A and the gas supply connection channel 102A, into the annular cavity 95 and the downstream connection channel 102B, but the end seal 96 blocks the gas from flowing from the downstream connection channel into either of the pressurization channel 82B or the evacuation channel 82C.

Figure 31:
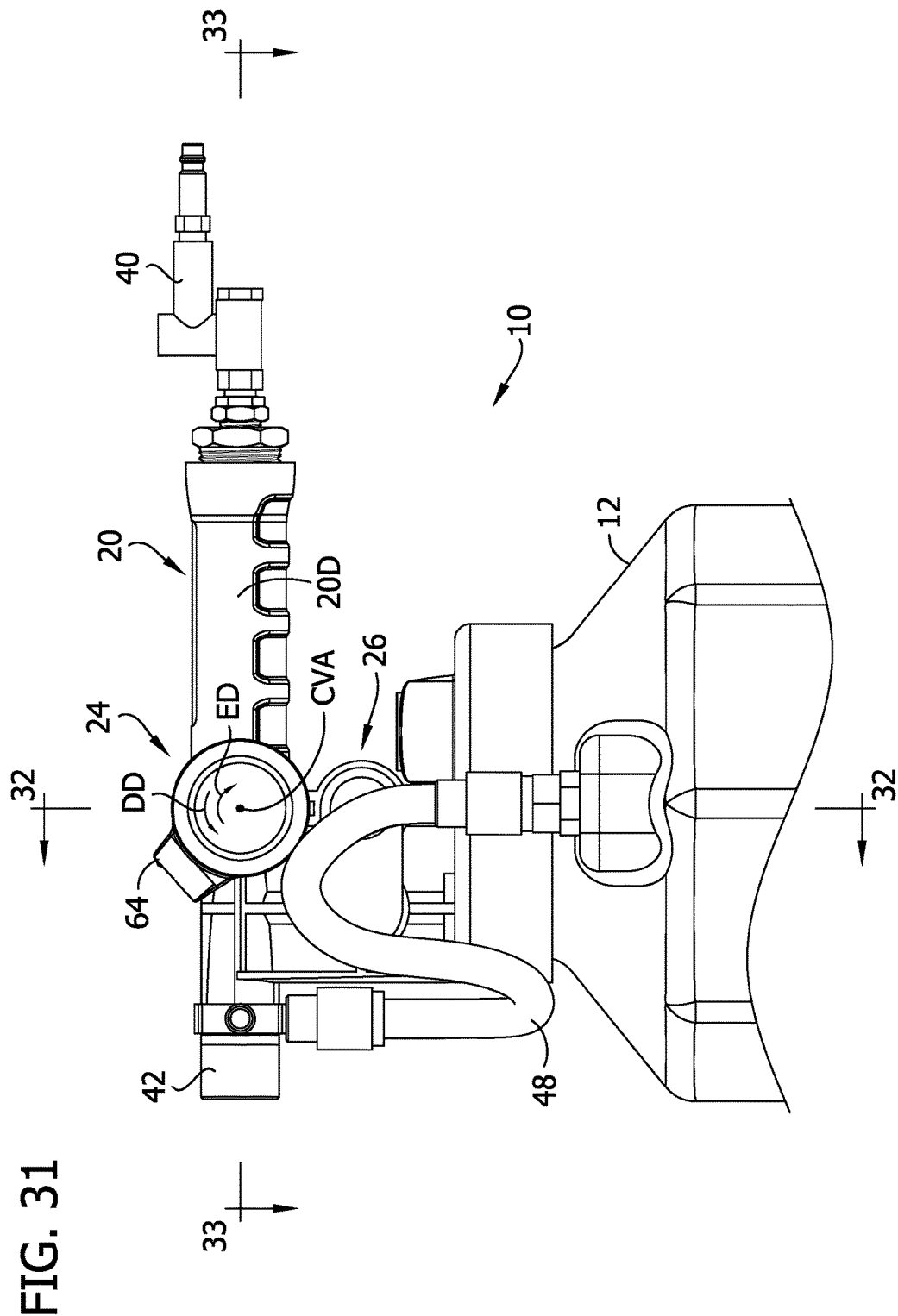
FIG. 31 is a partial side elevation of the liquid flow device illustrating the control valve in the dispensing configuration.
Figure 32:
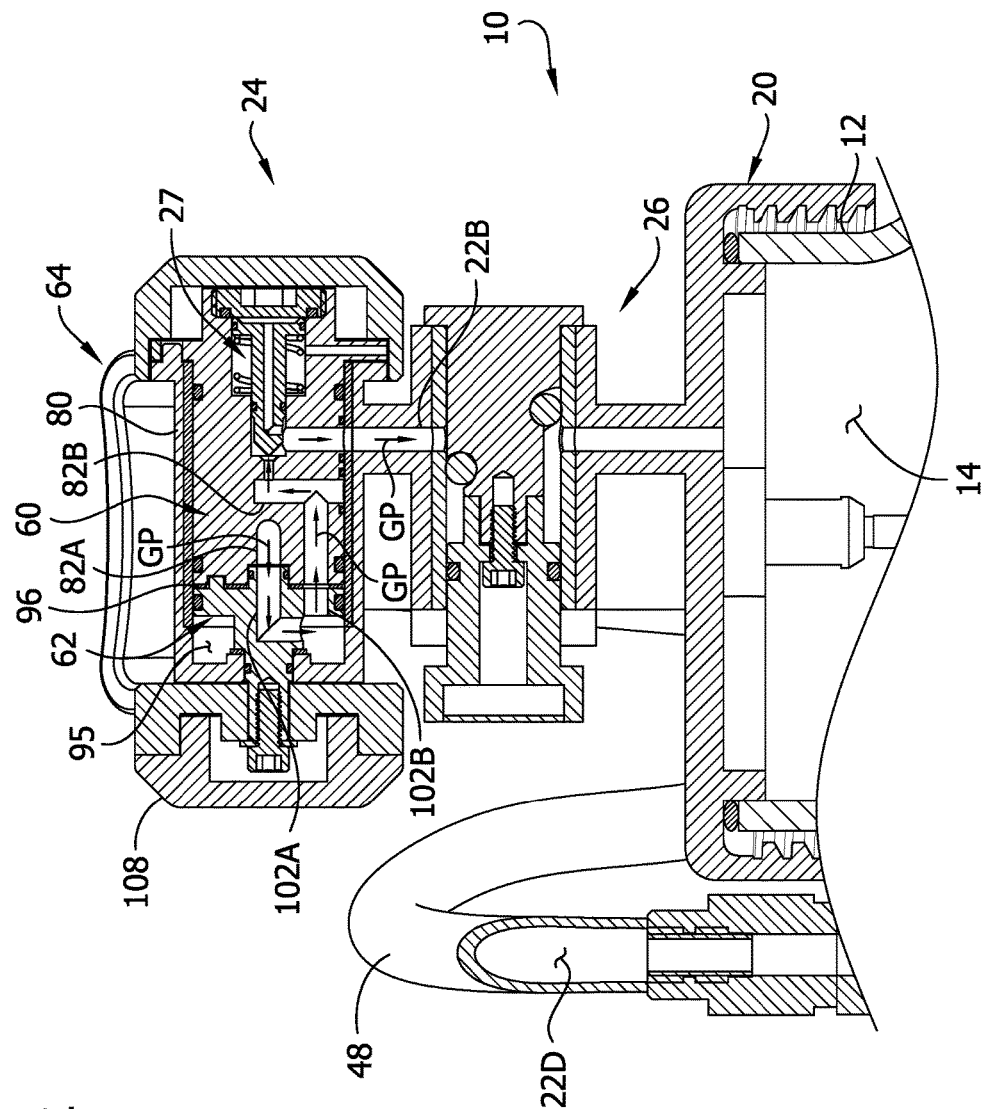
FIG. 32 is a cross section taken in a plane including line 32-32 of FIG. 31.
Figure 33:
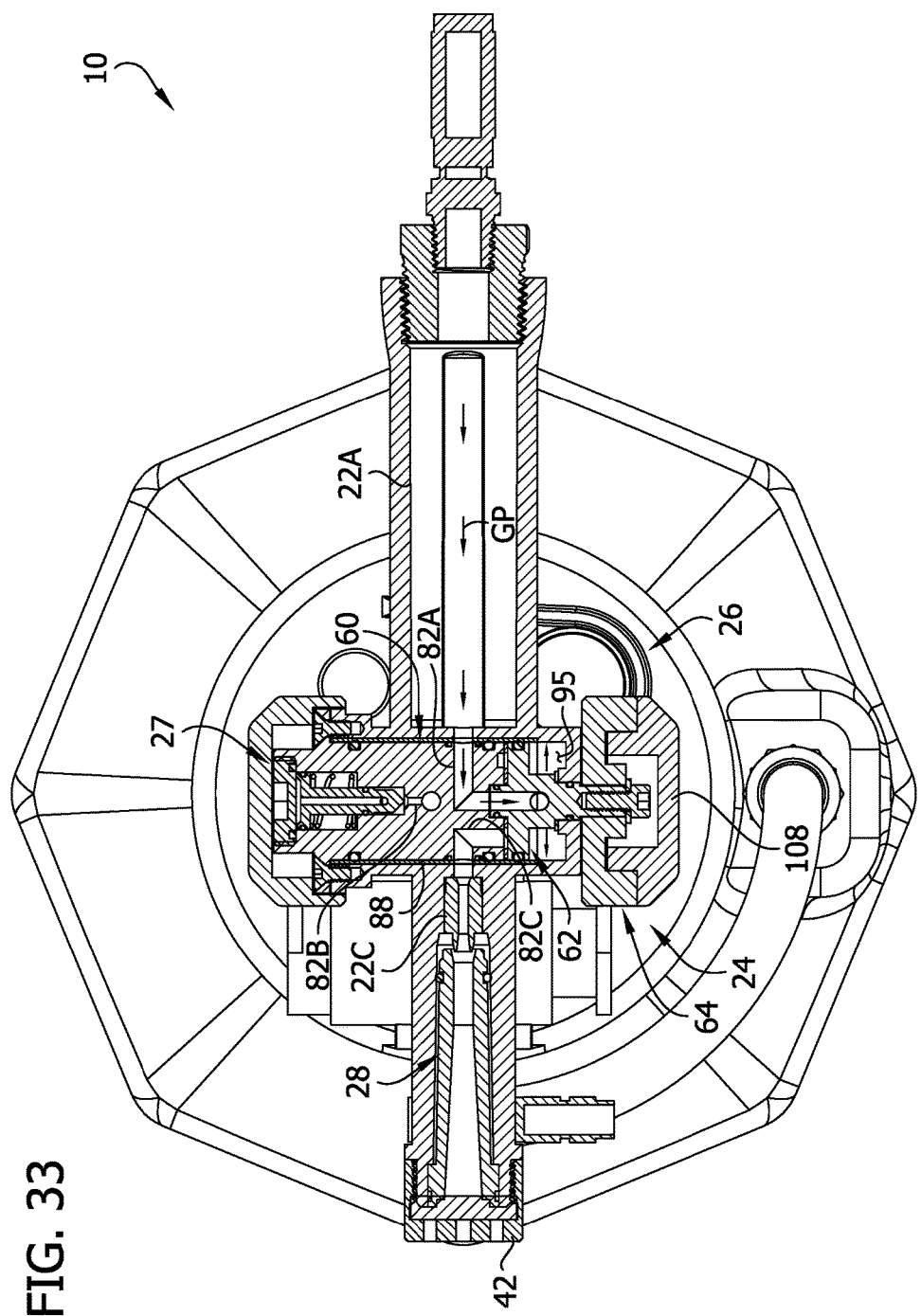
FIG. 33 is a cross section taken in a plane including line 33-33 of FIG. 31.
Figure 34:
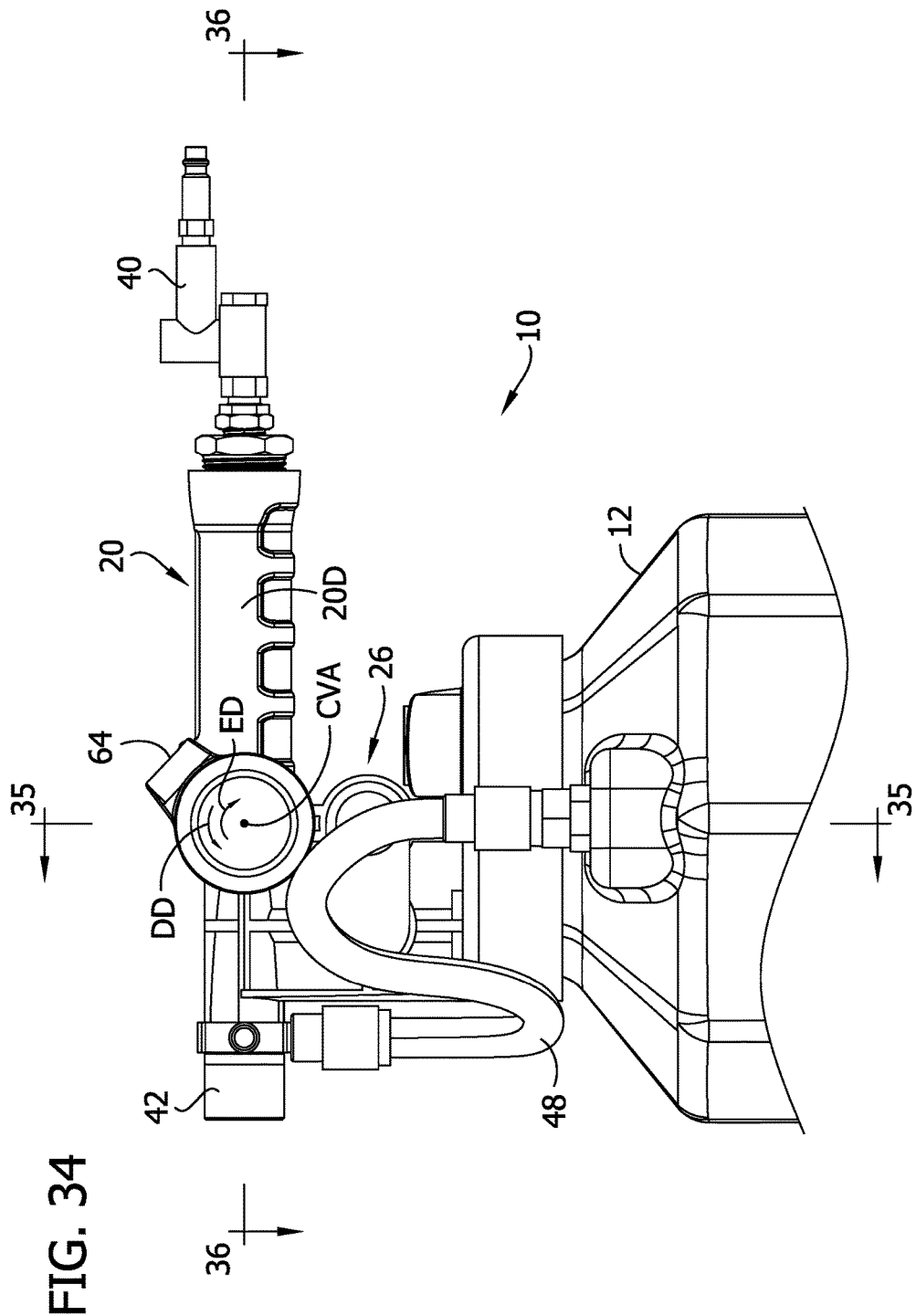
FIG. 34 is a partial side elevation of the liquid flow device illustrating the control valve in the evacuation configuration.

Referring to FIGS. 31-33, the control valve 24 can be adjusted to a dispensing configuration by pivoting the lever 64 in a dispensing direction DD. FIG. 31 shows one dispensing position of the lever 64 that adjusts the control valve 24 to be in the dispensing configuration. As the lever 64 pivots in the dispensing direction DD to the dispensing position, the control valve member 62 pivots conjointly with the lever 64 to a corresponding dispensing position. As shown in FIG. 32, in a dispensing position, the control valve member 62 is oriented so that the downstream connection channel 102B is aligned with the inlet opening 82Bi of the pressurization channel 82B. As shown in FIG. 33, in a dispensing position, the control valve member 62 is oriented so that the downstream connection channel 102B is not aligned with the inlet opening 82Ci of the evacuation channel 82C. Accordingly, in a dispensing configuration of the control valve 24, pressurized gas can flow along the gas flow path GP from the gas supply passage 22A through the gas supply channel 82A, the gas supply connection channel 102A, the annular cavity 95, and the downstream connection channel 102B and into the pressurization channel 82B. With the pressure valve 27 in the open configuration (discussed below), the gas flow path GP extends through the pressurization channel 82B into the pressurization passage 22B. With the mode selector valve 26 in the dispensing mode position, the gas flow path GP extends into the container interior 14 to drive liquid flow out of the container along the flow path LP through the liquid flow passage 22D defined by the dip tube 49 and liquid hose 48.

In the dispensing configuration, the lever 64 can be pivoted in relatively small increments in the dispensing direction DD to increase the flow rate along the gas flow path GP and in the evacuation direction ED to decrease the flow rate. Pivoting the lever 64 adjusts an angular position of the downstream connection channel 102B with respect to the inlet opening 82Bi of the pressurization channel 82B. Changing the relative angular position adjusts a size of the overlap between the outlet opening 102Bii of the downstream connection channel 102B and the inlet opening 82Bi of the pressurization channel 82B. The flow rate along the gas flow path GP in the dispensing configuration is proportional to the size of the overlap between the openings 102Bii and 82Bi. A full throttle dispensing position of the control valve 24 is reached when the lever is pivoted in the dispensing direction DD until the guide stud 93 of the control valve member 62 engages the control valve body 60 at the end of the guide groove 84. It will be appreciated that partially opening the control valve 24 in the dispensing mode will not usually merely decrease the time to achieve the threshold pressure in the interior 14 of the container 12 and will not effectively decrease the pressure at which liquid is dispensed. Even with the control valve 24 at less than fully open, gas pressure will build rapidly in the container 12, and the pressure valve 27 will control the dispensing pressure, which will usually be substantially constant. Accordingly, a user will likely adjust the valve 24 to fully open and permit the pressure valve 27 to operate as explained in further detail below.

Figure 35:
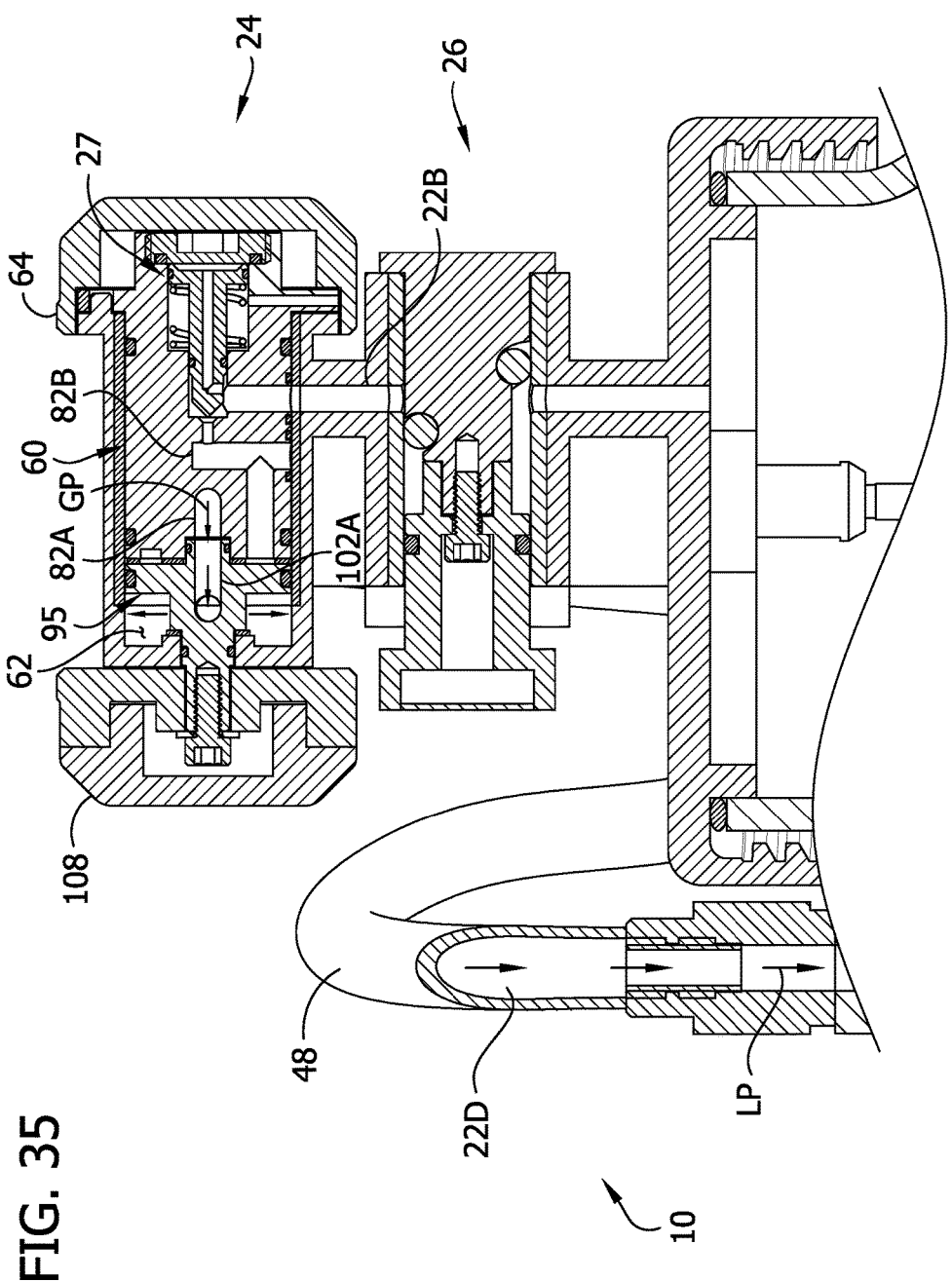
FIG. 35 is a cross section taken in a plane including line 35-35 of FIG. 34.
Figure 36:
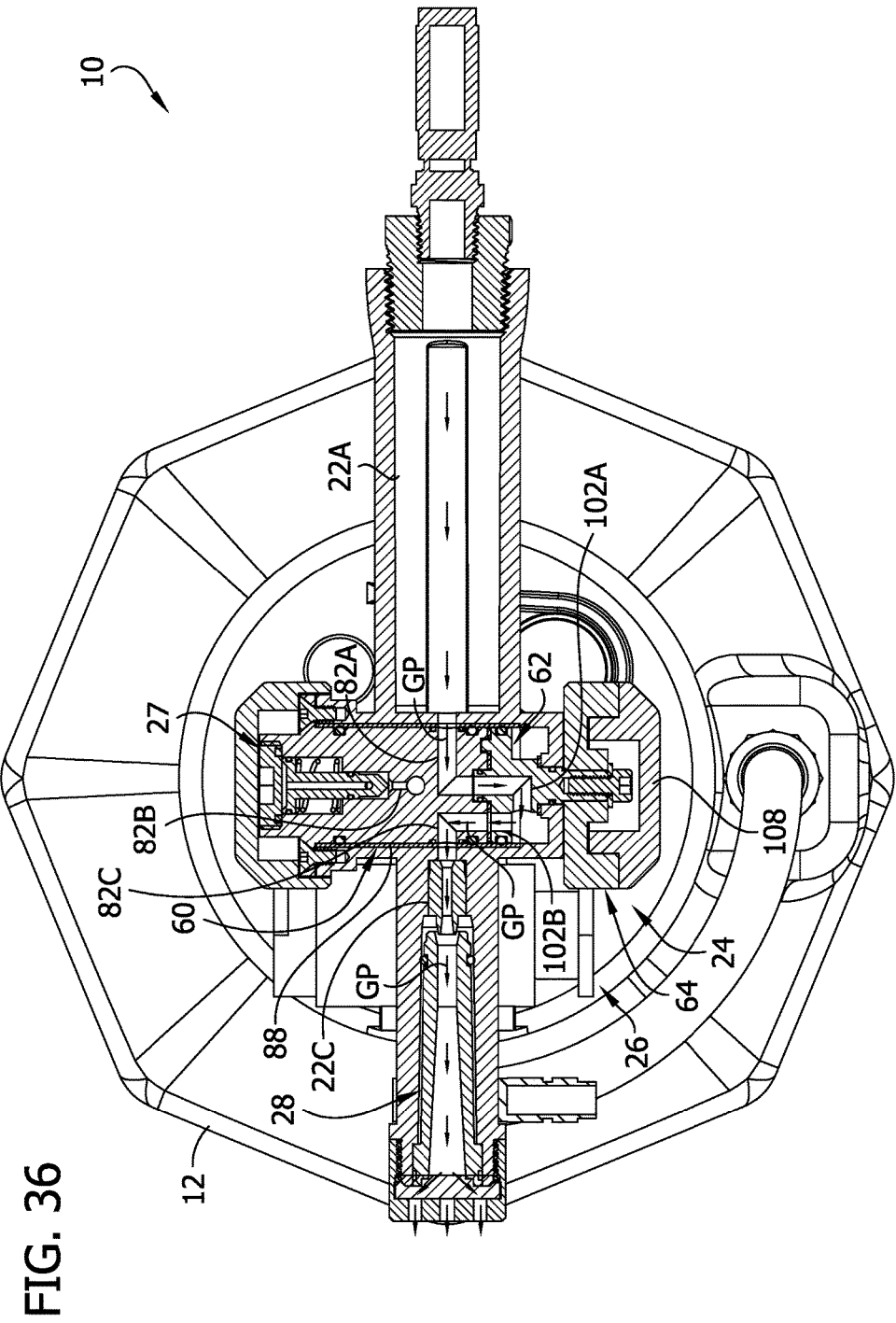
FIG. 36 is a cross section taken in a plane including line 36-36 of FIG. 34.

Referring to FIGS. 34-36, the control valve 24 can be adjusted to an evacuation configuration by pivoting the lever 64 in the evacuation direction ED. FIG. 34 shows one evacuation position of the lever 64 that adjusts the control valve to be in the evacuation configuration. When the lever 64 moves in the evacuation direction ED to the evacuation position, the control valve member 62 pivots conjointly with the lever 64 to a corresponding evacuation position. As shown in FIG. 35, in an evacuation position, the control valve member 62 is oriented so that the downstream connection channel 102B is not aligned with the inlet opening 82Bi of the pressurization channel 82B. As shown in FIG. 36, in an evacuation position, the control valve member 62 is oriented so that the downstream connection channel 102B is aligned with the inlet opening 82Ci of the evacuation channel 82C. Accordingly, in an evacuation configuration of the control valve 24, pressurized gas can flow along the gas flow path GP from the gas supply passage 22A through the gas supply channel 82A, the gas supply connection channel 102A, the annular cavity 95, and the downstream connection channel 102B and into the evacuation channel 82C. The gas flow path GP extends through the evacuation channel 82C into the evacuation passage 22C, creating a vacuum pressure in the evacuation leg 22Ci and exhausting gas through the muffler 42. With the mode selector valve 26 in the evacuation mode position, the vacuum pressure is communicated through the container interior 14 to the liquid flow passage 22D to draw liquid from an outside source along the flow path LP through the liquid hose 48 and dip tube 49 into the container 12.

In the evacuation configuration, the lever 64 can be pivoted in relatively small increments in the evacuation direction ED to increase the flow rate along the gas flow path GP and in the dispensing direction DD to decrease the flow rate. Pivoting the lever 64 adjusts an angular position of the downstream connection channel 102B with respect to the evacuation channel 82C, which adjusts a size of the overlap between the outlet opening 102Bii of the downstream connection channel and the inlet opening 82Ci of the evacuation channel. The flow rate along the gas flow path GP in the evacuation configuration is proportional to the size of the overlap between these openings 102Bii, 82Ci. A full throttle evacuation position of the control valve 24 is reached when the lever 64 is pivoted in the evacuation direction ED until the guide stud 93 of the control valve member 62 engages the control valve body 60 at the end of the guide groove 84. Accordingly, adjusting the lever 64 in the evacuation configuration increases or decreases the vacuum pressure generated by the flow restrictor 28 to adjust the rate at which liquid is drawn through the hose 48 into the container 12.

Referring again to FIGS. 18 and 20, in the illustrated embodiment the pressure valve 27 is located within the control valve 24. As explained above, when the control valve 24 is in the dispensing configuration, the pressure valve 27 is configured to increasingly block fluid communication along the pressurization passage 22B in response to increased pressure in the pressurization passage to limit pressure in the container 12. As will be explained below, the illustrated pressure valve 27 accomplishes this by automatically closing the pressurization channel 82B in the control valve body 60 when a pressure in the pressurization passage 22B exceeds a threshold.

As explained above, the control valve body 60 defines a pressure valve channel 82D that intersects the pressurization channel 82B at a location where the pressurization channel changes direction. Thus in the illustrated embodiment, the control valve body 60 also functions as a pressure valve body. Furthermore, in the illustrated embodiment, the pressure valve channel 82D extends along a pressure valve axis PVA that is coaxial with the control valve axis CVA. In other embodiments, the pressure valve body could be formed separately from the control valve body and/or the pressure valve channel could have another configuration without departing from the scope of the invention. An outboard segment of the body 60 adjacent the end portion 60B defines a large diameter, generally cylindrical segment 80Di of the pressure valve channel 80D, and an inboard portion of the body defines a smaller diameter, generally cylindrical segment 80Dii. A shoulder 110 extends radially (e.g., transverse to the pressure valve channel 80D) between the large and small diameter segments 80Di, 80Dii, and the body 60 defines a pressure valve seat 112 at an inboard end of the pressure valve channel 80D. In the illustrated embodiment, the pressure valve seat 112 includes a tapered (e.g., generally conical) surface.

The small diameter segment 80Dii of the pressure valve channel 80D provides fluid communication between transverse segments of the pressurization channel 82B. In the illustrated embodiment, the downstream segment of the pressurization channel 82B extends transverse to the pressure valve channel 82D in a generally radial direction from an opening at the small diameter segment 82Dii of the pressure valve channel 82D located adjacent the pressure valve seat 112 toward the outlet opening 82Biii. The pressure valve seat 112 extends circumferentially about an opening between the second intermediate segment of the pressurization channel 82B and the small diameter segment 80Dii of the pressure valve channel 80D. The second intermediate segment of the pressurization channel 80B extends away from the pressure valve seat 112 toward the first end portion 60A of the control valve body 60 in a direction extending generally along the pressure valve axis PVA.

The pressure valve 27 comprises a pressure valve member, generally indicated at 114, which is movably received in the pressure valve channel 82D, a spring 116 configured to bias the pressure valve member to an open position, and a cap 118 configured to hold the spring and pressure valve member inside the pressure valve channel. The illustrated cap 118 is sized for being mounted in a recess 120 formed in the second end portion 60B of the control valve body 60 over an open outer end of the pressure valve channel 82. An O-ring 122 is configured to seal an interface between the cap 118 and the second end portion 60B, and the cap is held in the recess 120 by the second end portion 64B of the lever 64.

The pressure valve member 114 is separate from the control valve body 60 and configured to automatically increasingly block fluid flow through the pressurization channel 82B in response to increasing pressure in the pressurization passage 22B. The pressure valve member 114 includes a shaft 124 extending generally along the pressure valve axis PVA. The shaft 124 has a first end portion 124A or plug defining a sealing surface (e.g., a conical sealing surface that tapers to a point) shaped and arranged for sealing engagement with the valve seat 112. An enlarged pressure head 126 extends radially outward from a second end portion 124B of the shaft 124. A shaft O-ring 127 received in a groove 128 about the shaft 124 provides a fluid seal between the shaft and the control valve body 60 at the small diameter segment 80Dii of the pressure valve channel 80D, and a head O-ring 129 received in a groove 130 about the head 126 provides a fluid seal between the head and the control valve body at the large diameter segment 80Di. The O-rings 127, 129 are configured to allow sliding movement of the pressure valve member 114 along the pressure valve axis PVA through the channel 82D while maintaining the respective fluid seals. Thus, the shaft 124 is sealingly and slidably engaged with control valve body 60 at small diameter segment 80Dii of the pressure valve channel 80D and the head 126 is sealingly and slidably engaged with the control valve body at the large diameter segment 80Di. The spring 118 comprises a compression spring that is operatively received (e.g., compressed) between the shoulder 110 and a spring face 126A of the head 126. The spring 118 biases the pressure valve member 114 outward in a biasing direction BD along the pressure valve axis PVA toward the open position illustrated in FIG. 20 in which the end portion 124A of the shaft 124 is spaced apart from the seat 112.

The pressure valve 27 is configured to communicate pressure in the pressurization passage 22B to a pressure surface 126B of the pressure head 128. The pressure valve member 114 defines a pressure valve member channel 140, which extends from a first end portion at an opening 140A through the side of the shaft 124 to a second end portion at an opening 140B through the pressure surface 126B. The pressure surface 126 is slightly concave and defines a cavity 142 between the pressure head 126 and the cap 118 for receiving fluid therein. The pressure valve channel 140 provides fluid communication between the pressurization channel 82B and the cavity 142 behind the pressure surface 126B. Pressure in the pressurization passage 22B is communicated through the pressurization channel 82B and the pressure valve member passage into the cavity 142.

Pressure in the cavity 142 imparts a force on the pressure valve member 114 in a direction opposite the biasing direction BD, against the biasing of the spring 116. When the pressure increases, the force causes the pressure valve member 114 to increasingly slide opposite the biasing direction BD through the pressure valve channel 82D against the biasing of the spring 116 toward the valve seat 112. When the pressure in the cavity 142 reaches a threshold pressure, the valve member 114 is moved against the biasing of the spring 116 to a closed position in which the first end portion 124A of the shaft 124 sealingly engages the seat 112. In the closed position, pressure valve member 114 blocks fluid communication through the pressurization channel 82B at the valve seat 112 and thus blocks fluid communication between the gas supply passage 22A and the pressurization passage 22B. In the illustrated embodiment, the pressure valve 27 can be referred to as a needle valve.

The arrangement is such that if pressure increases inside the container 12 when the liquid flow device 10 is operating in the dispensing mode, that pressure is communicated through the pressurization passage 22B, pressurization channel 82B, and pressure valve member channel 140 to the pressure surface 126B of the pressure valve 27. As pressure increases in the interior 14 of the container 12, the pressure valve member 114 moves increasingly toward the valve seat 112. When the pressure in the interior 14 exceeds the threshold, the fluid pressure acting on the pressure surface 126B moves the pressure valve member 114 to the closed position in which it blocks pressurized gas from flowing through the pressurization channel 82B. Assuming there is no blockage of the liquid passage 22D (e.g., no closed additional valve in the liquid passage 22D) and no blockage in the pressurization passage 22B, after the pressure valve 27 closes, fluid in the interior 14 of the container 12 will flow out of the liquid flow device 10 through the liquid passage and the pressure in the pressurization passage and thus the cavity 142 will decrease. As the pressure decreases in the cavity 142, the spring forces the pressure valve member 114 in the biasing direction BD to open fluid communication through the pressurization channel 82D. It will be appreciated, that in operation, the valve 27 may operate in a partially open configuration and will normally operate to provide a substantially constant liquid dispensing pressure.

Figure 37:
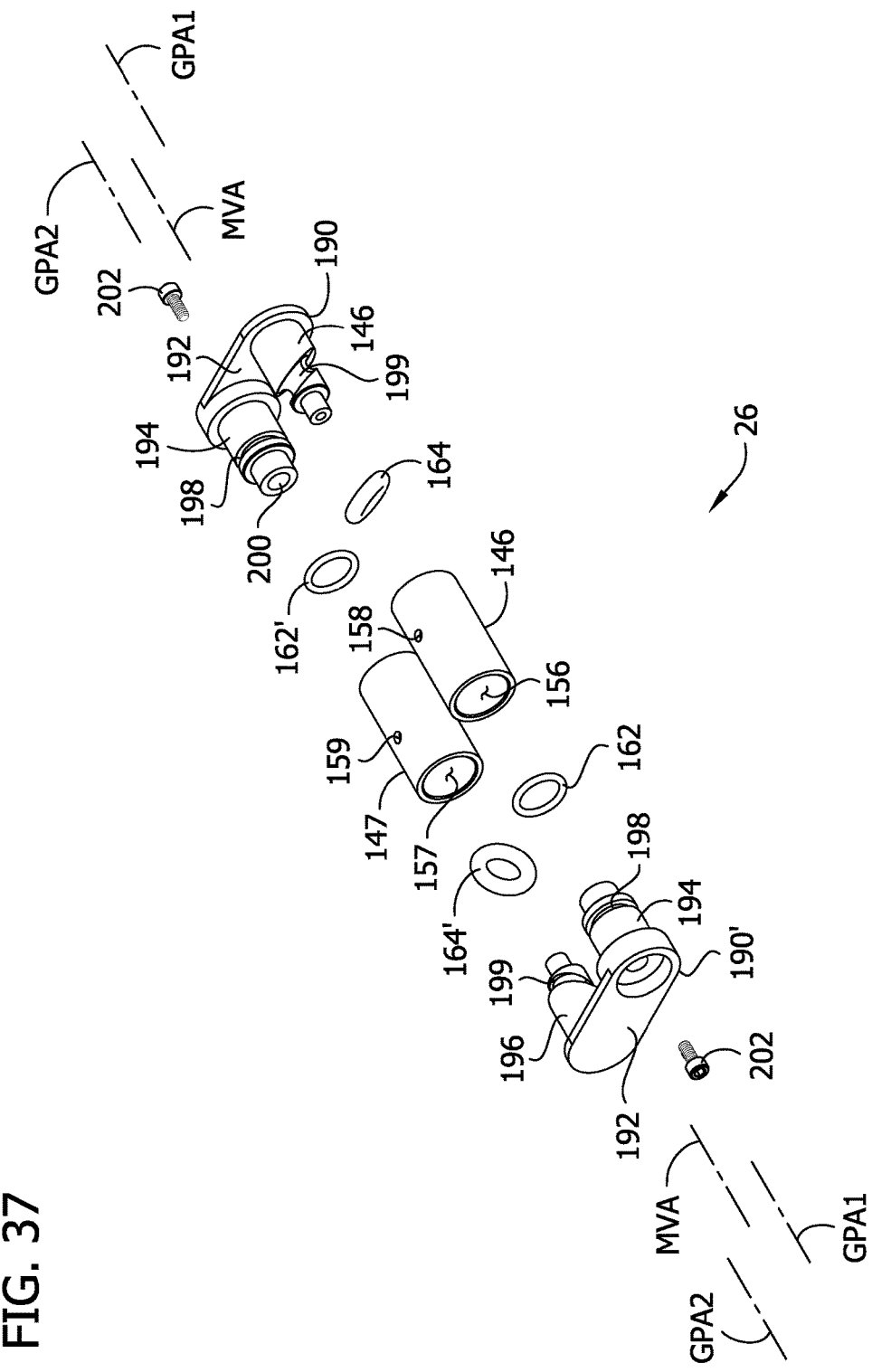
FIG. 37 is an exploded perspective of the mode selector valve.
Figure 38:
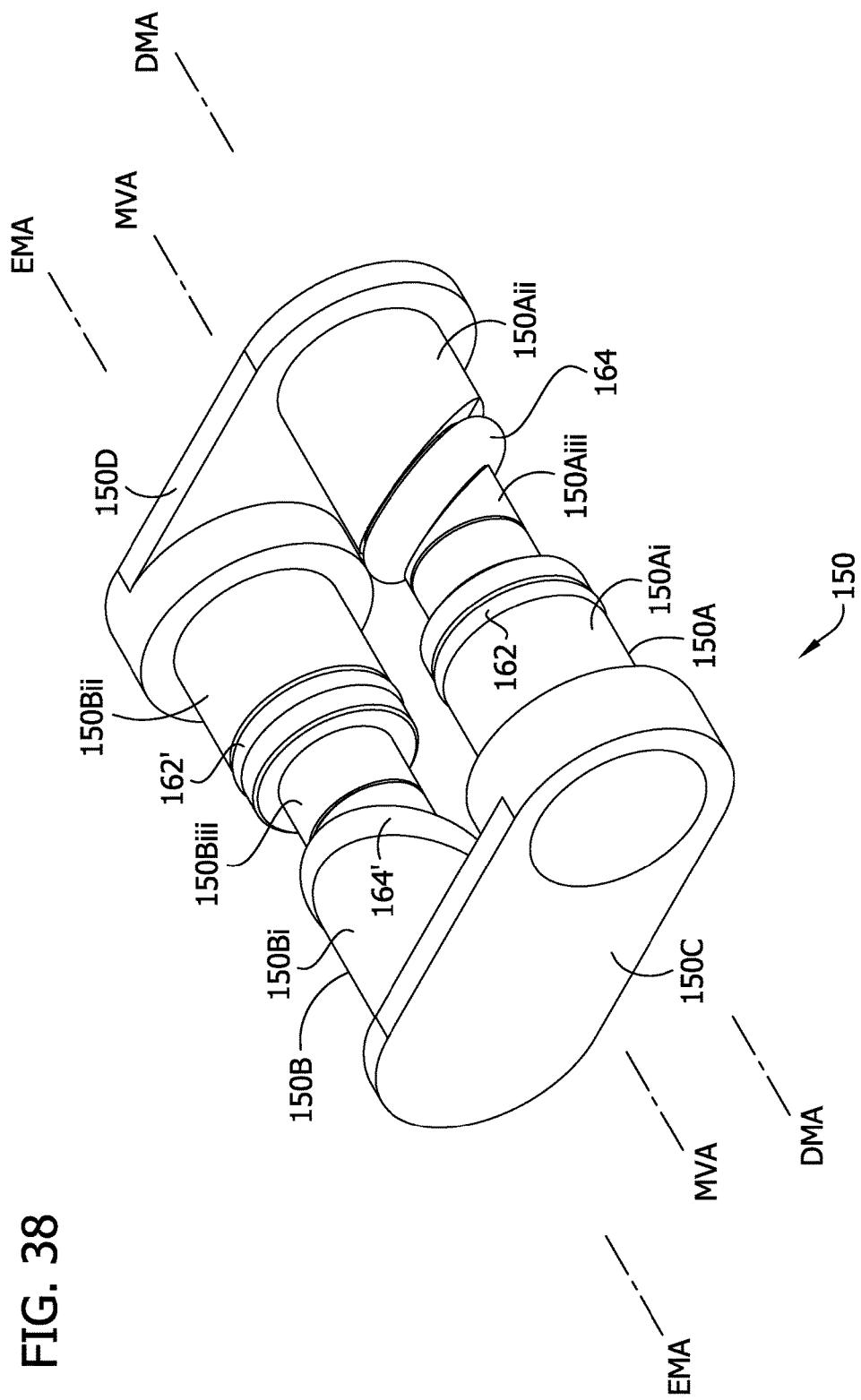
FIG. 38 is a perspective of a gate of the mode selector valve.

Referring to FIGS. 37 and 38, in the illustrated embodiment, the mode selector valve 26 comprises two manual sliding-spool valves configured for inversely opening and closing the pressurization passage 22B and the evacuation passage 22C. Referring to FIGS. 5 and 6, the mode selector valve 26 includes a mode selector valve body formed by the mode selector valve housing 20C and first and second tubes 146, 147 that are sealingly received in the receptacles 38, 39 of the mode selector valve housing. In addition, the mode selector valve comprises a mode selector valve member, generally indicated at 150, which is configured for movement with respect to the mode selector valve body along the mode selector valve axis MVA through a range of motion. As explained below, the body of the mode selector valve 26 is fluidly connected to the passaging 22, and the valve member 150 is configured to be selectively positioned in a dispensing mode position (FIGS. 41 and 42) in which the valve member closes the evacuation passage 22C and opens the pressurization passage 22B and an evacuation mode position (FIGS. 39 and 40) in which the valve member closes the pressurization passage and opens the evacuation passage. Other types of mode selector valves can be used without departing from the scope of the invention. Moreover, it will be appreciated that the illustrated mode selector valve 26, or aspects thereof, can be used in other types of fluid flow devices than the illustrated liquid flow device 10.

Figure 39:
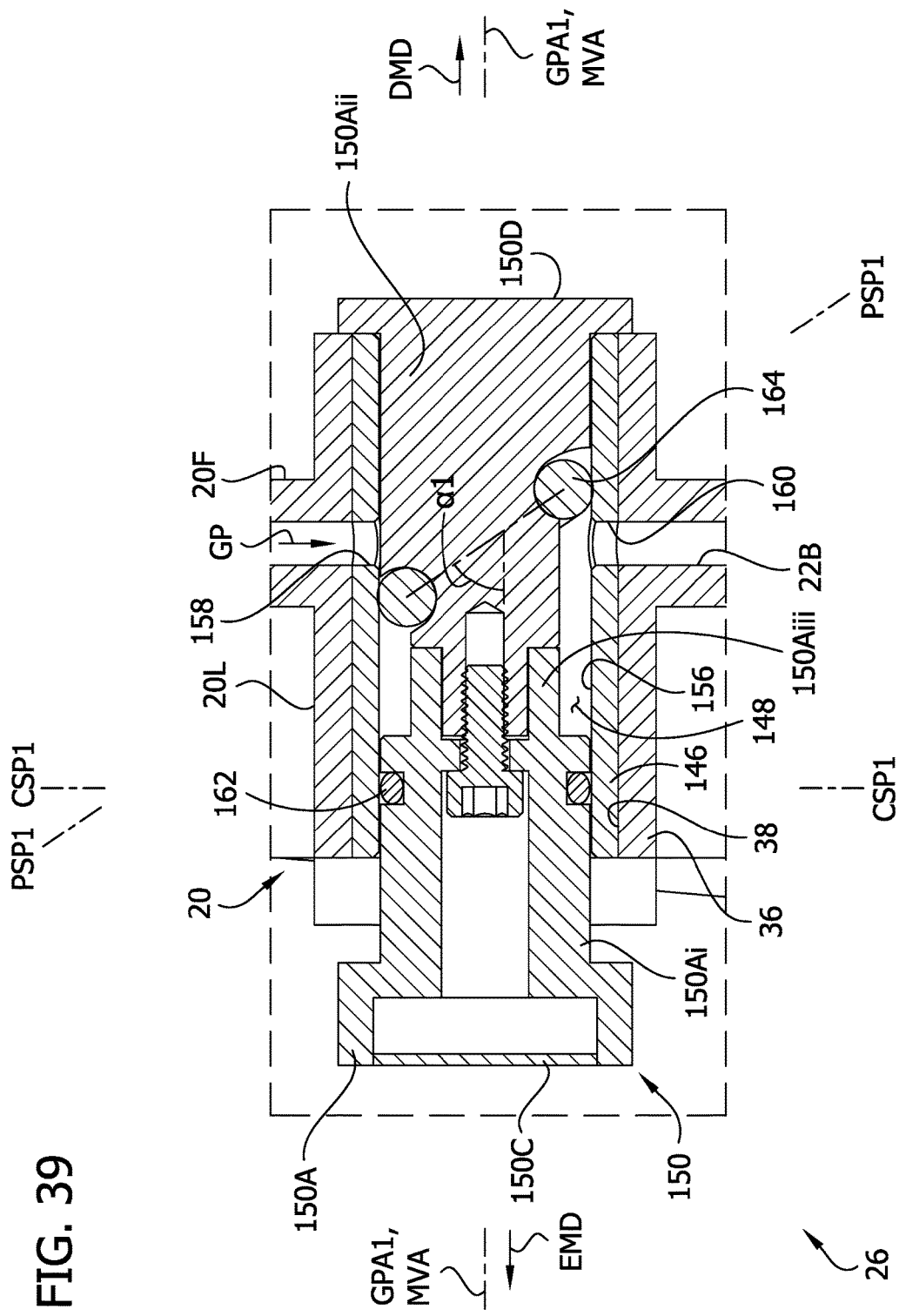
FIG. 39 is an enlarged view of a portion of FIG. 4, illustrating a first gate portion of the gate valve when the mode selector valve is in the evacuation mode position.

Referring to FIG. 39, the first tube 146 is sealingly received in the tube 36 of the mode selector valve housing 20C, which crosses the pressurization passage 22B. The first tube 146 defines a first selector valve channel 156 that extends generally parallel to the mode selector valve axis MVA between opposite open ends. The first tube 146 crosses the pressurization passage 22B and includes first and second holes 158, 160 at circumferentially spaced locations that are respectively aligned with first and second segments of the pressurization passage 22B (e.g., upper and lower segments, upstream and downstream segments, etc.). The holes 158, 169 provide fluid communication between the pressurization passage 22B and the first selector valve channel 156.

Figure 40:
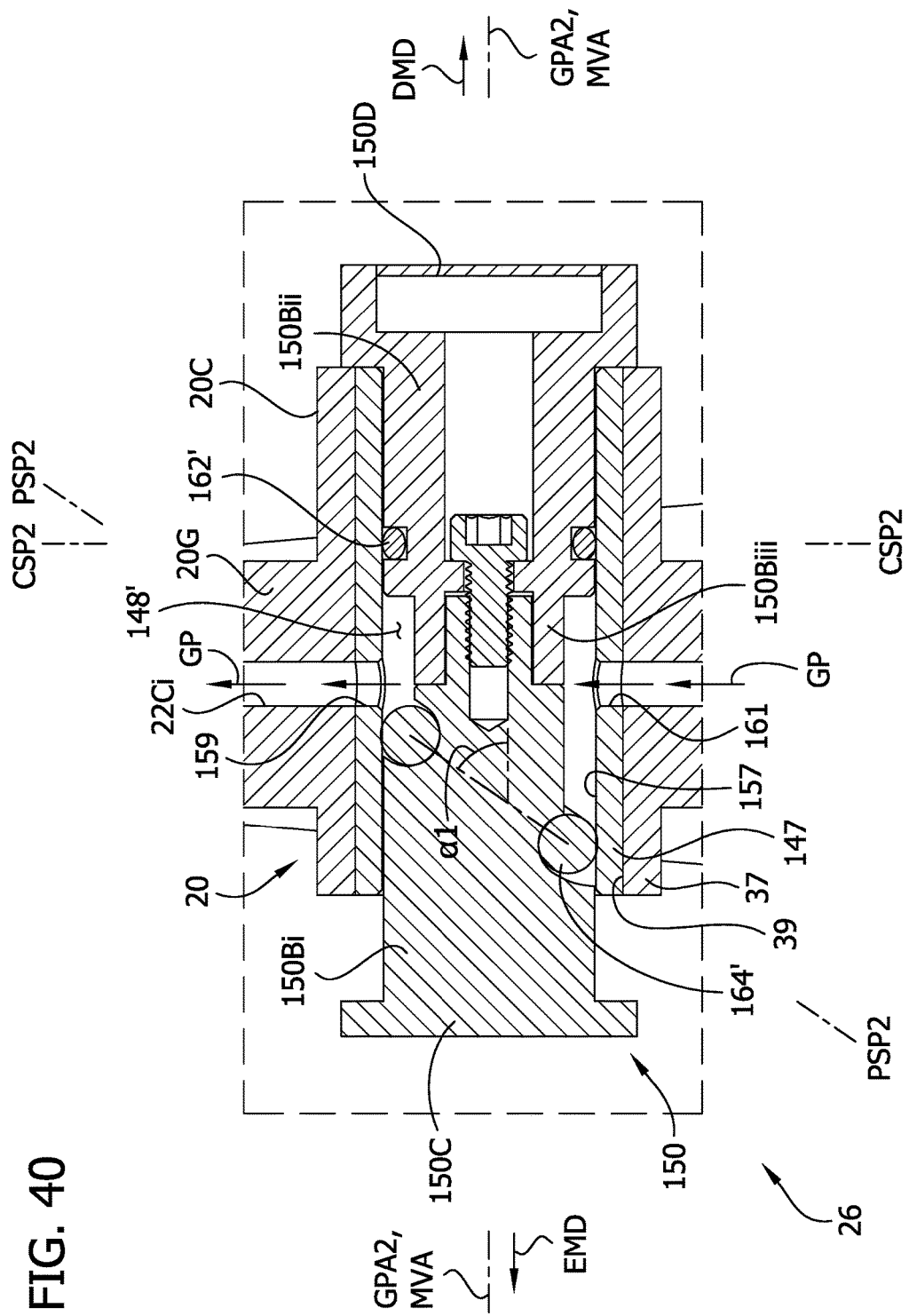
FIG. 40 is an enlarged view of a portion of a cross section taken in a plane including line 40-40 of FIG. 3, illustrating a second gate portion of the gate valve when the mode selector valve is in the evacuation mode position.

Referring to FIG. 40, the second tube 147 is sealingly received in the tube 37 of the mode selector valve housing 20C, which crosses the evacuation leg 22Ci of the evacuation passage 22C. The second tube 147 defines a second selector valve channel 157 that extends generally parallel to the mode selector valve axis MVA between opposite open ends at a location spaced apart from the first selector valve channel 156. The second tube 147 crosses the evacuation leg 22Ci of the evacuation passage 22C and includes first and second holes 159, 161 at circumferentially spaced locations that are respectively aligned with first and second segments of the evacuation leg 22Ci of the evacuation passage 22C (e.g., upper and lower segments, downstream and upstream segments, etc.). The holes 159, 161 provide fluid communication between the evacuation leg 22Ci and the second selector valve channel 157.

Referring to FIGS. 38-40, the assembled valve member 150 generally includes first and second spools 150A, 150B (broadly, valve member portions) shaped and arranged for sliding movement in the selector valve channels 156, 157. The first spool 150A is configured to be sealingly and slidably received in the first selector valve channel 156 and the second spool 150B is configured to be sealingly and slidably received in the second selector valve channel 157. Each spool 150A, 150B extends along a respective axis GPA1, GPA2 from a first end segment 150Ai, 150Bi to a second end segment 150Aii, 150Bii and has a middle segment 150Aiii, 150Biii (broadly, groove) between the respective first and second end segments. The first end segments 150Ai of the first spool 150A is connected to the second end segment 150Bii of the second spool 150B by a first bridge 150C that defines a first end of the valve member 150, and the second end segments 150Aii of the first spool and the first end segment 150Bi of the second spool are connected by a second bridge 150D that defines a second end of the valve member. The bridges 150C, 150D connect the spools 150A, 150A such that the valve member 150 is slidable as a single unit through its range of motion along the mode selector valve axis MVA. In addition, outward facing major surfaces of the bridges 150C, 150D define pushing surfaces of the valve member 150 for use in manually actuating the mode selector valve 26 by pushing the valve member to slide along the axis MVA as described below. During use of the mode selector valve 26, the first spool 150A and the second spool 150B slide conjointly through the respective channels 156, 157 to adjust the mode selector valve between the dispensing mode and evacuation mode configurations.

Referring still to FIGS. 38-40, in the assembled valve member 150, the first and second spools 150A, 150B have inverted orientations, but are otherwise the same. Thus, the first end segment 150Ai of the first spool 150A has similar features to the first end segment 150Bi of the second spool 150B, but in an opposite orientation; the second end segment 150Aii of the first spool has similar features to the second end segment 150Bii of the second spool, but in an opposite orientation; and the middle segments 150Aiii, 150Biii have similar features but in opposite orientations. The inverted orientations of the first and second spools 150A, 150B configures the valve member 150 so that, when the valve member 150 is in the dispensing mode position (FIGS. 41-42), the first spool permits flow along the pressurization passage 22B and the second spool blocks flow along the evacuation leg 22Ci. And likewise, when the valve member 150 is in the evacuation mode position (FIGS. 39, 40), the first spool 150A blocks flow through the pressurization passage 22B and the second spool 150B permits flow through the evacuation leg 22Ci.

Referring to FIGS. 39-42, each of the first end segments 150Ai, 150Bi of the spools 150A, 150B has a generally cylindrical outer surface (e.g., a generally circular cross-sectional shape) having a diameter that is sized and arranged for being slidably received in the respective one of the first and second selector valve channels 156, 157 in a relatively close tolerance fit with the respective tube 146, 147. A channel seal O-ring 162 (broadly, seal or land) extends about the first end segment 150Ai of the first spool 150A and a substantially identical channel seal O-ring 162' (broadly, seal or land) extends about the first end segment 150Bi of the second spool 150B. The channel seal O-ring 162 sealingly engages the tube 146 along a continuous hoop that, in the illustrated embodiment, extends generally in a first channel sealing plane CSP1 oriented substantially perpendicular to first spool axis GPA1. Likewise, the channel seal O-ring 162' sealingly engages the tube 147 along a continuous hoop that extends generally in a second channel sealing plane CSP2 oriented substantially perpendicular to the second spool axis GPA2.

Figure 42:
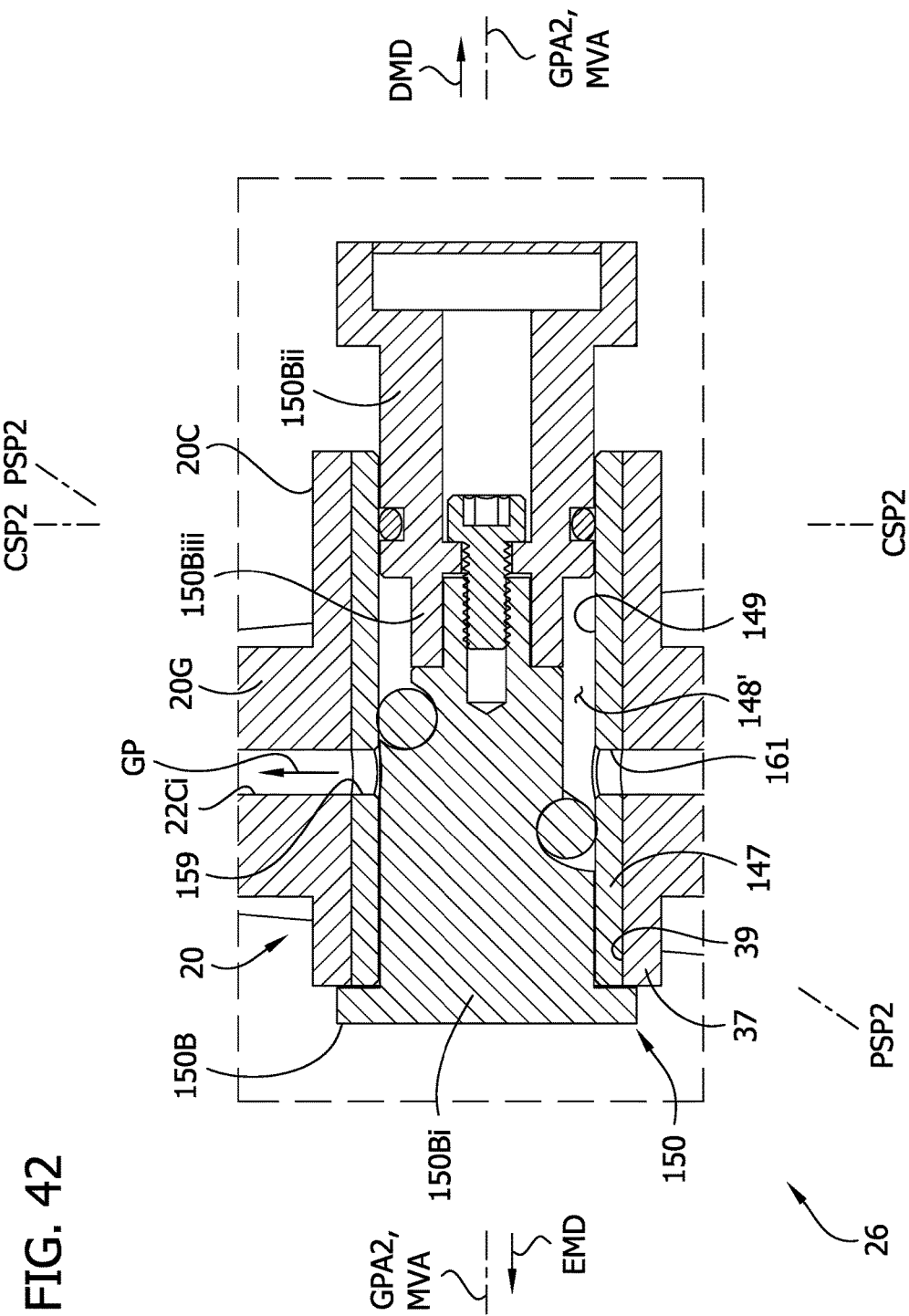
FIG. 42 is substantially similar to FIG. 40 but shows the mode selector valve in the dispensing mode position.

Each of the second end segment 150Aii of the first spool 150A and the second end segment 150Bii of the second spool 150B also has a generally cylindrical outer surface (e.g., a generally circular cross-sectional shape) having a diameter that is sized and arranged for being slidably received in the respective channel 156, 157 in a relatively close tolerance fit with the respective tube 146, 157. A passage seal O-ring 164, 164' (broadly, seal or land) extends about each spool 150A, 150B at the inboard end of the respective end segment 150Aii, 150Bii. Each passage seal O-ring 164, 164' is spaced apart along the respective spool axis GPA1, GPA2 from the respective channel seal O-ring 162, 162'. As shown in FIG. 39, the passage seal O-ring 164 is configured to sealingly engage the tube 146 across the pressurization passage 22B to block fluid flow along the pressurization passage when the mode selector valve 26 is in the evacuation mode position. Likewise, as shown in FIG. 42, the passage seal O-ring 164' is configured to sealingly engage the tube 147 across the evacuation leg 22Ci to block fluid flow along the evacuation leg when the mode selector valve is in the dispensing mode position.

Thus each passage seal O-ring 164, 164' is configured to sealingly engage the respective tube 146, 147 continuously about a sealing hoop that includes at least a portion extending transverse to the respective one of the pressurization passage 22B and the exhaust leg 22Ci of the exhaust passage 22C. More specifically, the sealing hoop of the passage seal O-ring 164 is oriented substantially in a first passage seal plane PSP1 (FIG. 39) extending at a skew angle α1 with respect to the first spool axis GPA1. The sealing hoop of the passage seal O-ring 164' extends in a second passage seal plane PSP2 (FIG. 40) extending at a skew angle α2 with respect to the second spool axis GPA2. For example, in the illustrated embodiment, each of the skew angles α1, α2 is less than 90° and is in an inclusive range of from about 20° to about 70°, and more desirably in an inclusive range of from about 30° to about 60° (e.g., about) 45°, and the second passage seal plane PSP2 slopes in an opposite direction with respect to the first passage seal plane PSP1. The skew angles α1, α2 are selected so that each substantially planar passage seal O-ring 164, 164' extends fully across the respective one of the pressurization passage 22B and the exhaust leg 22Ci. Thus, as shown in FIG. 39, when the mode selector valve 26 is in the evacuation mode configuration, the passage seal O-ring 164 prevents fluid from flowing through the pressurization passage 22B and the gas flow path GP ends at the passage seal O-ring. Similarly, as shown in FIG. 42, when the mode selector valve 26 is in the dispensing mode configuration, the passage seal O-ring 164' prevents fluid from flowing through the exhaust leg 22Ci and the gas flow path GP ends at the passage seal O-ring.

Figure 41:
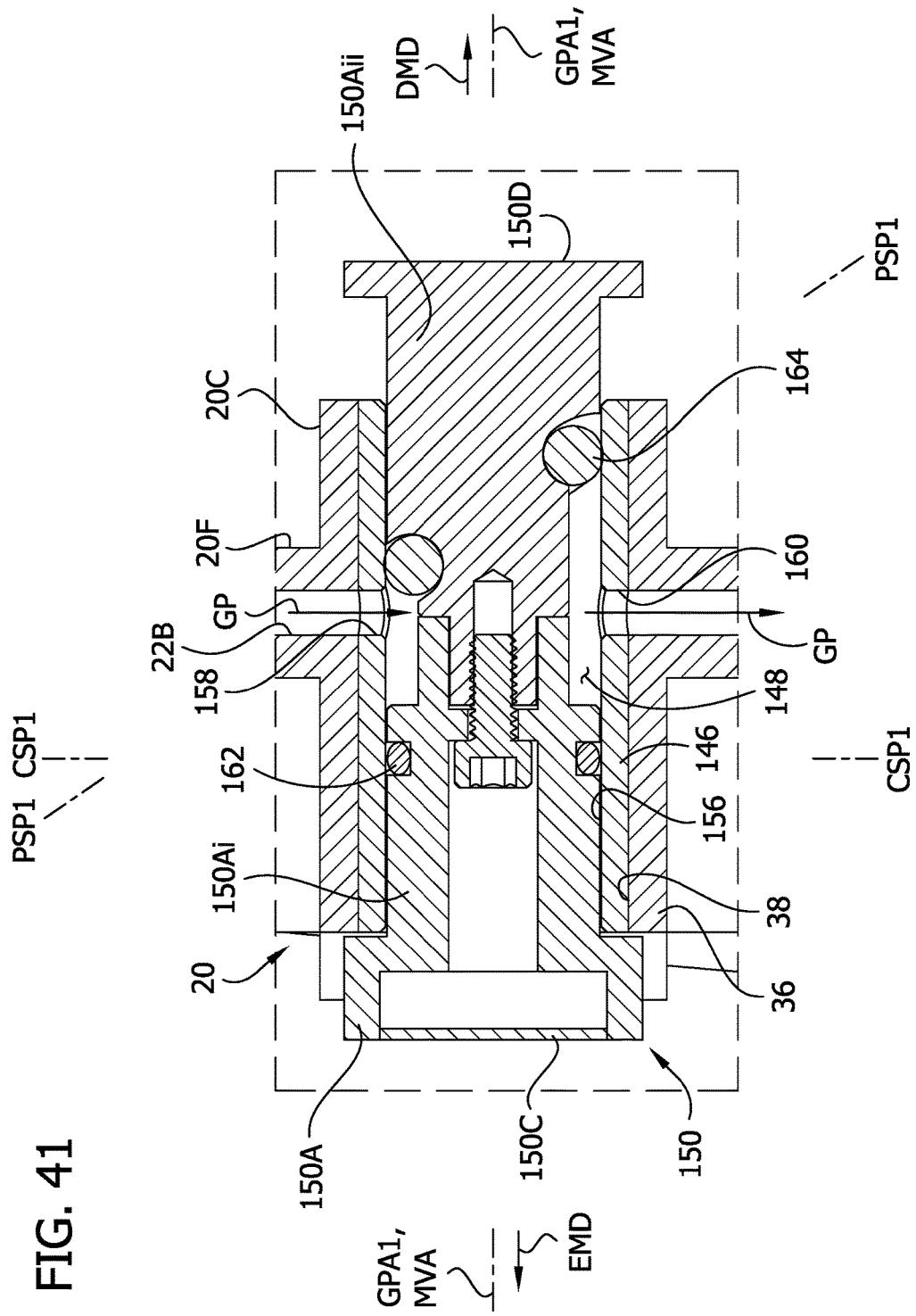
FIG. 41 is substantially similar to FIG. 39 but shows the mode selector valve in the dispensing mode position.

Each of the middle segments 150Aiii, 150Biii (broadly, grooves) of the spools 150A, 150B has a generally cylindrical outer surface that has a diameter that is substantially smaller than the internal diameter of the respective tube 146, 147. Thus, each middle segment 150Aiii, 150Biii is shaped and arranged to define an annular gap 148, 148' between the middle segment and the respective tube 146, 147. The annular gap 148, 148' forms a chamber that is sealed at opposite ends by a respective pair of a channel seal O-ring 162, 162' and a passage seal O-ring 164, 164'. When the mode selector valve 26 is in the dispensing mode position as shown in FIG. 41, the middle segment 150Aiii is aligned along the mode selector valve axis MVA with the pressurization passage 22B. In this configuration, gas flow along the gas flow path GP through the pressurization passage 22B passes through the annular gap 148 from the upstream segment to the downstream segment of the pressurization passage, which communicates directly with the interior 14 of the container 12. When the mode selector valve 26 is in the evacuation mode position as shown in FIG. 40, the middle segment 150Biii is aligned along the mode selector valve axis MVA with the evacuation leg 22Ci. In this configuration, gas flow along the gas flow path GP through the evacuation leg 22Ci extends through the annular gap 148 from the lower segment of the evacuation leg, which communicates directly with the interior 14 of the container 12, to the upper segment of the evacuation leg.

Referring to FIG. 37, the illustrated valve member 150 is formed from an assembly of substantially identical first and second valve member pieces 190, 190', first and second channel seal O-rings 162, 162', and first and second passage seal O rings 164, 164'. In certain embodiments, the valve member pieces 190, 190' comprise injection molded parts. Each of the illustrated valve member pieces 190, 190' includes a base 192 which defines a respective one of the first and second bridges 150C, 150D and first and second studs 194, 196 extending generally parallel to the mode selector valve axis MVA from the respective base. The first stud 194 of each valve member piece 190, 190' defines a perpendicular annular channel seal groove 198 configured for receiving a respective one of the channel seals 162, 162' therein, and the second stud 196 of each gate piece 190, 190' defines a slanted passage seal groove 199 configured for receiving a respective one of the passage seals 164, 164' therein. The inboard end segment of each first stud 194 defines a socket 200 shaped and arranged for matingly receiving an inboard end segment of the second stud 196 of the other valve member piece 190, 190'. When the inboard end segment of each first stud 194 is matingly received in the socket 200 of the second stud 196 of the other valve member piece 190, 190', the two valve member pieces can be fastened together at the inboard end segments of the two pairs of mated studs using screws 202.

Referring again to FIGS. 38-42, to use the mode selector valve 26, a user pushes the pushing surfaces of the bridges 150C, 150D to slide the first and second spools 150A, 150B conjointly along the mode selector valve axis. The user pushes on the pushing surface of the bridge 150C to slide the valve member 150 in a dispensing mode direction DMD toward the dispensing mode position shown in FIGS. 41 and 42 and pushes the pushing surface of the second bridge 150D to slide the valve member 150 in an evacuation mode direction EMD toward an evacuation mode position shown in FIGS. 39 and 40.

Sliding the valve member 150 in the evacuation mode direction EMD to the evacuation mode position moves the valve member as a unit along the mode selector valve axis MVA so that the first spool 150A closes the pressurization passage 22B at the first selector valve channel 156 and the second spool 150B opens the evacuation leg 22Ci at the second selector valve channel 157. In the evacuation mode position, the first passage seal O-ring 164 (FIG. 39) forms a seal with the tube 146 that closes the pressurization passage 22B at the first mode selector valve channel 156. Also in the evacuation mode position, the second passage seal O-ring 164' (FIG. 40) is spaced apart from the evacuation leg 22Ci along the mode selector valve axis MVA in the evacuation mode direction EMD. Thus, if the control valve 24 is in the evacuation configuration, vacuum pressure at the venturi nozzle 28 is communicated to the upper segment of the evacuation leg 22Ci and through the annular cavity 148' (which is sealed at its ends by the O-rings 162', 164') to the lower segment of the evacuation leg. The lower segment of the evacuation leg 22Ci communicates the vacuum pressure to the interior 14 of the container 12 to evacuate liquid from an outside source into the container through the liquid hose 48 and dip tube 49.

Sliding the valve member 150 in the dispensing mode direction DMD to the dispensing mode position moves the valve member as a unit along the mode selector valve axis MVA so that the first spool 150A opens the pressurization passage 22B at the first selector valve channel 156 and the second spool 150B closes the evacuation leg 22Ci at the second selector valve channel 157. In the dispensing mode position, the first passage seal O-ring 164 (FIG. 41) is spaced apart from the pressurization passage 22B along the mode selector valve axis MVA in the dispensing mode direction DMD. Also in the evacuation mode position, the second passage seal O-ring 164' (FIG. 42) forms a seal with the tube 147 that closes the evacuation leg 22Ci at the second mode selector valve channel 157. Thus, if the control valve 24 is in the dispensing configuration, pressurized gas flows along the flow path GP from the upstream segment of the pressurization passage 22B and through the annular cavity 148 (which is sealed at its ends by the O-rings 162, 164) to the downstream segment of the pressurization passage. The downstream segment of the pressurization passage 22B delivers the pressurized gas to the interior 14 of the container 12 to dispense liquid in the container through the dip tube 49 and liquid hose 48.

As is now apparent, the illustrated liquid flow device 10 can be selectively used in either a dispensing mode or an evacuation mode to control the flow of liquid out of or into the container 12. To use the device 10 in the evacuation mode, the mode selector valve 26 must be adjusted to be in its evacuation mode configuration as explained above and the control valve 24 must also be adjusted to be in its evacuation configuration as explained above. To use the device 10 in the dispensing mode, the mode selector valve 26 must be adjusted to be in its dispensing mode configuration as explained above and the control valve 24 must also be adjusted to be in its dispensing configuration as explained above. The requirement that two valves 24, 26 be adjusted to be in corresponding configurations to operate the device in either of the dispensing and evacuation modes limits the likelihood of a sudden unintended switch between operational modes caused by accidental movement of the control valve lever 46 or mode selector valve gate 150. Switching between modes requires deliberate action by the user. In the evacuation mode of the liquid flow device 10, the flow rate at which liquid is evacuated can be fine-tuned by pivoting the lever 64 in small amounts about the control valve axis CVA. In the dispensing mode, the pressure valve 27 automatically controls the dispensing pressure and will block fluid communication between the gas supply passage 22A and the interior 14 of the container 12 as needed to prevent dispensing pressure above a designed threshold.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A liquid dispenser and evacuation device comprising:
   a container having an interior for receiving liquid therein and defining an opening in fluid communication with the interior of the container;
   a lid configured to be mounted on the container over the opening;
   passaging supported by the container when the lid is mounted on the container, the passaging including a gas supply inlet and a venturi configured to generate vacuum pressure, the passaging configured to be in fluid communication with the interior of the container when the lid is mounted on the container,
   a control valve in fluid communication with the passaging when the lid is mounted on the container, the control valve being adjustable to a control valve dispensing configuration in which the control valve permits gas flow through the passaging from the gas supply inlet to the interior of the container and blocks gas flow through the passaging from the gas supply inlet to the venturi, and the control valve being adjustable to a control valve evacuation configuration in which the control valve blocks gas flow through the passaging from the gas supply inlet to the interior of the container and permits gas flow through the passaging from the gas supply inlet to the venturi to create vacuum pressure in the interior of the container, and a mode selector valve in fluid communication with the passaging when the lid is mounted on the container, the mode selector valve being adjustable to a mode selector valve dispensing configuration in which the mode selector valve blocks gas flow through the passaging to prevent the venturi from creating vacuum pressure in the interior of the container, and the mode selector valve being adjustable to a mode selector valve evacuation configuration in which the mode selector valve blocks gas flow through the passaging from the gas supply inlet to the interior of the container.

2. The device as set forth in claim 1, wherein the control valve includes an actuator operable to adjust the configuration of the control valve between the control valve dispensing configuration and the control valve evacuation configuration, the control valve actuator being movable in a range of motion between a dispensing position in which the control valve is in the control valve dispensing configuration and an evacuation position in which the control valve is in the control valve evacuation configuration, the control valve actuator being movable to a closed position in the range of motion between the dispensing and the evacuation positions, the control valve being in a control valve closed configuration when the control valve actuator is in the closed position, the control valve in the control valve closed configuration blocking gas flow through the passaging from the gas supply inlet to the interior of the container and blocking gas flow through the passaging from the gas supply inlet to the venturi.

3. The device as set forth in claim 2, wherein the control valve comprises a rotary valve.

4. The device as set forth in claim 3, wherein the mode selector valve comprises a spool valve.

5. The device as set forth in claim 1, wherein the mode selector valve includes a selector valve body defining selector valve channeling including a first selector valve channel crossing the passaging, the mode selector valve including a first valve member portion slidable in the first selector valve channel between an open position in which the first valve member portion permits gas flow through the passaging and a closed position in which the first valve member portion blocks gas flow through the passaging.

6. The device as set forth in claim 5, wherein the first valve member portion includes a passage seal configured in the closed position to sealingly engage the selector valve body across the passaging to close the passaging.

7. The device as set forth in claim 6, wherein the first valve member portion is slidable along a slide axis, and the passage seal is configured to sealingly engage the selector valve body continuously about a sealing hoop that extends around the slide axis.

8. The device as set forth in claim 7, wherein the sealing hoop is oriented substantially in a seal plane oriented at a skew angle less than 90 degrees with respect to the slide axis of the first valve member portion.

9. The device as set forth in claim 8 wherein the skew angle is in an inclusive range of from about 20 degrees to about 70 degrees.

10. The device as set forth in claim 9, wherein the passaging includes an upstream passage segment arranged to deliver gas to the first selector valve channel and a downstream passage segment arranged to receive gas from the first selector valve channel, the upstream passage segment and downstream passage segment being aligned with each other.

11. The device as set forth in claim 5, wherein the mode selector valve body further includes a second selector valve channel crossing the passaging, the first selector valve channel crossing a first passage of the passaging, and the second selector valve channel crossing a second passage of the passaging, the mode selector valve including a second valve member portion slidable in the second selector valve channel between an open position in which the second valve member portion permits gas flow through the second passage and a closed position in which the second valve member portion blocks gas flow through the second passage.

12. The device as set forth in claim 11, wherein the first and second valve member portions are operatively connected for conjoint movement by which movement of the first valve member portion toward its closed position causes movement of the second valve member portion toward its open position.

13. The device as set forth in claim 12, wherein the first passage is an evacuation passage and the second passage is a pressurization passage, the first selector valve channel crossing the evacuation passage and the second selector valve channel crossing the pressurization passage, the first valve member portion being in the closed position when the selector mode valve is in the dispensing configuration, and the second valve member being in the closed position when the selector mode valve is in the evacuation configuration.

14. The device as set forth in claim 11, wherein each of the first and second valve member portions includes a passage seal configured to sealingly engage the selector valve body across the respective one the first and second passages to close the respective passage.

15. The device as set forth in claim 14 wherein each of the first and second valve member portions has a respective slide axis and each passage seal is configured to sealingly engage the selector valve body continuously about a sealing hoop that extends around the slide axis of the respective valve member portion, wherein each of the sealing hoops is oriented substantially in a respective seal plane oriented at a respective skew angle with respect to the slide axis of the respective valve member portion, each of the skew angles being in an inclusive range of from about 20 degrees to about 70 degrees.

16. A liquid flow device for selectively dispensing liquid or evacuating liquid, the device comprising:
a container defining an interior and an opening in fluid communication with the interior;
a lid configured to be mounted on the container over the opening;
passaging supported by the container when the lid is mounted on the container, the passaging including:
a gas supply passage configured to be fluidly connected to a source of pressurized gas;
a pressurization passage configured to be fluidly connected to the gas supply passage, the pressurization passage being positioned to deliver pressurized gas from the gas supply passage to the interior of the container when the lid is mounted on the container;
an evacuation passage including a venturi and configured to be fluidly connected to the interior of the container when the lid is mounted on the container, the evacuation passage being configured to be fluidly connected to the gas supply passage to convey pressurized gas from the source of pressurized gas through the venturi to create vacuum pressure in the interior of the container; and
a liquid passage configured to be fluidly connected to the interior of the container, and fluidly connected by the interior of the container to the pressurization passage and the evacuation passage when the lid is mounted on the container; and a mode selector valve fluidly connected to the pressurization passage and the evacuation passage, the mode selector valve being adjustable between a dispensing mode configuration and an evacuation mode configuration, the mode selector valve in the dispensing mode configuration blocking gas flow in the evacuation passage, and the mode selector valve in the evacuation mode configuration blocking gas flow in the pressurization passage, the mode selector valve including an actuator movable from a dispensing position to an evacuation position to adjust the mode selector valve from the dispensing mode configuration to the evacuation mode configuration, the actuator configured to, as the actuator is moved from the dispensing position toward the evacuation position, cause the mode selector valve to block gas flow in the pressurization passage and cause the mode selector valve to unblock gas flow in the evacuation passage.

17. The device as set forth in claim 16, wherein the mode selector valve includes first and second selector valve channels, the first selector valve channel crossing the evacuation passage, and the second selector valve channel crossing the pressurization passage, the mode selector valve including first and second valve member portions, the first valve member portion being movable in the first selector valve channel between an open position in which the first valve member portion permits gas flow through the evacuation passage and a closed position in which the first valve member portion blocks gas flow through the evacuation passage, the second valve member portion being movable in the second selector valve channel between an open position in which the second valve member portion permits gas flow through the pressurization passage and a closed position in which the second valve member portion blocks gas flow through the pressurization passage.

18. The device as set forth in claim 17, wherein the first and second valve member portions are operatively connected to the actuator by which movement of the actuator toward its dispensing position causes the first valve member portion to move toward its closed position and causes the second valve member portion is in to move toward its open position, and movement of the actuator toward its evacuation position causes the first valve member portion to move toward its open position and causes the second valve member portion to move toward its closed position.

19. The device as set forth in claim 17, wherein each of the first and second valve member portions includes a passage seal configured to sealingly engage the selector valve body across the respective one of the evacuation and pressurization passages to close the respective passage.

20. A liquid flow device for selectively dispensing liquid or evacuating liquid, the device comprising:
a container defining an interior and an opening in fluid communication with the interior;
a lid configured to be mounted on the container over the opening;
passaging supported by the container when the lid is mounted on the container, the passaging including:
a gas supply passage configured to be fluidly connected to a source of pressurized gas;
a pressurization passage configured to be fluidly connected to the gas supply passage, the pressurization passage being positioned to deliver pressurized gas from the gas supply passage to the interior of the container when the lid is mounted on the container;
an evacuation passage including a venturi and configured to be fluidly connected to the interior of the container when the lid is mounted on the container, the evacuation passage being configured to be fluidly connected to the gas supply passage to convey pressurized gas from the source of pressurized gas through the venturi to create vacuum pressure in the interior of the container; and
a liquid passage configured to be fluidly connected to the interior of the container, and fluidly connected by the interior of the container to the pressurization passage and the evacuation passage when the lid is mounted on the container; and
a mode selector valve fluidly connected to the pressurization passage and the evacuation passage, the mode selector valve being adjustable between a dispensing mode configuration and an evacuation mode configuration, the mode selector valve in the dispensing mode configuration blocking gas flow in the evacuation passage, and the mode selector valve in the evacuation mode configuration blocking gas flow in the pressurization passage;
wherein the mode selector valve includes first and second selector valve channels, the first selector valve channel crossing the evacuation passage, and the second selector valve channel crossing the pressurization passage, the mode selector valve including first and second valve member portions, the first valve member portion being slidable in the first selector valve channel between an open position in which the first valve member portion permits gas flow through the evacuation passage and a closed position in which the first valve member portion blocks gas flow through the evacuation passage, the second valve member portion being slidable in the second selector valve channel between an open position in which the second valve member portion permits gas flow through the pressurization passage and a closed position in which the second valve member portion blocks gas flow through the pressurization passage;
wherein each of the first and second valve member portions includes a passage seal configured to sealingly engage the selector valve body across the respective one of the evacuation and pressurization passages to close the respective passage;
wherein each of the first and second valve member portions has a slide axis and each passage seal is configured to sealingly engage the selector valve body continuously about a sealing hoop that extends around the slide axis of the respective valve member portion, wherein each of the sealing hoops is oriented substantially in a respective seal plane oriented at a respective skew angle with respect to the slide axis of the respective valve member portion, each of the skew angles being in an inclusive range of from about 20 degrees to about 70 degrees.

* * * * *